(12) United States Patent
Abuelata

(10) Patent No.: US 10,783,012 B2
(45) Date of Patent: Sep. 22, 2020

(54) SYSTEMS AND METHODS FOR EFFICIENT INTER-DEVICE DATA EXCHANGE

(71) Applicant: CopyBucket, Inc., Cupertino, CA (US)

(72) Inventor: Tamer Abuelata, San Jose, CA (US)

(73) Assignee: CopyBucket, Inc., Cupertino, CA (US)

( * ) Notice: Subject to any disclaimer, the term of this patent is extended or adjusted under 35 U.S.C. 154(b) by 134 days.

(21) Appl. No.: 15/959,138

(22) Filed: Apr. 20, 2018

(65) Prior Publication Data
US 2019/0324826 A1 Oct. 24, 2019

(51) Int. Cl.
G06F 9/54 (2006.01)
G06F 3/0482 (2013.01)
G06F 3/0481 (2013.01)

(52) U.S. Cl.
CPC ............ *G06F 9/543* (2013.01); *G06F 3/0482* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 5,404,442 A | 4/1995 | Foster et al. | |
| 5,530,865 A | 6/1996 | Owens et al. | |
| 5,765,156 A | 6/1998 | Guzak et al. | |
| 5,964,834 A * | 10/1999 | Crutcher | G06F 9/543 |
| | | | 709/213 |
| 6,058,399 A | 5/2000 | Morag et al. | |
| 6,078,929 A | 6/2000 | Rao | |
| 6,269,389 B1 | 7/2001 | Ashe | |
| 6,594,664 B1 | 7/2003 | Estrada et al. | |
| 7,092,670 B2 | 8/2006 | Tanaka et al. | |
| 7,340,483 B1 | 3/2008 | Gauthier et al. | |
| 7,533,349 B2 | 5/2009 | Saul et al. | |
| 7,774,753 B1 | 8/2010 | Reilly et al. | |
| 7,853,888 B1 | 12/2010 | Dhawan et al. | |
| 7,870,493 B2 | 1/2011 | Pall et al. | |
| 7,970,850 B1 | 6/2011 | Callanan et al. | |
| 8,015,149 B1 | 9/2011 | Anastasopoulos et al. | |
| 8,019,900 B1 | 9/2011 | Sekar et al. | |
| 8,020,112 B2 | 9/2011 | Ozzie et al. | |

(Continued)

OTHER PUBLICATIONS

NirSoft, "InsideClipboard v1.01", Dec. 26, 2016, retrieved from the Internet <URL: https://web.archive.org/web/20071226092018/https://www.nirsoft.net/utils/inside_clipboard.html> Oct. 28, 2019. (Year: 2007).*

(Continued)

*Primary Examiner* — Christopher J Fibbi

(57) ABSTRACT

Various of the disclosed embodiments provide systems and methods for efficiently recalling data on a single device and for efficiently transitioning data between devices. Users may use graphical user interfaces on one or more client devices to manage "buckets" of data. These data collections may be stored locally on the client devices and on a server storage system. In some embodiments, the system may synchronize bucket collections between client devices. Bucket data may also be cached locally on the client device to facilitate ready user access and efficient workflow. Various embodiments may be used, for example, in collaborative work environments to readily store and exchange data assets between team members.

20 Claims, 33 Drawing Sheets

(56) References Cited

U.S. PATENT DOCUMENTS

| | | | |
|---|---|---|---|
| 8,132,106 B2 | 3/2012 | Low et al. | |
| 8,296,671 B2 | 10/2012 | Narayanan et al. | |
| 8,543,926 B2 | 9/2013 | Giles | |
| 8,825,597 B1 | 9/2014 | Houston et al. | |
| 8,856,161 B2 | 10/2014 | Balakrishnan et al. | |
| 9,141,483 B1 | 9/2015 | Sekar et al. | |
| 9,396,176 B2 | 7/2016 | Soni et al. | |
| 2004/0070607 A1 | 4/2004 | Yalovsky et al. | |
| 2004/0148406 A1 | 7/2004 | Shima | |
| 2004/0172584 A1 | 9/2004 | Jones et al. | |
| 2006/0085507 A1 | 4/2006 | Zhao et al. | |
| 2006/0101064 A1 | 5/2006 | Strong et al. | |
| 2006/0218492 A1 | 9/2006 | Andrade | |
| 2006/0225137 A1 | 10/2006 | Odins-Lucas et al. | |
| 2006/0235876 A1 | 10/2006 | Plouffe, Jr. | |
| 2006/0294247 A1 | 12/2006 | Hinckley et al. | |
| 2007/0112832 A1 | 5/2007 | Wong et al. | |
| 2007/0294632 A1 | 12/2007 | Toyama et al. | |
| 2008/0082932 A1* | 4/2008 | Beumer | G06F 9/543 715/770 |
| 2008/0109464 A1 | 5/2008 | Ozzie et al. | |
| 2008/0109832 A1 | 5/2008 | Ozzie et al. | |
| 2008/0115048 A1 | 5/2008 | Veselova et al. | |
| 2008/0256601 A1 | 10/2008 | Dutta et al. | |
| 2009/0210459 A1 | 8/2009 | Nair et al. | |
| 2009/0248695 A1 | 10/2009 | Ozzie et al. | |
| 2009/0328033 A1 | 12/2009 | Kohavi et al. | |
| 2010/0194677 A1 | 8/2010 | Fiebrink et al. | |
| 2010/0229114 A1 | 9/2010 | Thiruveedu et al. | |
| 2010/0251095 A1 | 9/2010 | Juvet et al. | |
| 2011/0072344 A1 | 3/2011 | Harris et al. | |
| 2011/0072365 A1* | 3/2011 | Pall | G06F 9/543 715/753 |
| 2011/0113012 A1 | 5/2011 | Gruhl et al. | |
| 2011/0202823 A1 | 8/2011 | Berger et al. | |
| 2012/0124524 A1 | 5/2012 | Frank Szarfman | |
| 2012/0185511 A1 | 7/2012 | Mansfield et al. | |
| 2013/0054731 A1* | 2/2013 | Branton | G06F 17/24 709/213 |
| 2013/0055131 A1 | 2/2013 | Leong et al. | |
| 2013/0335335 A1 | 12/2013 | Neelakant | |
| 2014/0013258 A1* | 1/2014 | Jang | G06F 3/0488 715/770 |
| 2014/0122592 A1 | 5/2014 | Houston et al. | |
| 2014/0157169 A1 | 6/2014 | Kikin-gil | |
| 2014/0181090 A1 | 6/2014 | Homsany | |
| 2014/0195516 A1 | 7/2014 | Balakrishnan et al. | |
| 2014/0201289 A1 | 7/2014 | Wheeler et al. | |
| 2014/0214856 A1 | 7/2014 | Mahkovec et al. | |
| 2014/0229457 A1 | 8/2014 | Sydell et al. | |
| 2014/0258473 A1 | 9/2014 | Litzenberger et al. | |
| 2014/0267339 A1 | 9/2014 | Dowd et al. | |
| 2014/0280132 A1* | 9/2014 | Auger | G06F 9/543 707/736 |
| 2014/0280463 A1 | 9/2014 | Hunter et al. | |
| 2014/0280755 A1 | 9/2014 | Memon et al. | |
| 2014/0324943 A1 | 10/2014 | Antipa | |
| 2014/0337278 A1 | 11/2014 | Barton | |
| 2014/0337458 A1 | 11/2014 | Barton | |
| 2014/0359085 A1 | 12/2014 | Chen | |
| 2015/0012861 A1 | 1/2015 | Loginov | |
| 2015/0149407 A1 | 5/2015 | Abbott et al. | |
| 2015/0177954 A1 | 6/2015 | Wei et al. | |
| 2015/0178516 A1 | 6/2015 | Mityagin | |
| 2015/0207844 A1 | 7/2015 | Tataroiu et al. | |
| 2015/0244794 A1 | 8/2015 | Poletto et al. | |
| 2016/0085602 A1 | 3/2016 | Jacobson et al. | |
| 2016/0285928 A1 | 9/2016 | Sanso et al. | |
| 2016/0291937 A1 | 10/2016 | Khanna | |
| 2016/0321229 A1 | 11/2016 | Baird et al. | |
| 2016/0342449 A1 | 11/2016 | Wong et al. | |
| 2017/0124170 A1 | 5/2017 | Koorapati et al. | |
| 2017/0347226 A1 | 11/2017 | Stattenfield et al. | |
| 2018/0335998 A1* | 11/2018 | Callaghan | H04L 67/1095 |
| 2019/0129844 A1* | 5/2019 | Zhang | G06F 3/0608 |

OTHER PUBLICATIONS

Evernote, "Work Smarter with Evernote: Organizing with Notebooks and Tags", Nov. 18, 2013, YouTube, <URL: https://www.youtube.com/watch?v=hk1eKDNmhq4> retrieved Feb. 28, 2020 (Year: 2013).*

Sabrogden, SourceForge—Ditto, Published 2018 (previous releases until at least 2004), Available at https://sourceforge.net/projects/ditto-cp/. [Retrieved May 18, 2018].

Sabrogden, Ditto» Clipboard Manager »3.21.223.0, Published 2017, Available at https://ditto-cp.sourceforge.io/. [Retrieved May 18, 2018].

EmulationEdu EmulationEducation, Ditto clipboard , Group Feature 3—YouTube, Published Jul. 31, 2017, Available at https://www.youtube.com/watch?v=vhAv3_We-3A. [Retrieved May 9, 2018].

Pretty Printed, Using the Ditto Clipboard Manager—YouTube, Published Dec. 3, 2015, Available at https://www.youtube.com/watch?v=oyHLa0SSEh0. [Retrieved May 9, 2018].

EmulationEdu EmulationEducation, Ditto clipboard , Introduction 1—YouTube, Published Jul. 30, 2017, Available at https://www.youtube.com/watch?v=NcgoK0B8dll. [Retrieved May 9, 2018].

EmulationEdu EmulationEducation, Ditto clipboard , Search Feature _2—YouTube, Published Jul. 31, 2017, Available at https://www.youtube.com/watch?v=xlgTH93EywA. [Retrieved May 9, 2018].

Hewie Poplock, Clipmate The Windows clipboard extender—YouTube, Published Feb. 19, 2017, Available at https://www.youtube.com/watch?v=ezmywB-tGyY. [Retrieved May 9, 2018].

Dan Hersam, The Best Windows Clipboard Manager—YouTube, Published Aug. 6, 2012, Available at https://www.youtube.com/watch?v=oq34AGidGtA. [Retrieved May 9, 2018].

DottoTech, PopClip and CopyClip—Two Powerful Clipboard Utilities—YouTube, Published Feb. 21, 2017, Available at https://www.youtube.com/watch?v=LBWYAzJWQpl. [Retrieved May 9, 2018].

Birdys Views, A Multiple Clipboard Solution—Ditto—YouTube, Published Sep. 23, 2015, Available at https://www.youtube.com/watch?v=btGlPvgNBWg. [Retrieved May 9, 2018].

Bill Gumula, Digital Toolbox: Ditto Clipboard Manager—YouTube, Published Mar. 11, 2013, Available at https://www.youtube.com/watch?v=H5LZzQrLutQ. [Retrieved May 9, 2018].

Geekteks, Ditto Free Professional Clipboard Manager—Copy Multiple Items & Save/Store—YouTube, Published Nov. 20, 2009, Available at https://www.youtube.com/watch?v=jEj8s9Q14bc. [Retrieved May 9, 2018].

Willswords, Tool Time: Ditto Clipboard Manager—YouTube, Published Jul. 15, 2011, Available at https://www.youtube.com/watch?v=spS0wW_6iZc. [Retrieved May 9, 2018].

TJ Azton, Ditto Clip Board Manager—YouTube, Published Oct. 19, 2016, Available at https://www.youtube.com/watch?v=H_r1XxHZTLs. [Retrieved May 9, 2018].

CTG Video Tutorials, A Free Clipboard Viewer Install & Review—YouTube, Published Jan. 8, 2016, Available at https://www.youtube.com/watch?v=fKTOAq23_hc. [Retrieved May 9, 2018].

CyberMatrixCorp, Clipboard Magic—Windows Freeware to Improve Your Copying and Pasting—YouTube, Published Jan. 23, 2012, Available at https://www.youtube.com/watch?v=eA5pVsDcsR0. [Retrieved May 9, 2018].

EfficientExcel, Using the Clipboard to copy & paste several items—YouTube, Published Sep. 3, 2012, Available at https://www.youtube.com/watch?v=yd_GzhQ2xdw. [Retrieved May 9, 2018].

Graham Hobbs, The Multiple Clipboard—An Invaluable Tool for You . . .—YouTube, Published Jun. 21, 2013, Available at https://www.youtube.com/watch?v=3BQ8d04xshc. [Retrieved May 9, 2018].

John Turnbull, Clipboard manager—YouTube, Published Aug. 6, 2016, Available at https://www.youtube.com/watch?v=NZJuOYAcfpw. [Retrieved May 9, 2018].

Hannes Grebin, Windows Quick Tip: Introducing Ditto Clipboard Manager—YouTube, Published Jan. 12, 2013, Available at https://www.youtube.com/watch?v=0lfY8PUlRas. [Retrieved May 9, 2018].

(56) References Cited

OTHER PUBLICATIONS

Kelvin Nikkel, Ditto Clip Board Manager—YouTube, Published Feb. 24, 2013, Available at https://www.youtube.com/watch?v=AkygbljRi2s. [Retrieved May 9, 2018].

TWPresentations, Ditto Clipboard HD 720p Video Sharing—YouTube, Published Jun. 19, 2012, Available at https://www.youtube.com/watch?v=sk6UWN4rHP0. [Retrieved May 9, 2018].

Clipà Vu, Clipboard Manager—Introducing Clipà.Vu—YouTube, Published Apr. 9, 2013, Available at https://www.youtube.com/watch?v=gfaPbbMOD-w. [Retrieved May 9, 2018].

InterlinkKnight, The best Clipboard Manager for Windows XP/Vista/7—ClipX—YouTube, Published Jul. 31, 2009, Available at https://www.youtube.com/watch?v=6Qe151P6y6E. [Retrieved May 9, 2018].

Kareem Sulthan, ClipX—A Windows Clipboard Hijacker—YouTube, Published May 7, 2016, Available at https://www.youtube.com/watch?v=kljZ2k0xRDs. [Retrieved May 9, 2018].

learningengineer.com, Using ArsClip to Save Time—YouTube, Published Feb. 7, 2015, Available at https://www.youtube.com/watch?v=jFk69THmTKc. [Retrieved May 9, 2018].

Apple, Inc., Pasteboard Concepts. Published Sep. 1, 2010. Available at https://developer.apple.com/library/content/documentation/Cocoa/Conceptual/PasteboardGuide106/Articles/pbConcepts.html. (Retrieved Apr. 20, 2018).

Microsoft Corporation, Clipboard Class. Published 2018. Available at https://msdn.microsoft.com/en-us/library/system.windows.clipboard(v=vs.110).aspx. (Retrieved Apr. 20, 2018).

Paste, "Paste—The smart way to copy and paste on Mac and iOS", Available at https://pasteapp.io/. [Retrieved May 15, 2020].

Paste, "Paste—Medium", Available at https://medium.com/pasteapp. [Retrieved May 15, 2020].

Paste, "What is Paste?—Paste—Medium", Published Oct. 5, 2017, Available at https://medium.com/pasteapp/what-is-paste-app-87e49f3fa798. [Retrieved May 15, 2020].

Paste, "The status of Paste for iOS—Paste—Medium", Published Dec. 14, 2017, Available at https://medium.com/pasteapp/the-status-of-paste-for-ios-f7b51bc7a7ae. [Retrieved May 15, 2020].

Paste, "Meet Paste for iOS—Paste—Medium", Published Mar. 13, 2018, Available at https://medium.com/pasteapp/meet-paste-for-ios-3726ff8bb4ed. [Retrieved May 15, 2020].

Paste, "High Sierra Support Is Now Available!—Paste—Medium", Published, Oct. 6, 2017, Available at https://medium.com/pasteapp/high-sierra-support-is-now-available-82269a19c136. [Retrieved May 15, 2020].

Copied, "Copied—A Full Featured Clipboard Manager for iOS and macOS", Available at https://copiedapp.com/. [Retrieved May 15, 2020].

Copied, "FAQ/Support—Copied". Available at https://copiedapp.com/help/. [Retrieved May 15, 2020].

Copied, "Copied—PressKit", Published Oct. 27, 2015, Available at https://copiedapp.com/Copied-PressKit.zip. [Retrieved May 15, 2020].

* cited by examiner

SYSTEMS AND METHODS FOR EFFICIENT INTER-DEVICE DATA EXCHANGE

TECHNICAL FIELD

Various of the disclosed embodiments relate to systems and methods for storing, organizing, and presenting data across devices.

BACKGROUND

The digital revolution precipitated by network and computer technologies has changed the habits and expectations of individual users. With the proliferation of personal computers and personal mobile devices, users are not only more empowered than they were previously, but more overwhelmed by the available information. On one hand, users now have the capacity to communicate with peers instantaneously and to access vast repositories of information. Unfortunately, this very plethora of data makes organizing so much information difficult. Similarly, users often lack quick and efficient methods for communicating the disparate and variable-sized data they encounter with their peers.

Some operating systems facilitate "clipboards" (or "pasteboards"), which allow users to cut, copy, and paste items between programs and between locations in an operating system. These tools may enable users to transfer text, images, files, objects, and other data from a source program or location managed by the operating system to a destination program or location. These clipboards are often used for short-term data storage or transfer and act as a temporary buffer that can be accessed by many programs on a local machine. While users have incorporated the clipboard into their fundamental set of day-to-day operations, the clipboard operation often remains an artifact of the localized, memory-limited environment in which it originated. Indeed, many operating systems continue to anticipate a single buffer for clipboard operations and provide only limited methods for transferring clipboard data to another device. Similarly, the clipboard data is often stored exclusively in dynamic memory local to the user's machine, which is volatile, can easily lose the data, and typically lacks any extensive knowledge of previous clipboard operations.

Consequently, there exists a need for more sophisticated clip-boarding systems and methods, which anticipate the needs and behaviors of modern, digitally-sophisticated users. For example, there exists a need for systems and methods to efficiently coordinate context-sensitive data management between users, where the users dynamically select the organizational contexts, but the system maintains an efficient record of the data allocated to each user-identified context. Such systems and methods may permit users to seamlessly interact with their devices and with one another.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements.

Figure 1:
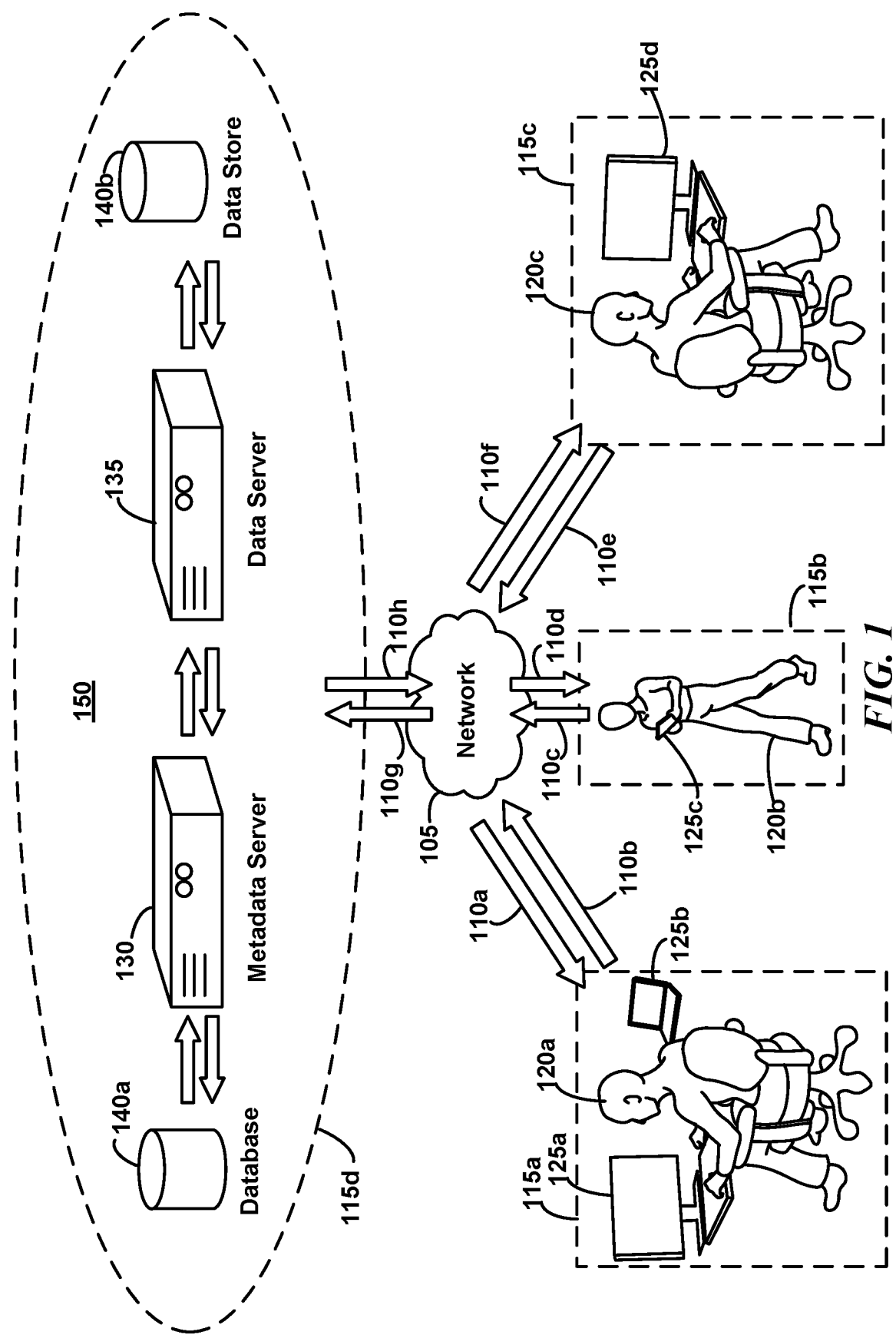
FIG. 1 is a schematic diagram illustrating an example topology of various elements as may be implemented in some embodiments.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The embodiments are intended to cover all modifications, equivalents, and alternatives falling within the scope of the disclosed examples, rather than limit the embodiments to the particular examples described or depicted.

DETAILED DESCRIPTION

Example System Topology Overview

FIG. 1 is a schematic diagram illustrating an example topology of various elements as may be implemented in some embodiments. Particularly, in this example, users 120a, 120b, 120c may be working on a variety of both team and individual-based tasks. For example, the users 120a-c may be game developers, each with specific skillsets, who are now trying to integrate the various assets they've generated (e.g., software code, graphics, sound files) into a single product. User 120a may also independently be assembling images and text for a wedding album by exchanging data between devices 125a and 125b.

While the users 120a-c may be located at a single location, in this example, they are located at three distant locations 115a-c. Users 120a-c may be performing their various tasks with the assistance of various computer devices 125a-d. For example, user 120a may be using a desktop computer 125a and a laptop computer 125b at location 115a, while user 120b, uses a mobile device 125c (e.g., a tablet or mobile phone) at location 115b. User 120c may employ a desktop computer 125d at location 115c.

To accomplish their various tasks, the users 120a-c may wish to quickly and efficiently organize and share data across the devices 125a-d. For example, user 120a may wish to exchange images and text between devices 125a and 125b while creating their wedding album. Simultaneously, user 120a may wish to exchange graphical images via device 125a with user 120c's device 125d as part of the game development.

While the users 120a-c may connect their respective devices via network 105 (such as a local area network or the Internet) to transmit 110b,c,e and receive 110a,d,f information, it may be inefficient to do so. For example, exchanging many files via a shared network drive, instant messaging, or via email may reduce the user's productivity. Rather than work and communicate in real-time, the users may instead be inclined to transmit large "clumps" of data over long intervals. Similarly, different methods may be better suited for different tasks and interoperability requirements. Thus, user 120a may use one method when communicating between devices 125a and 125b (e.g., a folder shared over the network or a USB memory stick), while using a different method (e.g., email) to communicate with user 120c's device 125d via device 125a.

Rather than pursue these disparate, ad-hoc exchange methods, the users 120a-c may agree to use a centralized server system 150. Server system 150 may be located on the same site as the users in some embodiments (e.g., when network 105 is a local area network) or, as depicted here, at a separate remote location 115d (e.g., when network 105 is the Internet). The server system 150 may comprise a data server 135, a metadata server 130, a data store 140b, and a database 140a and may receive 110g and transmit 110h data via the network 105. Though depicted here as four separate entities, one will appreciate that this illustration is provided merely to facilitate comprehension and that in some embodiments the systems may be merged (e.g., a single SQL database serving for both the data store 140b and a database 140a) or divided differently. Server system 150 may comprise a number of servers and custom software may coordinate the communication between the clients, including the upload, download of items, synchronization of "buckets"

containing items to be exchanged, real-time event notification, etc. As used herein, "items" or "data objects" may be used to refer to data stored and exchanged through the bucket management programs, such as files, folders, or portions of files (substrings of text in a text file, pixels from an image, cells from a spreadsheet, etc.). Not only may "buckets" provide a vehicle for users to organize their data locally, but they may also provide a vehicle for coordinating data exchanges between users and for managing data allocation at the server system 150. In conjunction with various memory management processes described herein, such logical divisions may facilitate both increased user efficiency and task-switching, as well as system-coordinated sharing. This may be especially useful, for example, where different users have different specific tasks involving different data types.

In conjunction with client-side software operating on each of devices 125*a-d*, the system 150 may facilitate a centralized method for exchanging data between the devices 125*a-d*. As described in greater detail herein, in some embodiments the client-side software may provide a clipboard item container interface. This interface may provide a central, persistent, synchronized system for collecting clipboard items between devices. For example, as user 120*a* copies images to the client software on device 125*a*, the raw image data may be stored in datastore 140*b* via data server 135. Similarly, metadata (e.g., the size, name, data type, time acquired, associated user(s), etc.) associated with the image may be stored in database 140*a* via metadata server 130. This data may then be accessed by user 120*c* via client-side software on, e.g., device 125*d*.

Thus, the client software in combination with server system 150 may enable users to easily pass information between applications on separate machines using a consolidated interface. Unlike the native operating system clipboard operation, where data resides in the local memory of one of devices 125*a-d*, here, the users may instead store large and more complicated data via server system 150.

While this example presents a topology clearly separating client devices 125*a-d* and the client-software thereon from the server system 150, one will appreciate that the topology may be modified without substantial functional effect in other embodiments. For example, in a local area network, a single user's client software may be designated the "server system" and used as the central repository for the other users' copying operations. In such a circumstance, the server system 150 may also be one of devices 125*a-d*.

Example System Topology Overview—Example Modular Division

Figure 2:
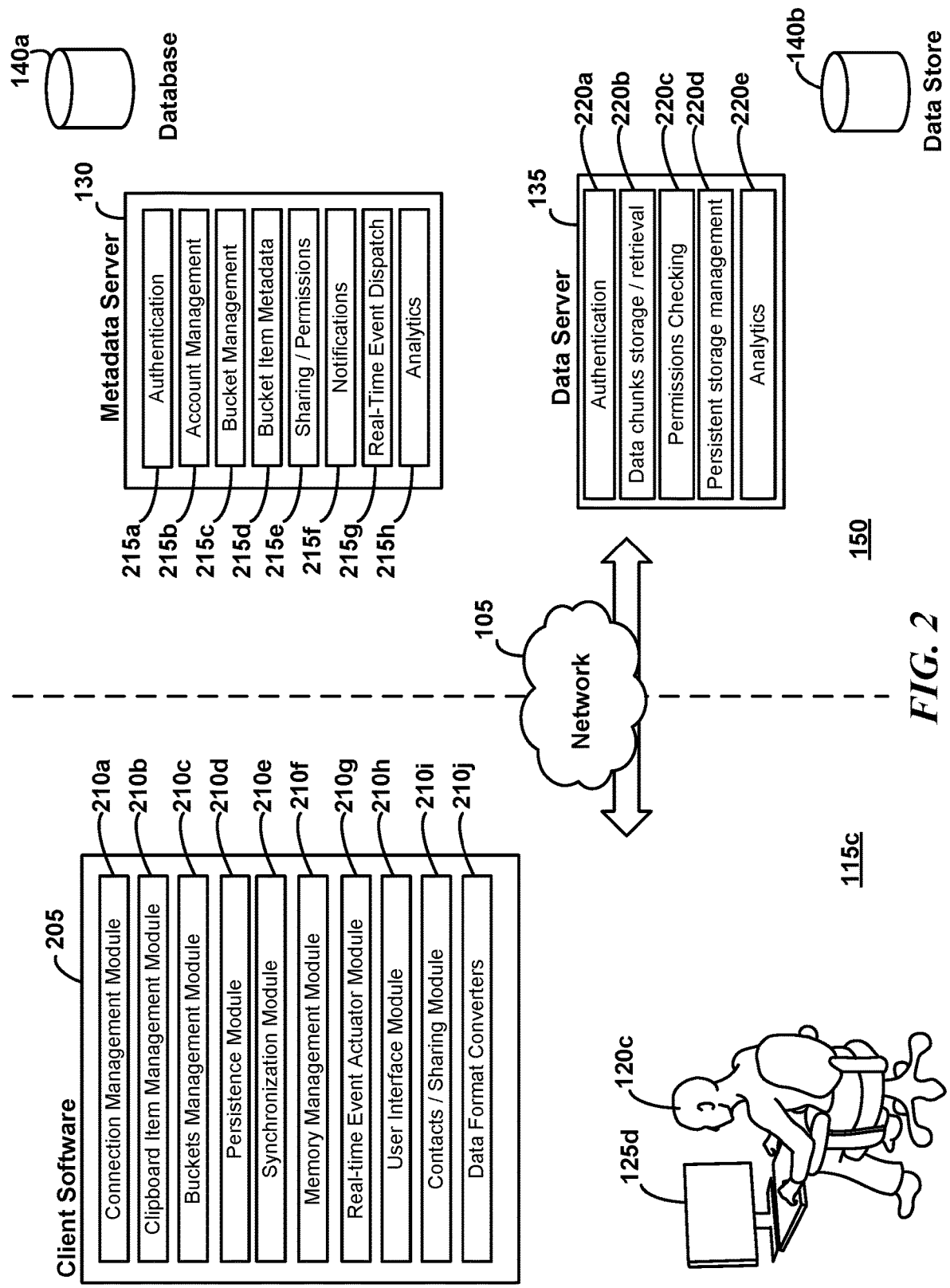
FIG. 2 is a schematic block diagram illustrating an example relation between various operational modules as may be implemented in some embodiments.

FIG. 2 is a schematic block diagram illustrating an example relation between various operational modules as may be implemented in some embodiments. As discussed above, each of the users may install client software on their respective devices 125*a-d* for communication with server system 150. For example, user 120*c* may install client software 205 onto device 125*d*. In the schematic block diagram of FIG. 2, the client software 205 may comprise a variety of software "modules." These modules may be software code, hardware, firmware, or combinations thereof, designed to fulfill a particular purpose.

For example, the connection management module 210*a* may be software routines configured to connect with the server system. The clipboard item management module 210*b* may locate clipboard data for the operating system of device 125*d*. The buckets management module 210*c* may coordinate bucket synchronization, using software implementing the operations and methods discussed elsewhere herein. The persistence module 210*d* may implement caching optimization rules. The synchronization module 210*e* may apprise the server and client of changes on each. The memory management module 210*f* may determine when local copies or server-side copies of data objects should be used. As described in greater detail herein, memory management module 210*f* may be used to determine which items are made readily accessible, e.g., in RAM memory, and which are cleared from RAM to more efficiently use local resources. Inefficient management may adversely impact the user experience both when too little RAM is allocated and when too much is allocated for copied items. For example, if the user is a sound or graphic designer with RAM-intensive resource requirements, even though they may wish to rapidly access previously stored items, they may also wish to have RAM available for their sound and graphic workspace. Accordingly, various methods described herein facilitate memory management module 210*f*'s balancing of these competing interests.

A real-time event actuator module 210*g* may notify the user of events as they occur or at the request of the server system. Real-time event actuator module 210*g* may also "actuate" events locally (events which may have been performed on other devices). For example, if a first user deletes an item from a bucket representation on a first device, a notice from the server to real-time event actuator module 210*g* may precipitate a corresponding deletion locally at a second device (as well as corresponding memory management adjustments).

The user interface module 210*h* may present the client software GUI described herein and facilitate GUI operations on the user's system's operating system. The contacts/sharing module 210*i* may be software for interfacing with the user's address book, as may be stored locally in an email client, remotely on an email server, a digital phonebook, etc. Contacts/sharing module 210*i* may also facilitate item sharing between devices running client software (e.g., as when the user clicks an item and selects "Share with friends" as described in greater detail herein). The data format converters module 210*j* may convert disparate data types to a common byte format. For example, text data received in various encodings may be converted to a common encoding format.

In some embodiments the metadata server 130 may also include various modules (again being software, firmware, hardware or combinations thereof) for performing various operations some of which may communicate with data store 140*b*. For example, an authentication module 215*a* may ensure that the user's interactions are performed under the appropriate account. Account management module 215*b* may store account data (e.g., membership type, data storage and transfer quotas, billing data, etc.) while bucket management module 215*c* may coordinate bucket states with buckets management modules 210*c*. Bucket item metadata module 215*d* may coordinate storage of data object metadata, such as the data's type, size, corresponding chunks, etc. Sharing/permissions module 215*e* may ensure that users only share buckets and objects in accordance with their sharing permissions, account levels, or other restrictions.

Notifications module 215*f* may determine when users should be notified, e.g., of errors related to a command, that a data object's raw data will be expunged, and other notifications to apprise the user of the system's status. Real-time event dispatch module 215*g* may direct client software systems to perform immediate events, such as begin an item removal from a bucket. An analytics module 215*h* may record user behavior, client software operations, or server operations, and may facilitate subsequent or real-time review of the various modules' operations.

In some embodiments the data server 135 may comprise various hardware, software, or firmware modules for performing various operations some of which may communicate with database 140*a*. For example, an authentication module 220*a*, like authentication module 215*a* may ensure that the user's interactions are performed under the appropriate account (again, one will appreciate that modules may be merged in some embodiments and that only a single module on one of the servers may be used). Data chunks storage/retrieval module 220*b* may facilitates storage and retrieval of data chunks associated with a various objects as described in greater detail herein. Permissions checking module 220*c*, like permissions module 215*e*, may ensure that the user (as requestor or as recipient) has appropriate permissions for a requested operations. Persistent storage management module 220*d* may operate in conjunction with persistence module 210*d* to ensure desired caching occurs at the client system or at the server. Analytics management module 220*e*, like analytics module 215*h*, may record user behavior, client software operations, or server operations, to facilitate subsequent or real-time review of the various modules' operations. Again, modules may be omitted or combined in various embodiments than as shown here to facilitate understanding.

Example Client-Side Graphical User Interface

Figure 3:
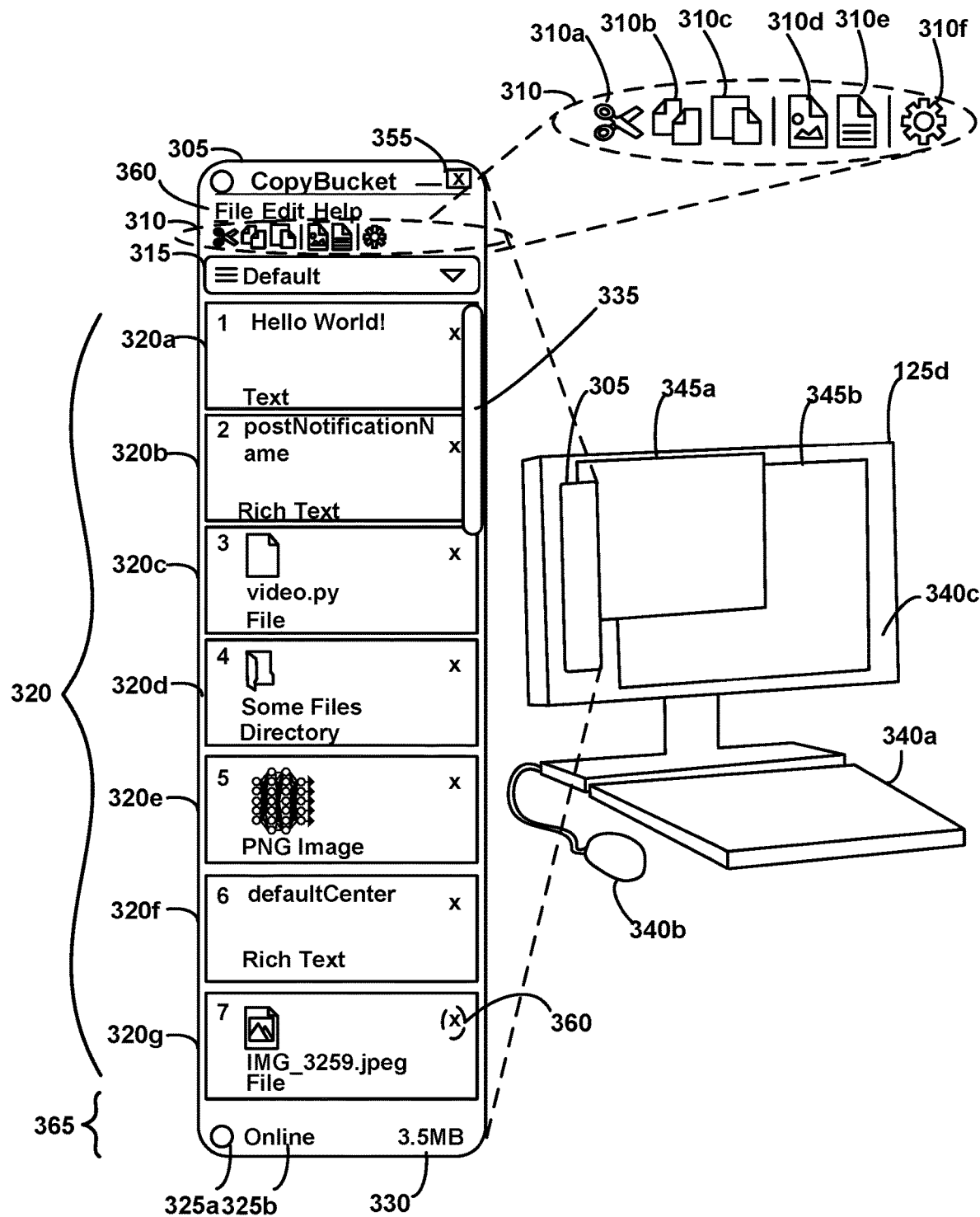
FIG. 3 is a schematic diagram illustrating an example client user interface for client bucket management software as may be presented to a user in some embodiments.

FIG. 3 is a schematic diagram illustrating an example client user interface 305 for client bucket management software as may be presented to a user in some embodiments. Particularly, user device 125*d* may comprise a keyboard 340*a*, mouse 340*b*, and display 340*c*. The display 340*c* may depict the GUIs for a variety of programs running on the operating system of device 125*d*, e.g., windows 345*a* and 345*b* may be GUIs for text editing or graphical applications. Note that in some embodiments, device 125*d* may simply be relaying the screen from a remote system (e.g., via a remote login). The clipboard bucket management client system software may have likewise been installed on the operating system and may present its own GUI window 305. The GUI 305 may generally be placed over the other program windows 345*a* and 345*b*, as shown, to facilitate ready access. In accordance with some operating system's windowing structure, minimization and closing icons 355 may be provided for performing the respective operations.

In this example, GUI 305 may comprise five portions: a general toolbar menu 360; an action selection toolbar 310; bucket selection interface 315; item stack window 320; and a network/bucket-size summary region 365. General toolbar 360 may comprise one or more keywords ("File," "Edit," "Help," etc.) for accessing various command dropdowns. For example, selection of the File keyword may present a dialog for closing the client software program, modifying user preferences, adjusting connection properties, etc.

Action selection toolbar 310 may comprise a plurality of icons 310*a*-*f* associated with various user operations. For example, icon 310*a* may include scissors and be associated with the cut or with the quick-cut command discussed in greater detail herein. Icon 310*b* may include two documents and be associated with the copy or with the quick-copy command discussed in greater detail herein. For example, selecting icon 310*a* may perform a Cut (Ctrl-X) operation, or in some embodiments a "Quick Copy," operation (e.g., when combined with a keyboard command). Similarly, selecting icon 310*b* may perform a Copy (Ctrl-C), or in some embodiments a "Quick Cut," operation (e.g., when combined with a keyboard command). Selecting icon 310*c* may perform a Paste (Ctrl-V) operation. Selecting icon 310*d* may perform a "new copy from screenshot" operation. This may allow creation of an image data object from, e.g., the entire screen or a portion of the screen. Selecting icon 310*e* may perform a "new copy from text" operation, which may allow creation of a text item from user input. In some embodiments, the user's input may be formatted as plain text or rich text (e.g., by presenting a new text input window). Selecting icon 310*f* may present a settings interface for setting client software program settings (e.g., user account settings, network connectivity settings, GUI style, etc.).

Bucket selection interface 315 may be a drop-down selection interface used to select a "bucket." A bucket may comprise the plurality of data items organized together. Buckets may not be limited to including just files and folders, but may also include portions of files (e.g., string of texts, collections of pixels, etc.) as data objects. The creation and use of buckets may be used to logically organize the data by the user. For example, one bucket may be dedicated to images for a first product, a second bucket for personal text notes, a third bucket for useful code snippets, etc. Some embodiments may facilitate "sub-buckets" within buckets, and varying levels, to further accommodate various organizational preference.

The items in a bucket may be depicted in item stack window 320 when the user selects the corresponding bucket name from selection interface 315. In some embodiments, the user may reorder items within a clipboard item container by moving/dragging single items or several items up or down in the item stack window 320. Though the items may originally be ordered as they were received by the program (e.g., from the user or from a server), using drag-and-drop movements, the user may override the original order of the items. For example, items that are often accessed can be moved up closer to the top of the list. In some embodiments, the user may drag a single item or multiple items from the clipboard item container to another application or the operating system file system. The target application may then receive the items and can handle them directly, e.g., as it would have received a "normal" paste operation.

Item stack window 320 may comprise a plurality of item icons 320*a*-*g* organized as a vertical, sequentially ordered stack, in that each item is either above or below each of the other items. Each item icon is associated with a corresponding portion of data entered into the clipboard system. For example, item icon 320*a* is associated with text data comprising the phrase "Hello World!", item icon 320*b* is associated with rich text copied from a Microsoft Word™ document, item icon 320*c* is associated with a Python file, etc. As indicated in this embodiment, the icons may change depending upon the nature of the copied content. For example, for each of the PNG image file associated with icon 320*e* and the JPG image file associated with icon 320*g*, a reduced size "thumbnail" of the image may be included in the icon (in some embodiments, a generic "image" icon may be used, where a thumbnail cannot be easily generated). Similarly, a folder of directory files may be presented by a folder icon as in item icon 320*d*. File and folder items may be displayed as icons with their names, similar to how they would appear on the local operating system. In some embodiments, if the item is text, the text in the icon representation may be truncated to fit in the available space (the user may be able to specify icon dimensions in some embodiments). If the item is an image in some embodiments it may be resized to fit in the available icon image space.

Each icon may be associated with a numerical identifier in its upper left corner. This identifier may indicate the item's position in the stack in reverse chronological order (i.e., the first items is the most recently added) based upon the order in which it was added to the stack (until, e.g., the user reorders the items). For example, prior to any user reordering, the JPG image associated with item icon 320g was inserted into the stack for this bucket before the rich text associated with item icon 320f was inserted. Consequently, the numerical identifier (7) associated with the JPEG image is greater than the numerical identifier (6) associated with the rich text. The "Hello World!" text, having a numerical identify of "1" is the most recent item to be added to the stack.

A removal icon, such as an "x" may be placed in the upper right corner of each item icon 320a-g to facilitate removal of the item from the bucket by the user as discussed in greater detail herein. Note that more than seven items may be present in the stack and scroll bar 335 may be used to view additional items at lower positions in the stack. In some embodiments, as the data for each of the items may be stored in server system 150, rather than locally on device 125d, the GUI 305 may depict many more items in each of the buckets than it may be feasible or possible to store in device 125d's local memory or disk.

Network/bucket-size summary region 365 may be used to inform the user of the client software's network status and memory footprint for a given bucket. Particularly, circular icon 325a may provide visual indicia (e.g., via color) in conjunction with textual indication 325b whether the client software is in network communication with server system 150. Though a textual indication is shown here, one will appreciate that only a graphical indication or auditory indication may instead be used in some embodiments. When the client software is in communication with the server system 150, the user may have complete access to all their buckets, as well as their contents, and the capacity to add as many new items as the server system's 150 memory may support. Conversely, when the client software is not in communication with the server system 150, only locally cached copies of the bucket contents may be available. Similarly, the user may be limited to the number of new items they may add, based on memory limitations local to device 125d. A memory footprint indicia 330 may also be provided to assist the user with assessing the memory consumed by the selected bucket. Note that this may be the cumulative size of all the items' sizes in the bucket, rather than the actual memory consumed by all copies (in local memory, in local disk, on the server, etc.) of the items created by the system. Understanding the collective size of the items in the bucket may, e.g., help the user assess how best to transfer the bucket to another user, whether to redistribute bucket contents, anticipate offline access, etc.

Some embodiments use this arrangement of interfaces and icons discussed above in GUI window 305, the quick copy/cut functions, and the bucket-based memory management operations described herein to improve user efficiency via GUI interactions and via interactions with the server system. The harmonized interfacing of GUI and server-side operations facilitates a sense of seamless integration between various client devices. For example, simultaneous appreciation by multiple users of the available buckets, their contents, and relative size via the components of GUI window 305, in combination with efficient respective memory management, e.g., via memory management module 210f, can encourage users to use GUI window 305 as an indirect method for communicating with one another. Depositing and viewing items in various buckets may become not only a method for exchanging data directly between users, but also a tool for implicitly coordinating one another's progress without disrupting the behavior of local workspace programs (and consequently, each user's individual efficiency).

Example Client-Side Copy and Paste Operations

Figure 4:
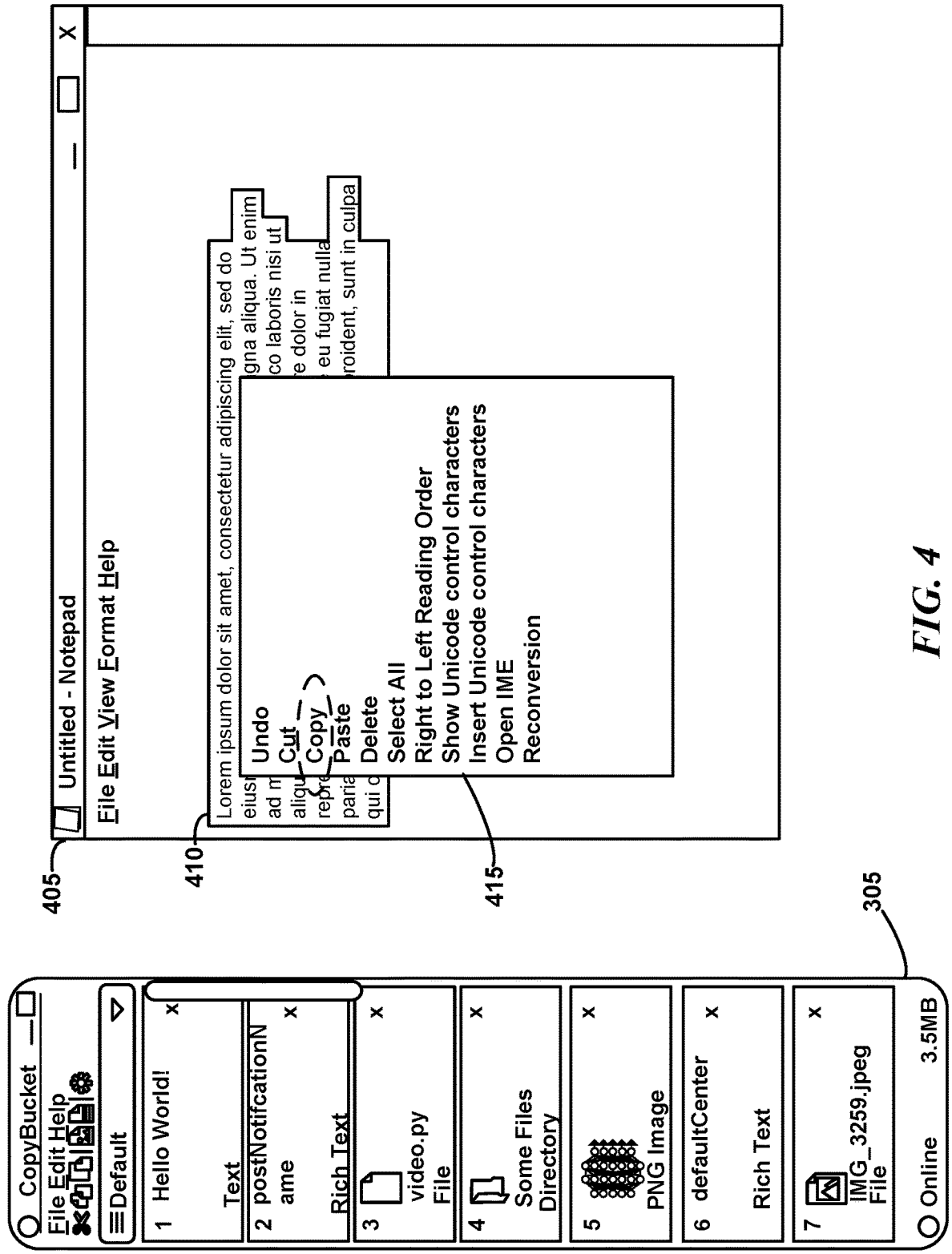
FIG. 4 is a schematic diagram illustrating an example client user screen during a portion of a copy-to-bucket process associated with a text editor in some embodiments.

FIG. 4 is a schematic diagram illustrating an example client user screen during a portion of a copy-to-bucket process associated with a text editor in some embodiments. For example, FIG. 4 may depict the user's screen in schematic fashion, wherein a window 405 corresponding to Microsoft Notepad™ includes text 410 (one will appreciate a number of text editors that may be used instead, e.g., Emacs™ Vi™ Microsoft Word™, etc.). The user has selected the text 410 and clicked with the right mouse button to present the option window 415 and then selected "copy" to place the text in the operating system clipboard member. While this visual, graphical approach is shown here to facilitate understanding, one will appreciate that different programs will facilitate disparate ways for moving data to the operating system clipboard, including, e.g., combinations of keypresses, dedicated keyboard keys, mouse gestures, etc.

Figure 5:
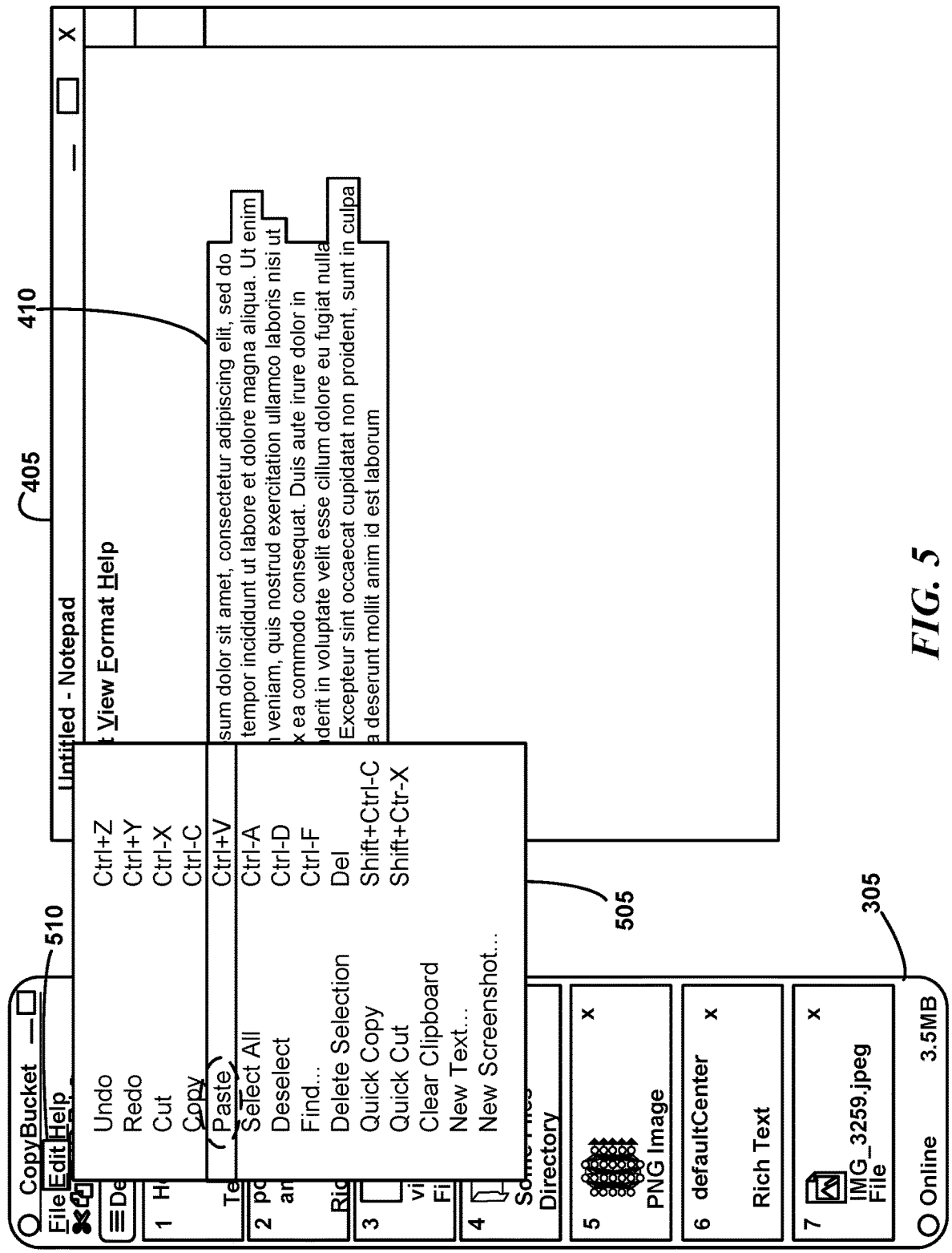
FIG. 5 is a schematic diagram illustrating an example client user screen during another portion of a copy-to-bucket process associated with the native text editor of FIG. 4 as may occur in some embodiments.

FIG. 5 is a schematic diagram illustrating an example client user screen during another portion of a copy-to-bucket process associated with the native text editor of FIG. 4 as may occur in some embodiments. Here, following the events of FIG. 4, the user has selected the "Paste" option from the Edit keyword 510 to produce an overlay 505. Again, one will appreciate that the user could have instead brought the window 305 into focus and hit the keyboard commands "control" and the letter "v," in some embodiments dragged the selected text to the GUI 305, etc.

Figure 6:
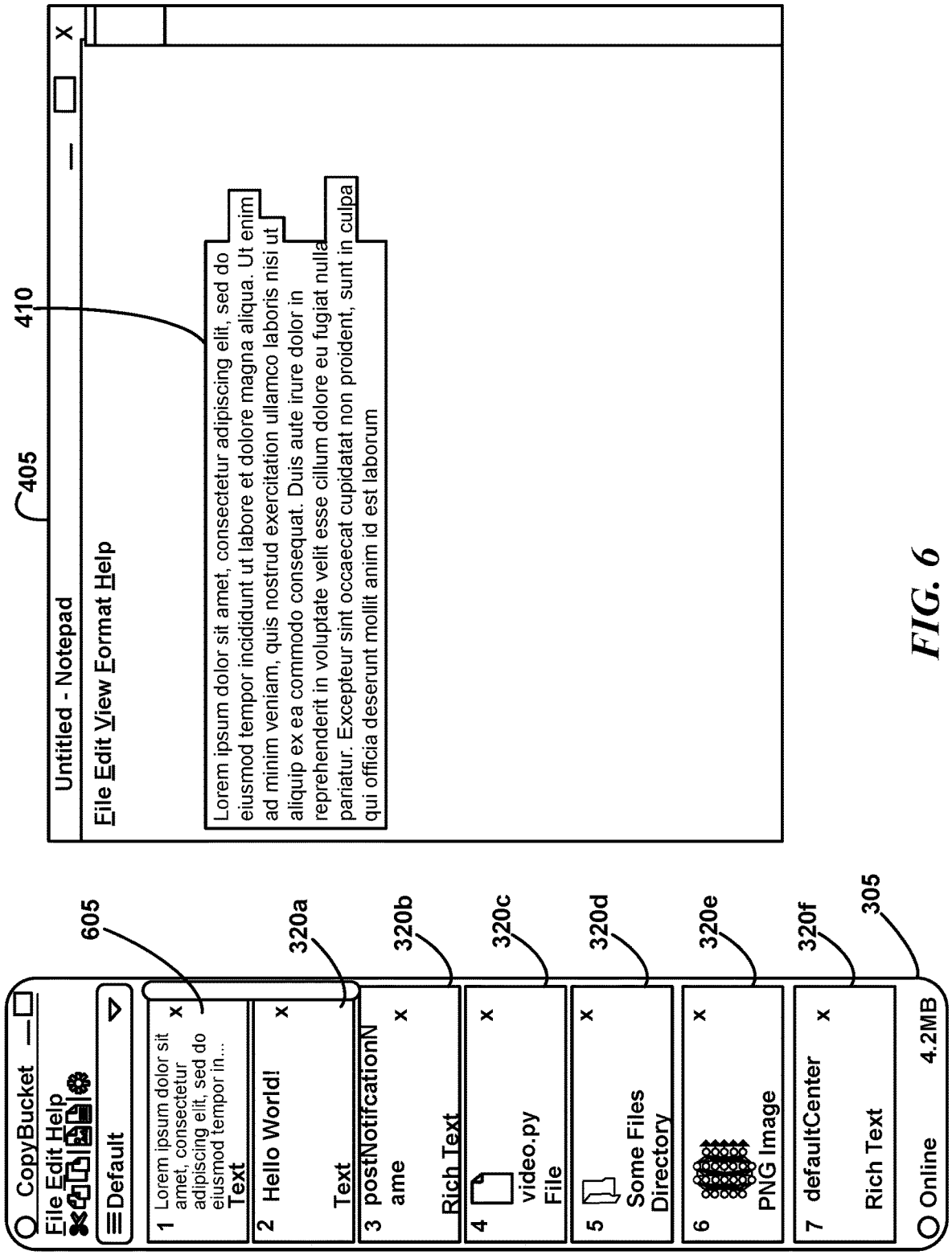
FIG. 6 is a schematic diagram illustrating an example client user screen during a completed portion of a copy-to-bucket process associated with the native text editor of FIG. 4 as may occur in some embodiments.

FIG. 6 is a schematic diagram illustrating an example client user screen during a completed portion of a copy-to-bucket process associated with the native text editor of FIG. 5. Here, the text data has been pushed to the top of the stack and item stack window 320 has been updated with a new item icon 605 corresponding to the new data object associated with the "Default" bucket. As explained previously, the remaining items have been moved to a "lower" position in the stack and their numerical indicator updated accordingly. In this example, the system associates the newly inserted data with the "Default" bucket as that bucket is presently selected. In some embodiments, various buckets may be associated with various datatypes and data inserted in the appropriate bucket, rather than simply the bucket presently selected. In some embodiments, such an insertion may cause the system to select the appropriate bucket and present the corresponding item icons in item stack window 320. Here, however, the text item is added to the top of the list of items at the first position and a preview is generated. If the text is too long to fit in the available space, the preview generated may be in the form of truncated text.

In some embodiments, the client software alone may recognize the nature of the data, while in some embodiment the client software may defer to the server system. In either case, the encoding and active programs may be used to infer the data type. In some embodiments, for an item introduced locally into the client software, the client software may perform the initial type determination based upon encoding formats, filename conventions, operation system parameters, etc. The client may communicate these findings to the server as metadata indicating what kind of data an item contains (e.g., txt, rtf, png, bmp, tif, file, etc.). A remote client may then recreate the data of the local environment based upon the item's raw data and metadata received from the server. For example, if the metadata says "txt", the remote client may interpret the data as a UTF-8 encoded byte array and recreate that string locally.

Figure 7:
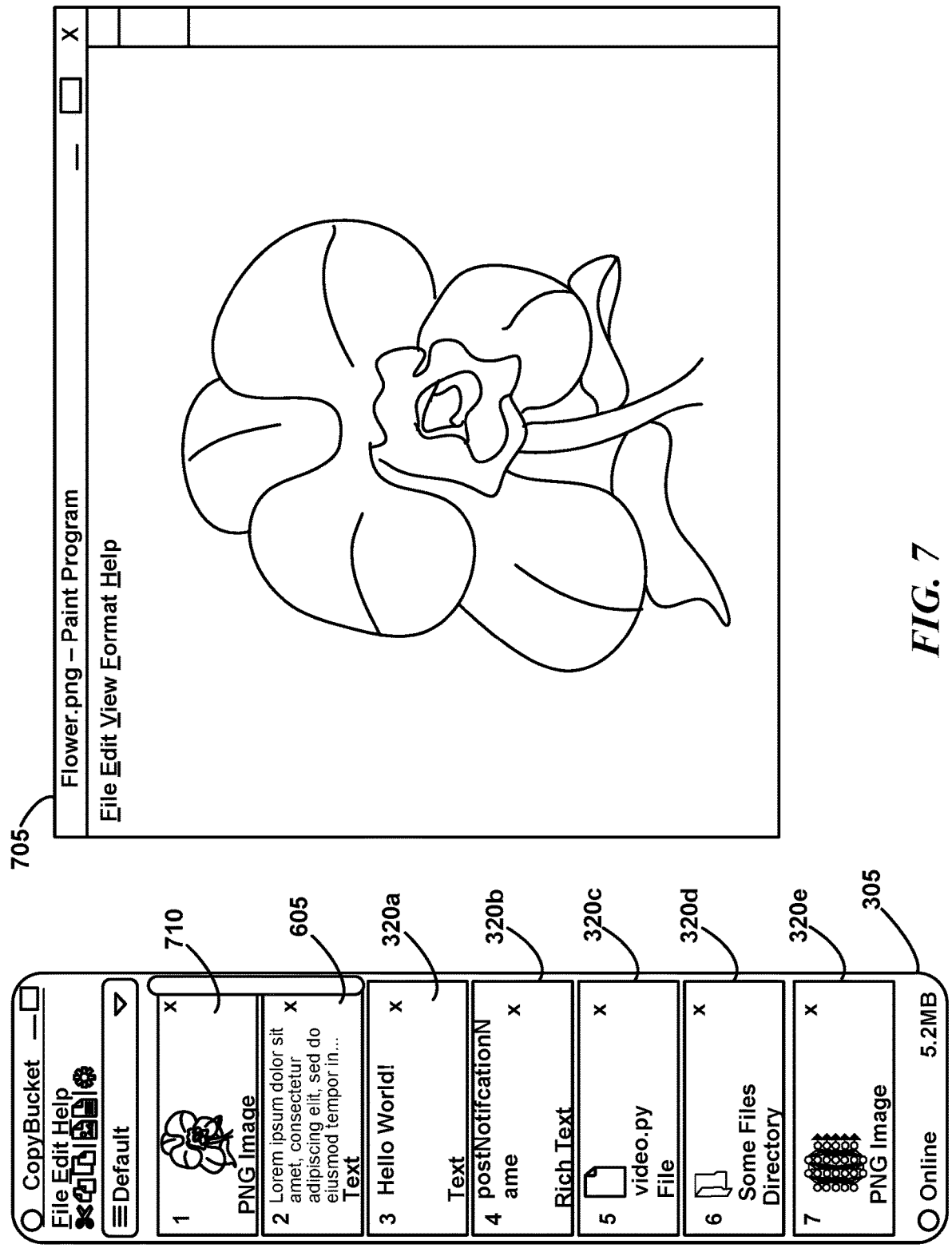
FIG. 7 is a schematic diagram illustrating an example client user screen during a portion of a copy-to-bucket process associated with a native image editor as may occur in some embodiments.
Figure 8:
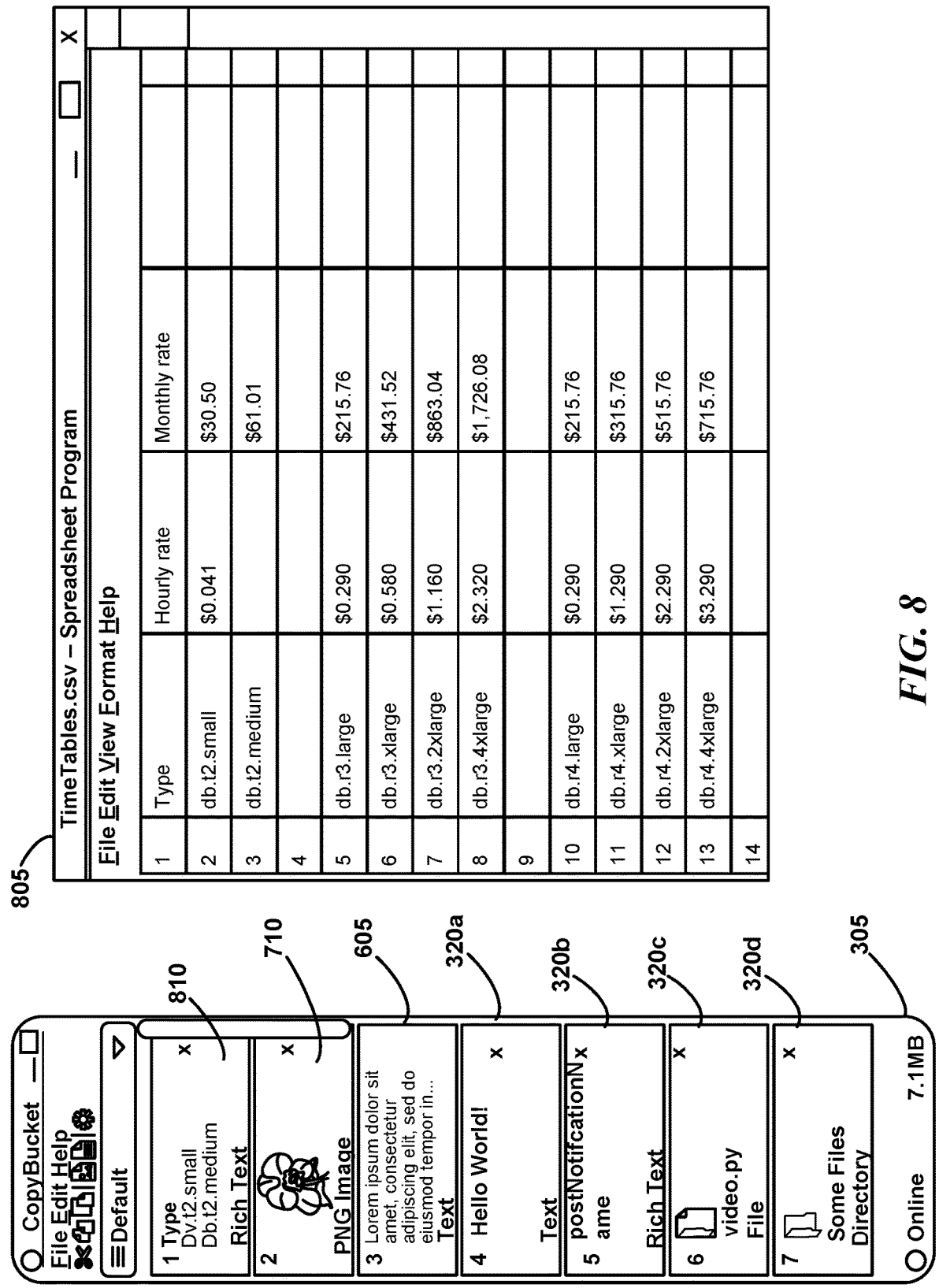
FIG. 8 is a schematic diagram illustrating an example client user screen during a portion of a copy-to-bucket process associated with a native spreadsheet editor as may occur in some embodiments.

One will readily appreciate that the operations of FIGS. 4-6 may be applied in the context of other programs and data types. For example, FIG. 7 is a schematic diagram illustrating an example client user screen during a portion of a copy-to-bucket process associated with an native image editor as may occur in some embodiments. Here, the user has copied an image of a flower from a paint program window 705 to the client software. For example, the user may have copied the entire image from the desktop, or may have selected a pixel subset via the editor and pasted the subset into the client software program. Again, the client software program has updated the stack window 320 to include new item icon 710 corresponding to the image data. Similarly, FIG. 8 is a schematic diagram illustrating an example client user screen during a portion of a copy-to-bucket process associated with a native spreadsheet editor as may occur in some embodiments. In this example, the user selects a number of cells in a spreadsheet program window 805, copies them to the operating system clipboard and then pastes them to the clipboard item container GUI 305, precipitating the creation of the new icon 810. Analogous operations may be performed by copying and pasting folders and files from the operating system's file manager, terminal text, etc. As discussed in greater detail below, these spreadsheet values may be sent to another client software instance on another device via the server system 150. The other device's user may then copy the cells from the item container and paste them into another spreadsheet software instance or other suitable receiving program. In this manner, the users may seamlessly move a portion of spreadsheet data between computer systems.

One will appreciate that data may be moved from the clipboard item container GUI 305 to a program on the operating system by performing operations in the opposite direction. For example, the user may click on one or more items in the clipboard item container stack window 320 and choose "Copy" (either through a program menu, context menu, button, keyboard shortcut, drag-and-drop operations with a mouse, or toolbar button). The client program may then load these items into the local operating system's clipboard. The user may then switch to another program and select the "Paste" action within that program (again, via a graphical interface, via keyboard commands, drag-and-drop operations with a mouse, etc.). The item(s) may then be pasted into the program (e.g. word processor, desktop publishing software, image editing program, code editor, etc.).

Figure 9:
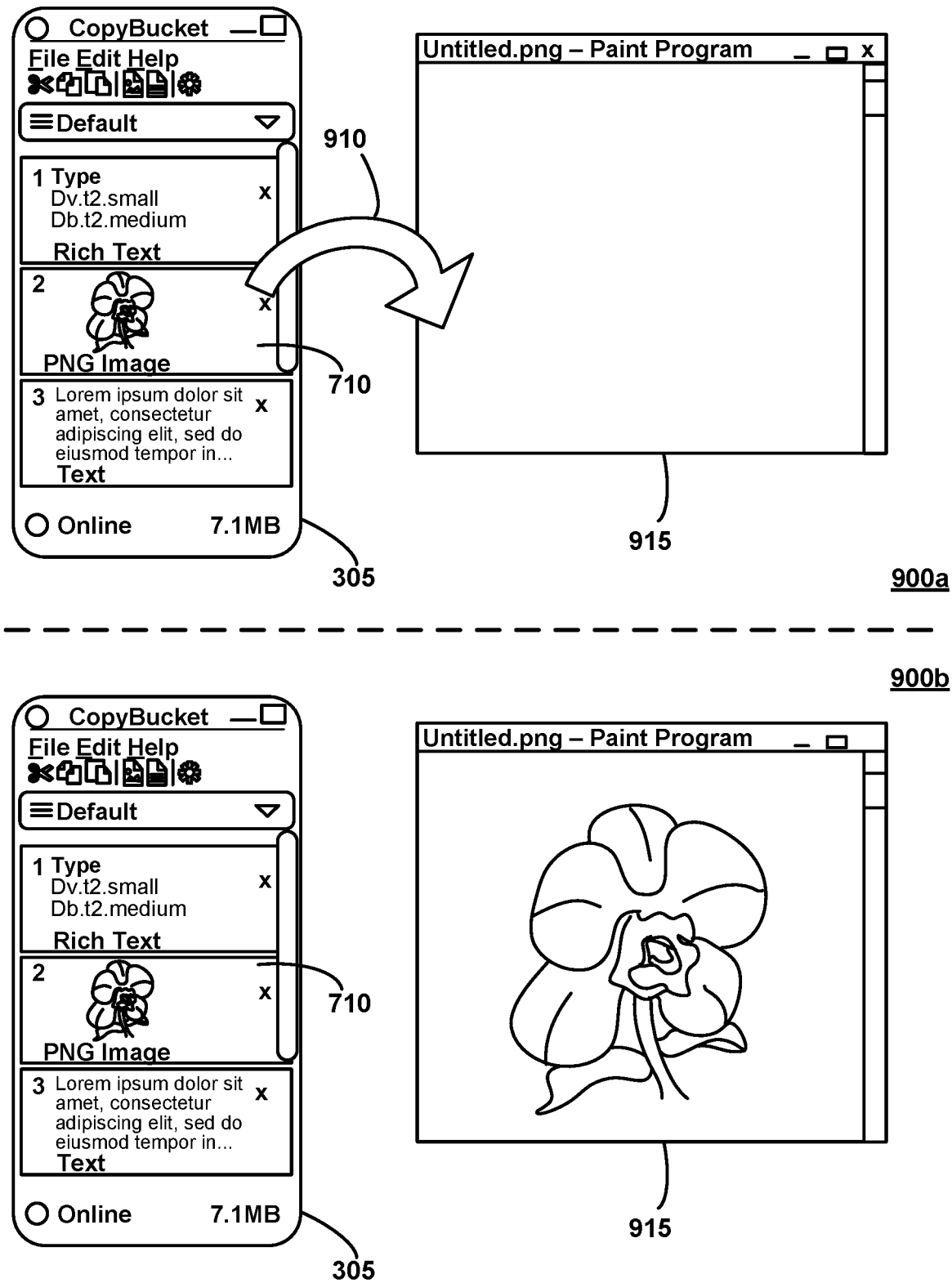
FIG. 9 is a collection of schematic diagrams illustrating an example client user screen during a portion of a paste-from-bucket process associated with an image item as may occur in some embodiments.

To facilitate understanding, FIG. 9 is a collection of schematic diagrams illustrating an example client user screen during a portion of a paste-from-bucket process associated with an image item as may occur in some embodiments. Initially at state 900a, an image editing program 915 may present an empty image layer. The client GUI 305 (shown here with a reduced vertical height to facilitate illustration) may be presented on the same screen. The user may select the PNG image data object via icon 710 and indicate a desire to transfer 910 (via a cut or, as shown here, copy operation) the data object to the native operating system memory and then to the program 915, or, in some embodiments, to the program 915 directly. For example, the user may use a quick cut or quick copy operation as described elsewhere herein. The user may select the icon 710 and copy its contents to the operating system's clipboard memory (e.g., using the "CTRL-C" keyboard command), select the program 915's window and then paste the clipboard memory (e.g., using the "CTRL-V" keyboard command). In some embodiments, the user may transfer 910 the data object by selecting the icon 710 with their mouse and dragging it directly to the window of program 915. Once transferred, the native operation may process the pasted data as it would do so normally. Here, for example, in state 900b, the program 915's window now reflects the data object's image data. Had a cut, rather than copy, been performed, item icon 710 would be removed and the stack adjusted.

Example Data Object Management

Figure 10:
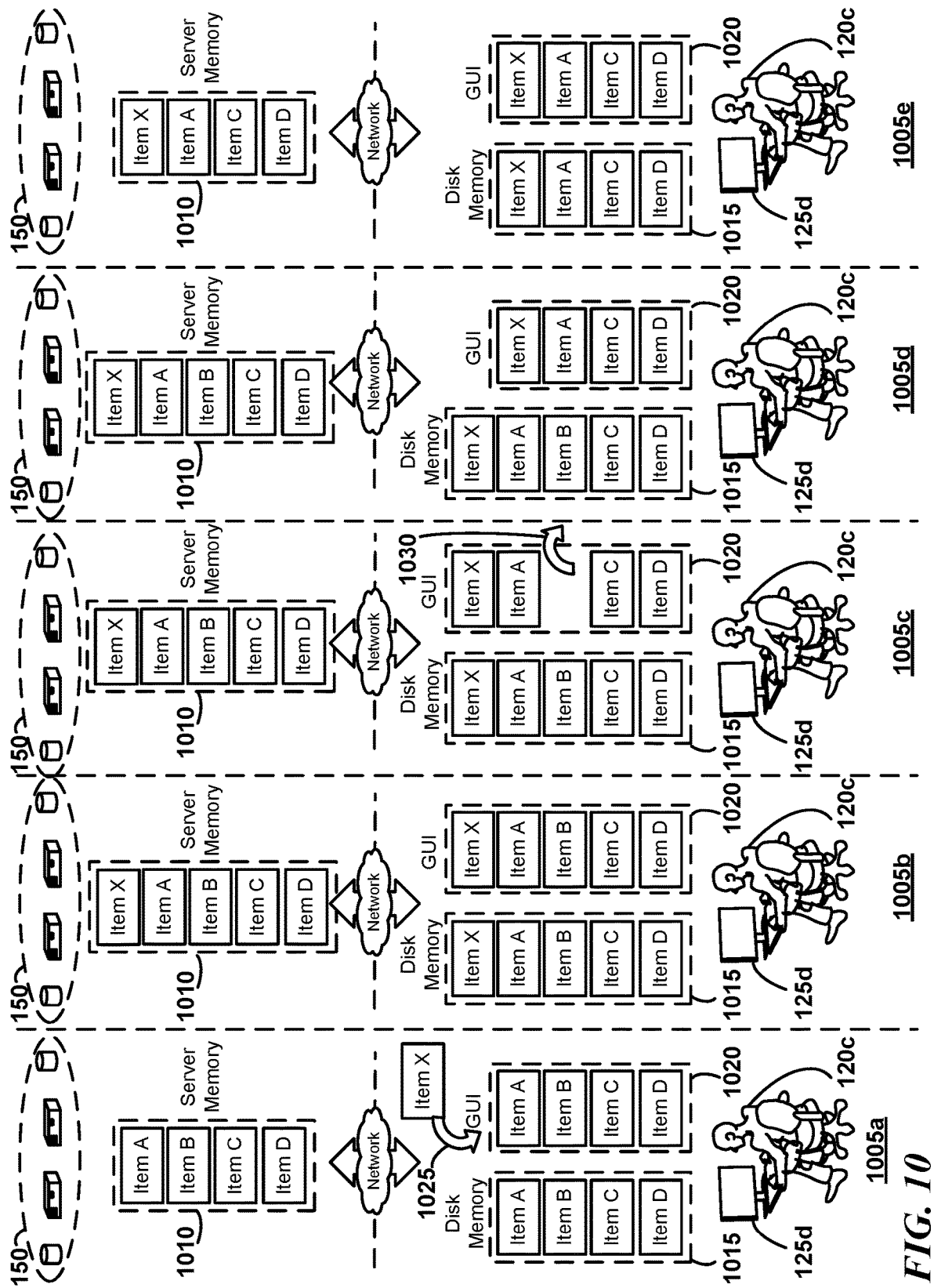
FIG. 10 is a collection of schematic diagrams illustrating configurations in server and client-side devices during various insertion and removal operations as may occur in some embodiments.

FIG. 10 is a collection of schematic diagrams illustrating configurations in server and client-side devices during various insertion and removal operations as may occur in some embodiments. Initially, at a time 1005a, a user 120c may be working on a local computer system 125d, using a bucket management program, e.g., with GUI 305, to store or exchange data objects, such as files, folders, or portions of files (substrings of text in a text file, pixels from an image, cells from a spreadsheet, etc.), with other users. In this initial state, the user's previous actions, or items received from other users, may have resulted in the client-side's bucket management program's Disk Memory 1015 and GUI icon display 1020 (e.g., the icon order appearing in item stack window 320) being as shown in at time 1005a.

That is, local computer system 125d may allocate Disk Memory 1015 for the bucket program to store data objects represented here as Items A, B, C, D. Similarly, the GUI display may show icons corresponding to each of Items A, B, C, and D. Note that the local storage need not mirror the linear ordering of the GUI icons. For example, in some embodiments, a single data object's data may be distributed across different portions of local computer system 125d's disk memory, e.g., in chunks. Hash functions and compression techniques may be used for storing and retrieving object data, locally and at server system 150. Server system 150 may also reflect the current client's state by retaining copies of the data objects in server memory 1010 (e.g., a long-term storage disk memory). For example, raw item data may be stored in data store 140b and metadata regarding the items in database 140a, such as their size, data type, bucket correspondence, bucket position, etc. Metadata may include a hash index, indicating where distributed chunks of a data object copy appear in the server memory or database.

The user 120c may introduce 1025 a new data object, shown here by Item X, into the bucket management program (e.g., by dragging and dropping a file). This may precipitate a change in state as shown at time 1005b. Here, a new icon for Item X appears in the GUI 1020 at a topmost position of the sequential order. Similarly, the raw data for Item X has been stored in the local disk memory 1015 and may also include metadata indicating Item X's bucket correspondence, data type, etc. The raw data and accompanying metadata may also be replicated in the server memory 1010. In some embodiments, Item X's data and metadata may also be pushed to other peers sharing the bucket. Data object and bucket replication between server system 150 and local computer system 125d may facilitate various operations, including caching operations, recovery operations, redundancy capabilities, and data integrity verification.

For example, when a user removes an item, e.g., cuts or deletes 1030 Item B from the local GUI 1020 at time 1005c, the local GUI representation may indeed remove the Item as shown at time 1005d. The metadata associated with Item B may be updated at both the local computer system 125d and server system 150 to reflect the removal (e.g., an index relating data objects to buckets may be updated). This change may likewise be pushed to metadata and GUI representations on client systems sharing the bucket.

However, in some embodiments, the local disk memory 1015 and the server memory 1010, and in some embodiments peer device's memory, may retain Item B's data. This retention may facilitate recovery operations (e.g., an undo operation) either by the user 120*c* or a peer. During such recovery, the GUI 1020 may be adjusted to reintroduce an icon associated with Item B.

In some embodiments, various metrics may be used to finally remove data, e.g., as shown at time 1005*e* where Item B has been removed from both the disk memory 1015 and GUI 1020. In some embodiments removal may proceed in stages based, e.g., on caching expectations in the event of a recovery operation. For example, the retained data may be removed from peer data after a first delay has elapsed without a recovery operation. If, after a second delay, the data continues not to be recovered, then the copy on the computer system 125*ds* disk memory 1015 may be removed. Finally, after a third delay the item may be removed from the server memory 1010, thereby making recovery impossible. One will appreciate that a different order of removal may be applied in some embodiments, depending on the functionality being optimized.

To facilitate understanding with respect to the distinction between data content storage and item representation during deletion, this example indicates the presence of item data in disk memory 1015 simply. However, as discussed, e.g., with respect to FIGS. 13 and 14, one will appreciate that the client software may further distinguish between storing item data exclusively in local quick-access memory (e.g., RAM), exclusively in local disk storage memory (e.g., a local hard drive), storing data in both, or in neither in favor of server-side quick-access or disk storage memory. The representation in GUI 1020 may perform independently in each of these cases, e.g., as described in this example (e.g., the GUI may remove the item's icon from the user's view even though the item's data remains at one or more of these locations).

Example Process Operations

Figure 11:
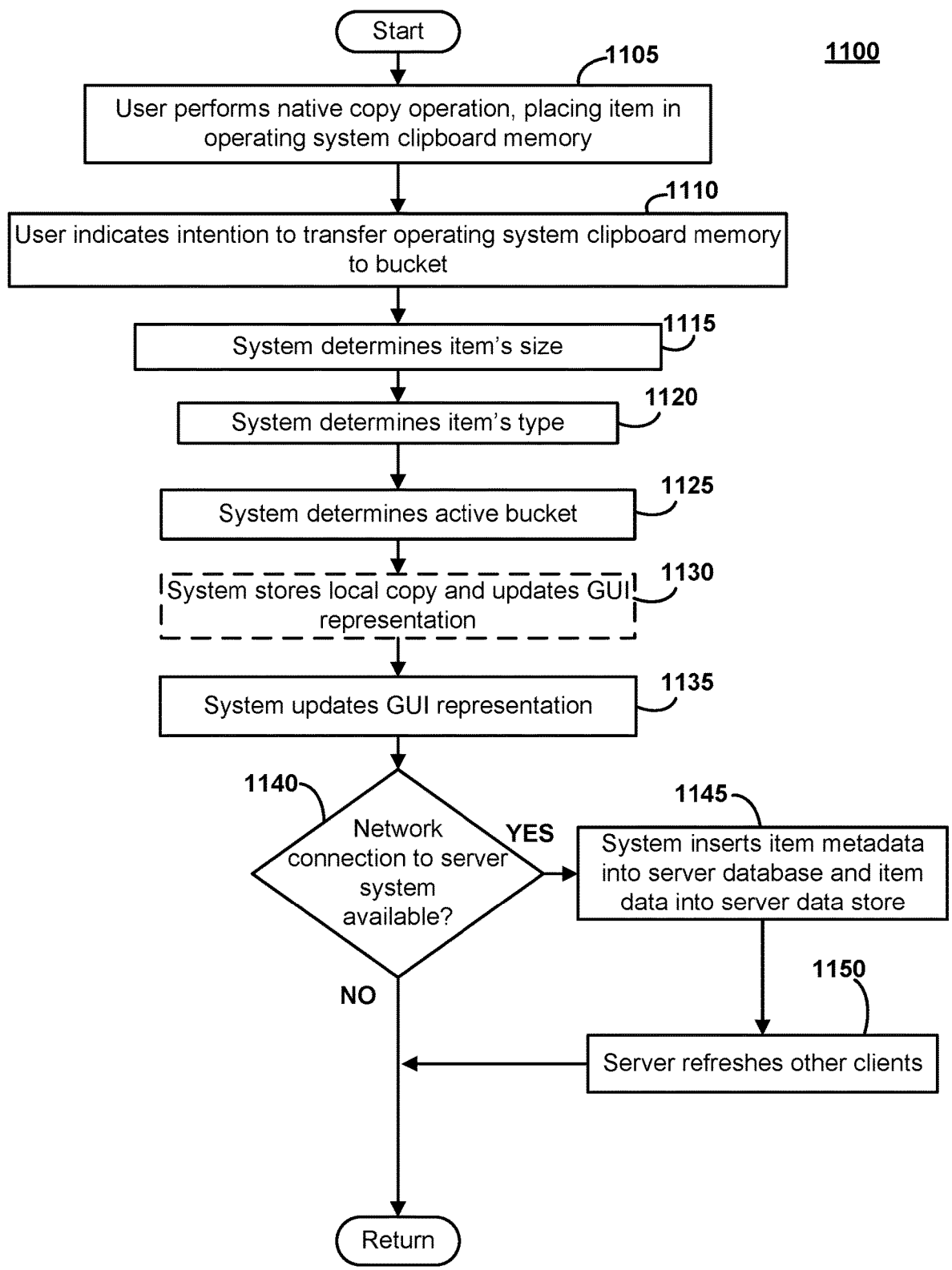
FIG. 11 is a flow diagram illustrating various operations in an example copy-to-bucket process as may be implemented in some embodiments.

FIG. 11 is a flow diagram illustrating various operations in an example copy-to-bucket process 1100, e.g., as described above in FIGS. 4-8, as may be implemented in some embodiments. As indicated, many of the operations may be performed at the client software in this example. At block 1105, the user may perform a copy operation native to the application running on the operating system, thus placing the data in the operating system's clipboard memory. For example, in the Notepad™ text editor, the user may select text and press the "control" key and the letter "C" key simultaneously.

At block 1110, the user may manifest their intention to transfer the data in the operating systems' clipboard to the bucket. For example, the user may select the client application window GUI, select the desired bucket, and press the "control" key and the letter "V" key. As indicated in FIG. 5, the user may also use the window's "Paste" option from the Edit keyword 510, to move the operating system clipboard data into the bucket. Similarly, in some embodiments, the user may drag and drop items to the bucket window.

At blocks 1115 and 1120, the client software system may acquire the native operating system data and begin interpreting the item's properties. For example, the client software system may determinate the data size and type of the data. At block 1125, the system may note the active bucket with which the item is to be associated. At block 1130, the client software system may store a local copy of the data object (e.g., using hashes and chunks). However, in some embodiments, e.g., those where local memory is limited on the client device or the data objects are large, this block may be omitted in favor of exclusively server or peer-side storage. At block 1135, the client software system may update the GUI to reflect the new data object's icon within the relevant bucket (note that no visible update may occur in some embodiments if the relevant bucket is not selected).

If the client software determines that a network connection with the server system 150 is available at block 1140, e.g., if the user has not disconnected the connection with the server and the network is still online, then at block 1145, the client software may transmit the item data and metadata for insertion into the server system 150's databases. For example, metadata may be placed in a database 140*a* and item data placed in a data store 140*b* (such as Amazon Web Service S3™) Database and datastore separation of data in this manner may facilitate more efficient access management at the server. Although not depicted in the diagram, when the client cannot access the server system 150, in some embodiments, the client may store the item locally at block 1130 until a follow up attempt to connect with the server is successful. Subsequently, when the client software connects with the server system 150, the locally stored items may be pushed to and, and reconciled, with the server data.

At block 1150, the server system may similarly direct peer users' GUIs to depict the presence of the new item in the bucket. In some embodiments, the refresh is performed following server confirmation that the new item has been successfully stored. However, the refresh may instead occur once the local copy has been created, or after the data was transmitted to the server. At block 1145, the server may likewise direct peer clients to refresh their bucket representations to reflect the change.

Figure 12:
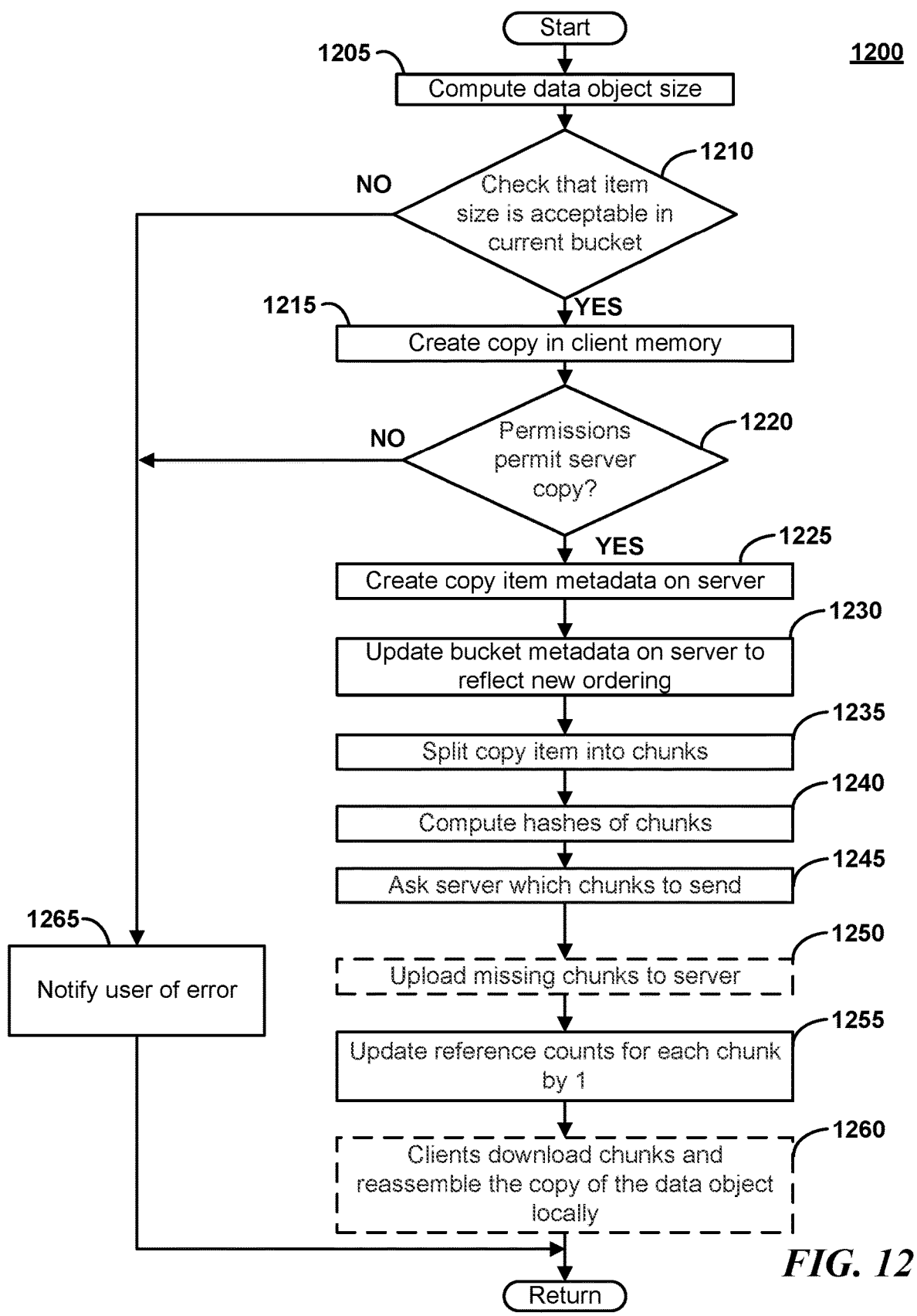
FIG. 12 is a flow diagram illustrating various operations in an example copy-to-bucket process using data chunks as may be implemented in some embodiments.

While FIG. 11 indicates common operations to some embodiments, more refined interactions between the client software and server software may be performed to facilitate memory efficiency in some embodiments. The operations may also be refined to enforce various permission levels and privacy settings. For example, FIG. 12 is a flow diagram illustrating various operations in an example copy-to-bucket process 1200 using data chunks as may be implemented in some embodiments. Following receipt of the user's indication to introduce a data object into the bucket, at block 1205, the client software system may determine the memory size of the data object. If the size is determined to be acceptable at block 1210 for the user's data plan (for example, by consulting account data, such as quotas, for the user at an account management server or account management module 215*b*), then the client-side application may proceed to block 1215, and make a copy of the data object in the client device memory (this copy may or may not be "chunked" as described below). If the user's account does not permit the data object's size, then the client-side software may notify the user of the error at block 1265, before returning.

At block 1220, the client or server software may also check to see if the user's permissions permit placement of a copy on the server system, generating an error notice if not. If the permissions are in order, then at block 1225, the client program may push the data object's metadata to the server and cause the server to update the bucket's metadata to reflect the data object's addition at block 1230.

In some embodiments, rather than uploading raw data object data to the server, the raw data may be divided into "chunks" to facilitate management operations, security operations, and to provide storage efficiency via de-duplication. In this manner, e.g., if multiple data objects share similar sequences of bytes, the storage may be compressed such that only one copy of that sequence need reside on the server or client. Accordingly, at block 1235, the system may determine chunks in the data object (e.g., separating the data object into sequence of bytes within a sliding window or searching the data object for matches with previously identified chunks). The client system may compute hashes for the chunks at block 1240 (e.g., performing an MD5 hash). These hashes may then be used to determine if preexisting copies of these chunks already reside on the server at block 1245. For those chunks which are absent from the server, the server may create a copy at block 1250.

The server may then update its records to reflect the addition of the copy object in its memory. For example, at block 1255, the server-side system may update the reference count for chunks (both preexisting and newly created at block 1250) associated with the data object. Peer devices monitoring the bucket may then be updated at block 1260, receiving a copy of the data object, either by transmitting chunks for local assembly, or transmitting the whole data object, for the peer system's local use.

Example Memory Management—Memory Threshold

Figure 13:
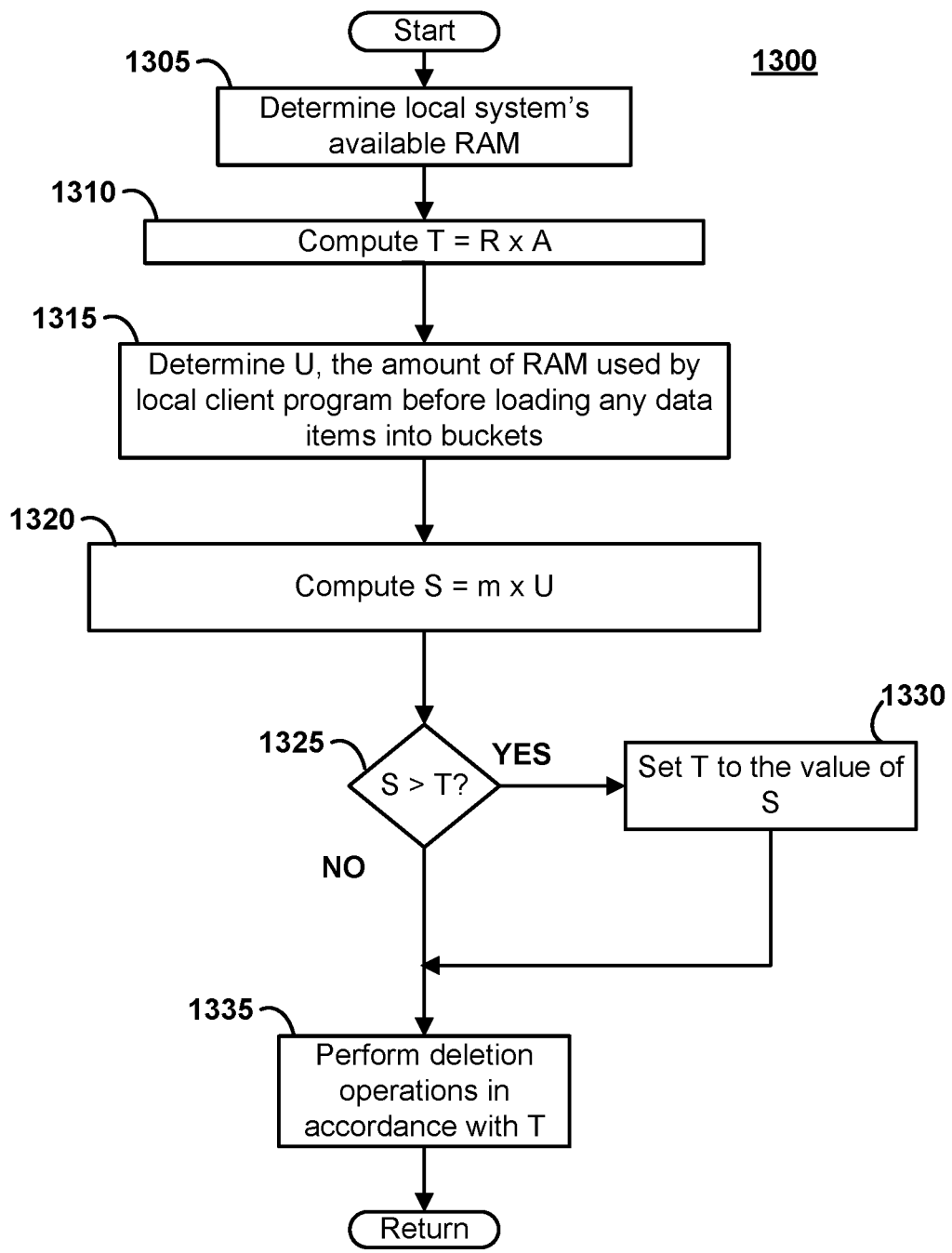
FIG. 13 is a flow diagram illustrating various operations in an example memory management threshold determination process as may be implemented in some embodiments.

In various embodiments, the client or server systems may enforce constraints on item storage in quick-access memory (e.g., a local computer's RAM memory) as opposed to slower, long-term storage (e.g., on a local computer's disk memory, an external hard drive, or on a server memory). FIG. 13 is a flow diagram illustrating various operations in an example memory management threshold determination process 1300 as may be implemented in some embodiments, e.g., at memory management module 210*f*. At block 1305, the system may determine the local device's total quick-access memory (e.g., RAM) capacity. At block 1310, the system may determine a threshold T, indicating the maximum allowable usage of quick-access memory by the bucket-management programs (this threshold may be imposed for all buckets, or for items in only a single bucket, in different embodiments) as the product of the total available local quick-access memory R and an proportional factor A. In some embodiment's, A may be set by the user, determined by the system based on local workspace program requirements, or inferred over time. Some values of A may be selected based on R and empirically determined ratios. Thus, for example, with a proportional factor A of 10% and 2 GB of RAM, the threshold T may be 200 Megabytes.

At block 1315, the system may determine U, the amount of quick-access memory used by the client bucket management program alone, absent the bucket data. At block 1320, U may be scaled by a factor m to anticipate bucket items to create a final memory footprint S. In some embodiments, m may be set to 2 at all times, as this number has provided viable performance results during experimentation under different workspace environments. However, in some embodiments, m may be determined based upon the quick-access memory usage of other presently running programs on the client device or user preferences (e.g., computationally intensive graphics programs). Accordingly, U may vary over time in some embodiments. In some embodiments, m is required to be greater than one.

At block 1325, the system may determine if S is greater than T, and if so, set T to S at block 1330. The threshold T may then be used at block 1335 to determine how many items to remove from quick-access memory. For example, block 1335 may be the process 1400 described in greater detail below.

Example Memory Management—Deletion Prioritization

Figure 14:
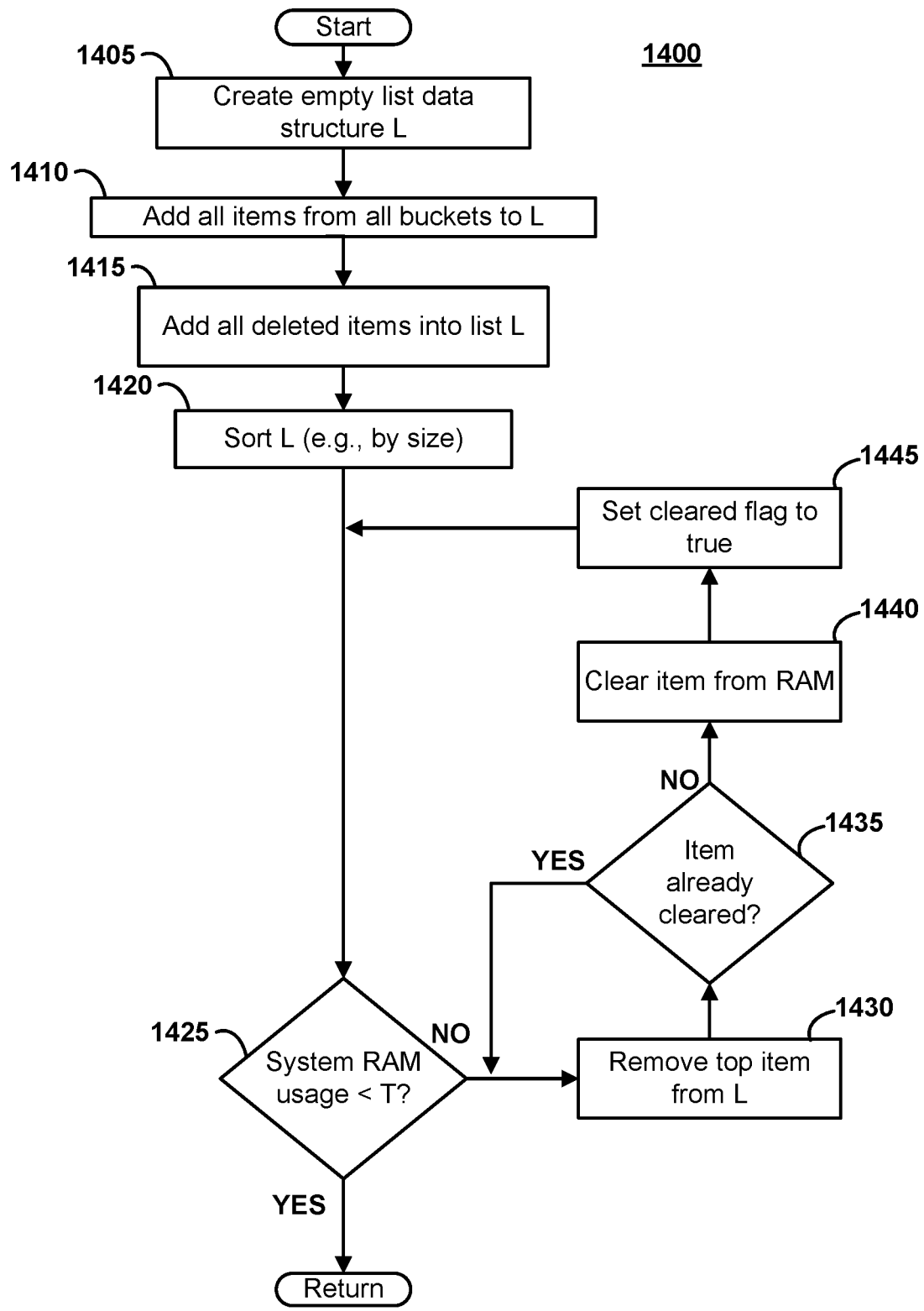
FIG. 14 is a flow diagram illustrating various operations in an example threshold-based memory reallocation process as may be implemented in some embodiments.

FIG. 14 is a flow diagram illustrating various operations in an example threshold-based memory reallocation process 1400 as may be implemented in some embodiments. The process may be used prevent the client program from using too much RAM so as to remain respectful of a system's resources (e.g., to accommodate usage of other workspace programs). This may be done by clearing from RAM memory low-priority data items and restoring them back into RAM when the user needs them.

Process 1400 may be run as a background process in some embodiments, performing operations as buckets change and T takes on new values. For example, the process may be run when items are added (pasted, drag-and-dropped, etc.) into a bucket. At block 1405, the system may create a new empty list L and may add all the items from all the buckets into L at block 1410. One will appreciate that L may simply be a logical structure and that the items need not be physically "moved." At block 1415, the system may additionally add all the deleted items into the list L. Accordingly, after block 1415, all of the user's data items, including recently deleted ones, may be in one large list data structure called L.

At block 1420, the system may sort L by size, e.g., placing the largest items first. Though sorting by size is depicted in this example, there are several factors that may be used to sort the items, including: the last used timestamp (e.g., when the item was created, copied, deleted & restored, moved, or touched in any way); bucket association(s) (e.g., items associated with buckets not currently being or recently used by the user, may be more likely to be cleared); position within bucket (e.g., items lower in the stack may be more likely to be cleared); and items associated with a deleted flag (e.g., items in a temporary list of deleted items, which is used when in "Undo" operations are performed). Note that as items are copied, pasted, deleted, restored, re-ordered, etc., their "last used" timestamp may be updated to the current time.

For so long as the bucket management program's quick access memory usage exceeds T at block 1425, the system may remove the topmost element from the list (the element least favored per the above criteria) at block 1430 and determine if it has been cleared at block 1435. If the item has already been cleared, the next element may be removed from the list L at block 1430 either until no items remain in the list, or an uncleared item has been found. Uncleared items may be removed from quick access memory at block 1440 and their corresponding cleared flag updated at block 1445. To reiterate for clarity, clearing items from RAM results in their being stored elsewhere (local computer disk memory, server memory, etc.) and the in-GUI preview will continue to depict the item within its bucket.

Example Multiple Item Paste Handling

Figure 15:
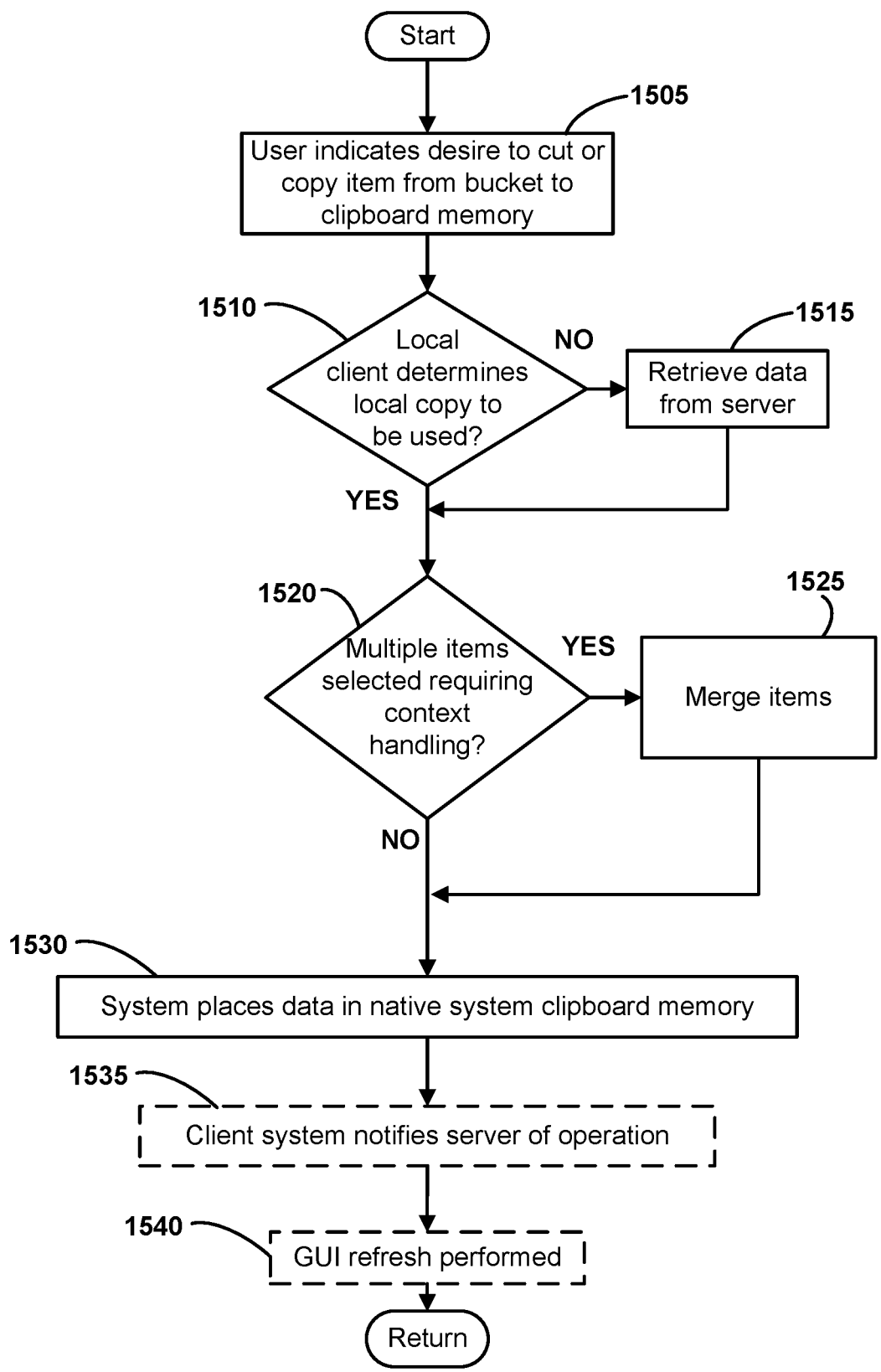
FIG. 15 is a flow diagram illustrating various operations in an example paste-from-bucket process as may be implemented in some embodiments.

FIG. 15 is a flow diagram illustrating various operations in an example paste-from-bucket process as may be implemented in some embodiments. These operations may be performed when the user copies or cuts data from a bucket and moves it to an operating system program. At block 1505, the user may indicate their intention to copy or cut an item from a bucket. For example, the user may click and drag the item in the GUI, the user may press keyboard controls, such as "Control" and "C" to copy after selection the item or "Control" and "X" to cut after selecting the item, etc.

At block 1510, the client software may determine whether to use a local copy of the item data to perform the requested operation, or to retrieve data from the server at block 1515. For example, if the data is not available locally, the client software system may need to warn the user that the operation cannot be performed until the server is available. Conversely, if the data is available locally and a network connection with the server is unavailable, the client may use a local copy of the item's data to perform a copy operation.

If the server is unavailable and a cut operation is performed, the client software may note the update and notify the server once the connection is reestablished. It may not be necessary, e.g., to notify server of successful copy operations. However, as successful cut operations change the contents of the bucket, the client software may notify the server. The server system may communicate such updates to other shared or mirrored buckets as discussed in greater detail herein.

In some embodiments permitting selection of multiple items in the client GUI, at block 1520, the system may determine if the multiple icons require context handling, e.g., where disparate types of items are selected for placement on the native operating system clipboard. If such a multiple selection has been made, then at block 1525 the system may merge and prepare the items for clipboard placement, e.g., using the process discussed herein with respect to FIG. 16 (one will appreciate that portions of FIG. 16 may include operations in block 1530).

At block 1530, the client software may proceed to move the data to the native operating system clipboard. From here, the user may paste the clipboard data into their native program of choice (e.g., a text editor, image editing program, etc.). In some embodiments, dropping the icon into a program may precipitate a direct introduction from the native clipboard memory into that program. At block 1535, the client software may notify the server of the operation. Such notification may be important where a cut was successfully performed, so that the server may update the bucket stack. In some embodiments, such notification may occur simultaneously with the data retrieval at block 1515. Successful or failed copy operations may also be communicated to the server, e.g., so that the server may anticipate future caching priorities. The server may, e.g., direct the client software to more prioritize the caching of frequently copied items locally over less frequently copied items. A cache may also be implemented at the server system 150 to avoid database lookups for frequently requested data. In some embodiments, rather than hold all the data in RAM, the system may push data to disk, or reload data into RAM on-demand as needed. In some embodiments, the client software may offload rarely referenced data to the server system 150 when the server system 150 is available.

At block 1540, the client software may refresh the GUI. This may not be necessary for a copy operation, but may be performed following the cut operation to reflect the change in item placement within the bucket stack.

Example Multiple Item Paste Merge Handling

Figure 16:
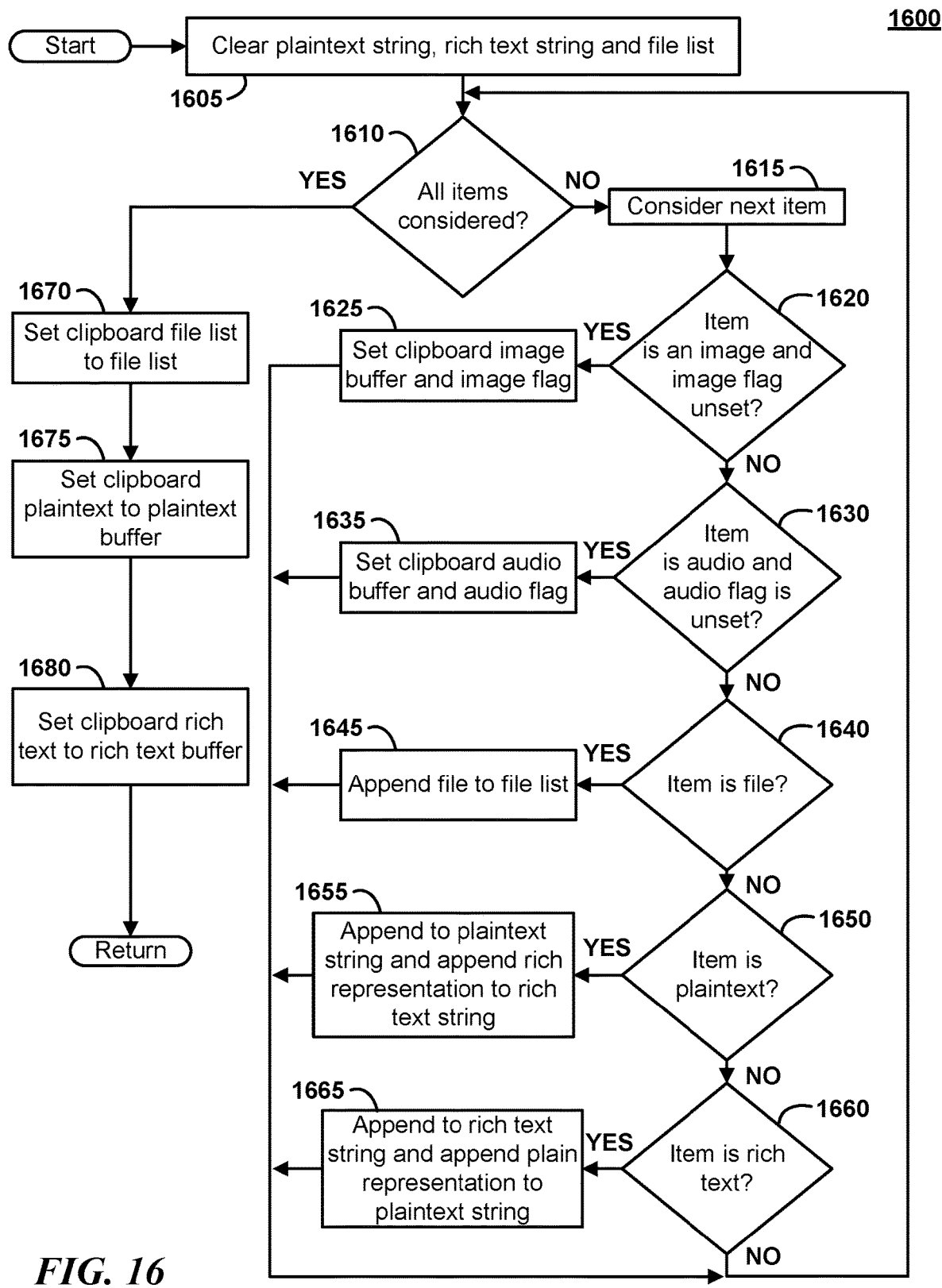
FIG. 16 is a flow diagram illustrating an example multi-item paste process as may be implemented in some embodiments.

FIG. 16 is a flow diagram illustrating an example multi-item paste process 1600 as may be implemented in some embodiments. On the macOS™ operating system, the local clipboard may have separate fields for audio, image, and text data and may permit multiple items of the same type to be placed on the clipboard. Windows™ may permit placement of only a single item of each type on the clipboard. Thus, multi-item pastes may need to consider the particular operating system's clipboard structure.

At block 1605, a variety of temporary field values associated with the native operating system's clipboard may be cleared, including a plaintext string, rich text string, and file list. Until all the items selected by the user for pasting are considered at block 1610, the system may consider the next unconsidered item at 1615. Based on the type of the item, the system may then adjust the temporary fields in anticipation of transfer to the native operating system clipboard. For example, if the current item is determined to be an image at block 1620 or an audio file at block 1630, then the corresponding image or audio buffer, as well as the field flags may be set at blocks 1625 and 1635 respectively. The audio and image field flags may be used to ensure that the first encountered item of the image and audio types is placed in the buffer and not overwritten by a subsequent item. This may accommodate user expectations that the first such selected item will be transferred to the clipboard, though one will appreciate variations based on other expectations.

In contrast to the limited audio and image buffers, if a file item, plaintext item or rich text item is encountered at blocks 1640, 1650, or 1660, respectively, then they may be appended to any preexisting values in the corresponding temporary fields at blocks 1645, 1655, and 1665, respectively. Once all the items are considered at block 1610, at block 1670, the system may set the native operating system's clipboard file list to the temporary file list. Similarly, at block 1675, the system may set the native operating system clipboard plaintext field the contents of the plaintext buffer and at block 1680, the system may set the native operating system's clipboard rich text field to the contents of the rich text buffer.

Thus, if the user selected several items in a bucket (some text, rich text, and images), then dragged and dropped them into a word processing program, the word processing program may consult the native operating system's clipboard fields to insert them appropriately into the document.

On some native operating systems, e.g., Windows™, the native operating system clipboard may only contain one item of each type. For example, the system may place some text, a bitmap image, and some audio on the native clipboard, but you cannot have two text entries, or two bitmap images, or two audio items. Accordingly, some embodiments may merge items of the same type into a single, larger item to be placed on the native clipboard field (e.g., concatenating strings and images). In other embodiments, only the first item may be placed in the native clipboard field.

In some embodiments, rich and plaintext items may both be concatenated together so as to accord with user expectations. There is also another type of items that can be placed on the clipboard in Windows, called a "file drop list" including a list of strings representing file paths in the file system. Like text strings, these may also be concatenated.

Similarly, if multiple file/directory items are selected, some embodiments combine all of the items into a file drop list and place that file drop list onto the native clipboard. The receiving applications can then access all of the files/directories at once.

In some operating systems, when selecting a file in the native operating system and "Copying" it to the clipboard, the operating system copies only the path of the file (and similarly for a folder, only the path to the folder) is copied to the clipboard (not its content). Upon paste, it is then the responsibility of the receiving program to look at the path in the clipboard and go read/copy data at that path. In this case, the client software system, when pasting a file, may look at the path in the clipboard and copy the entire file locally to a hidden data folder. This raw data and the accompanying determined metadata may then be sent to the server (or simply the raw data sent and the metadata determined at the server).

Example Item Removal Handling

Figure 17:
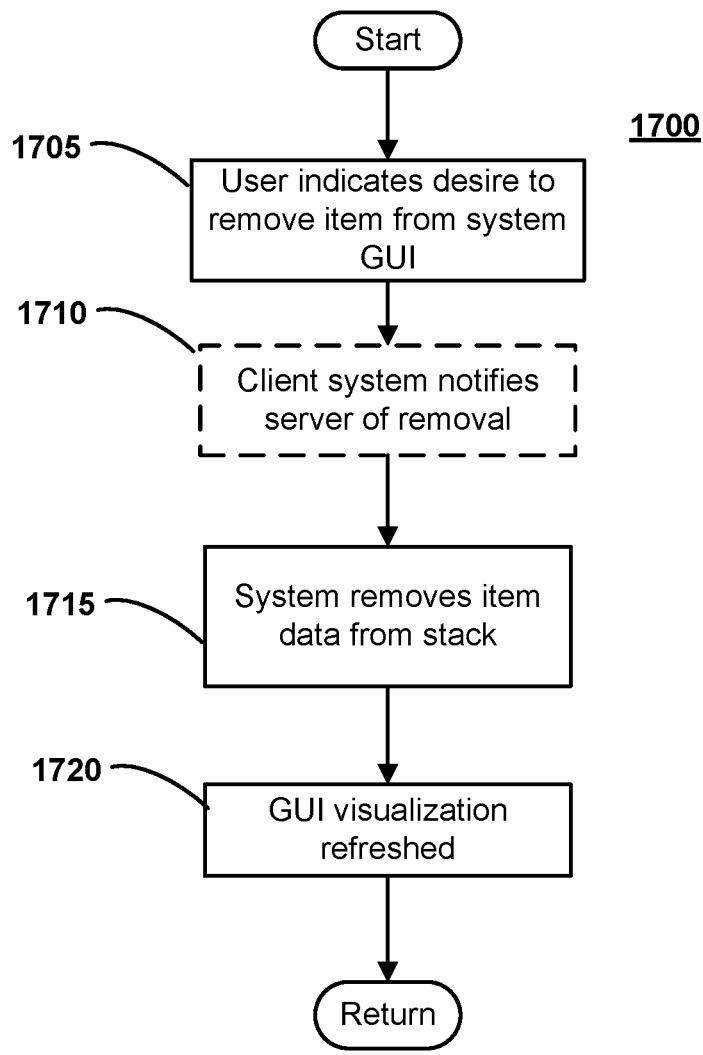
FIG. 17 is a flow diagram illustrating various operations in an example item deletion process as may be implemented in some embodiments.

FIG. 17 is a flow diagram illustrating various operations in an example item deletion process 1700 as may be implemented in some embodiments. At block 1705, the user may indicate a desire to remove an item from a bucket, e.g., by clicking on the removal indicia, e.g. indicia 360, associated with an item's icon. Removal may also be performed through a program menu, context menu, button, keyboard shortcut, drag-and-drop, toolbar button, etc. Removal may also occur, e.g., as discussed with respect to FIG. 15, during a cut operation.

At block 1710, if the server is available, the client software may notify the server of the removal so that the server may update the bucket and its representation on relevant peer devices, as well as its internal records. At block 1715, the client and server systems may remove the item data (both raw data and metadata) from the bucket's stack. In some embodiments, where network connectivity between the client software and server is available, then block 1715 may reflect only the server-side modification of the data which will in turn drive the GUI revisualizations at block 1720. Conversely, where connectivity is not available, the client software may update its local, cached, bucket data to initiate the item removal at block 1715 and update the GUI at block 1720, in accordance with the modified local data, at its own initiative. Once connectivity is reestablished, the client software may then notify the server of the removal operation. The server system may then indicate the removal operation in the stack representation of each peer device synchronized with the item's bucket.

As discussed above with respect to FIG. 10, some embodiments facilitate the ability to "undo" a removal operation. When performed, the item may be restored back into the bucket at its former location (accounting for any subsequent modifications to the bucket). Such item revivals may be propagated to other user devices in a fashion analogous to the insertion of new items describe elsewhere herein.

As items are added and removed from a bucket, the overall size of the bucket may be recomputed on the client side for the purpose of displaying that information to the user (e.g., at memory footprint indicia 330) and on the backend for the purposes of tracking storage and transfer quotas. The overall account size is computed as the sum of the size of the buckets that belong to a user. The overall account size may also be updated as buckets are created/deleted.

In some embodiments, the user may also activate a "Redo" action (either through a program menu, context menu, button, keyboard shortcut, or toolbar button) and the item once again deleted. The action may be propagated to all of the user's devices running the application.

Example Data Object Removal Using Chunks

Figure 18:
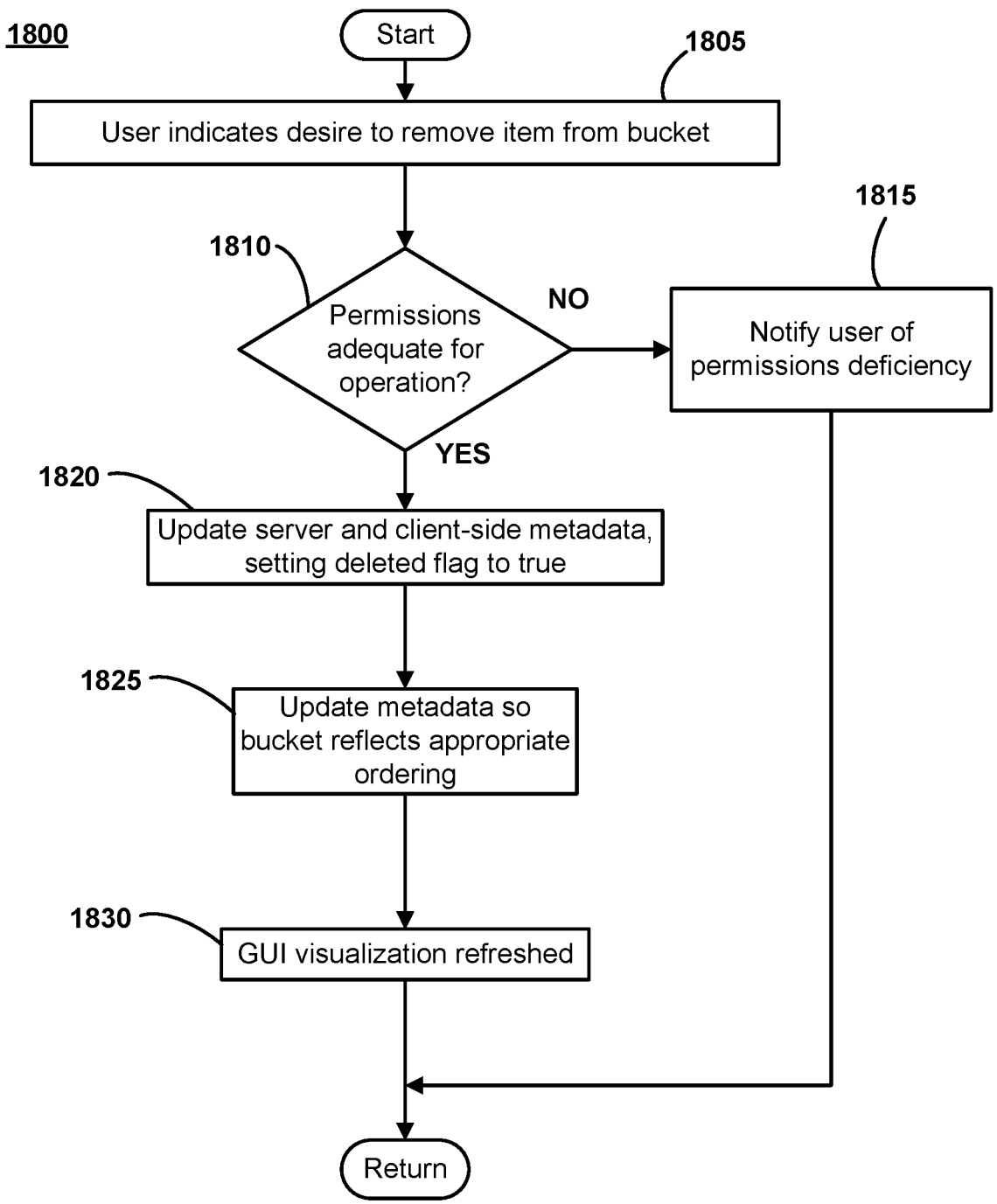
FIG. 18 is a flow diagram illustrating various operations in an example item deletion process using data chunks as may be implemented in some embodiments.

As previously discussed, some embodiments may use chunks to economize memory spaces on the server. FIG. 18 is a flow diagram illustrating various operations in an example item deletion process 1800 using data chunks as may be implemented in some embodiments. At block 1805, the user may indicate a desire to remove an item from the bucket. For example, the user may perform a keyboard command or drag and drop command that directs the bucket management program to remove a data object from the currently selected bucket.

At block 1810, the client system may consult with an account server, the metadata server 130 (e.g., account management module 215*b* and sharing/permissions module 215*e*), or internal records to determine if the user's account permits removal operations. For example, the user may be able to view a shared bucket, but not modify the bucket unless they are the owner. Where the user lacks appropriate permissions, the client program may notify the user at block 1815.

Where permissions are satisfactory, at block 1820, the client system may direct the server system to indicate that the data object in the bucket has been deleted. The raw data object data and data object metadata may be retained however until a subsequent purge. For example, setting the "deleted flag" to true, or otherwise indicating that the data object has been removed, may initiate a timer for a delayed purging. Only after adequate time has passed may the data be genuinely updated to reflect removal. In this manner, "undo" and recovery operations may be permitted to the user for a period following the removal request (e.g., following an undo request, the timer may be disabled and the client GUIs' bucket icon stacks updated to again depict the recovered item or items).

At block 1825, the client and server may adjust the bucket's internal ordering to reflect the omission of the data object. At block 1830, the GUI representation on the client device may be adjusted to reflect the removal and a new item ordering presented within the bucket window.

Figure 19:
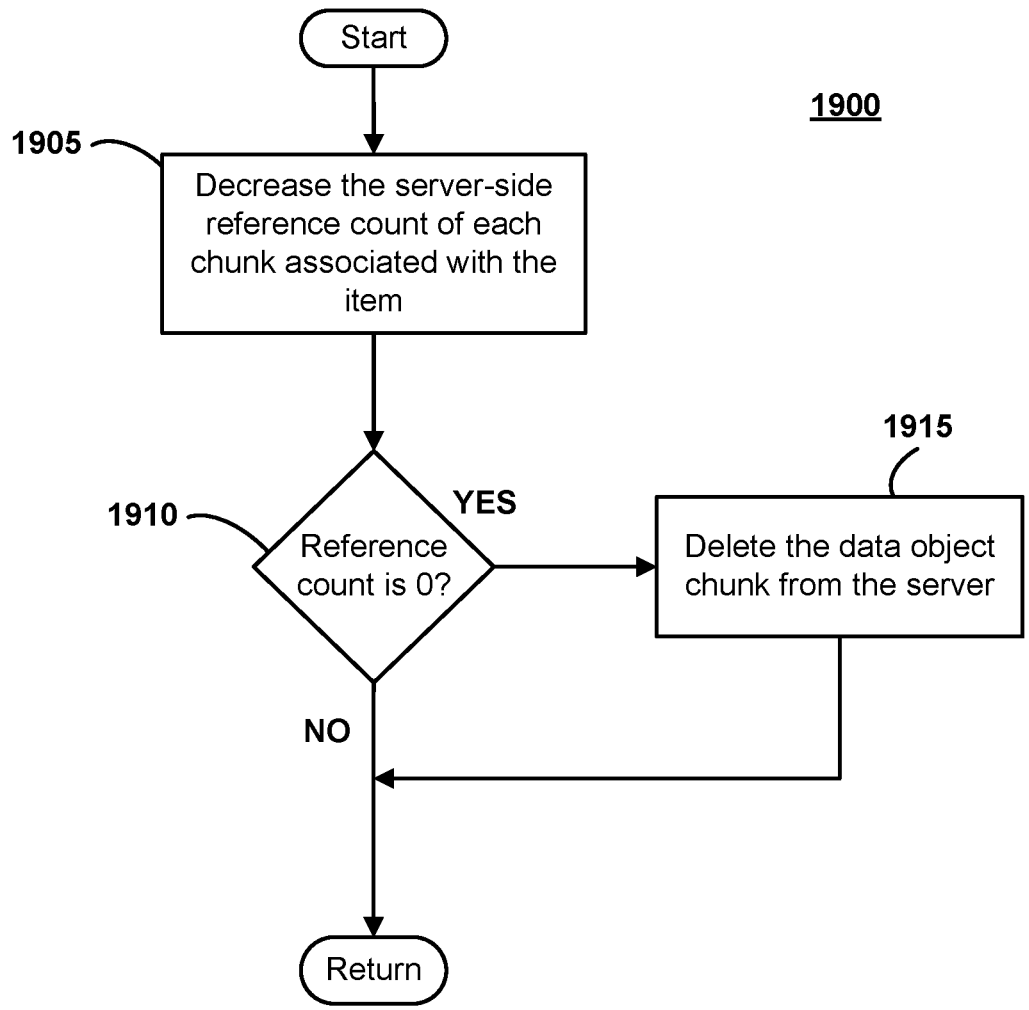
FIG. 19 is a flow diagram illustrating various operations in an example data expunging operation associated with the operations of FIG. 18 as may be implemented in some embodiments.

As mentioned with respect to block 1820, marking a data object for deletion may result in delayed expunging operations. FIG. 19 is a flow diagram illustrating various operations in an example data expunging operation 1900 in association with the operations of FIG. 18 as may be implemented in some embodiments. For example, once the timer expires following marking of the deletion flag, the purging process may begin. At block 1905, the server system may decrease the server-side reference count for each chunk associated with the item marked for deletion. For each chunk associated with the data item, at block 1910, the system may determine if this results in the chunk's reference count being zero, and if so, removes the chunk from the server memory at block 1915. Any data object for which at least one data chunk is missing may be construed as "permanently deleted" in the system. As in this example, some embodiments may favor storing data object raw data and metadata on the server rather than on the client.

Example Bucket Correspondence Topology

Figure 20:
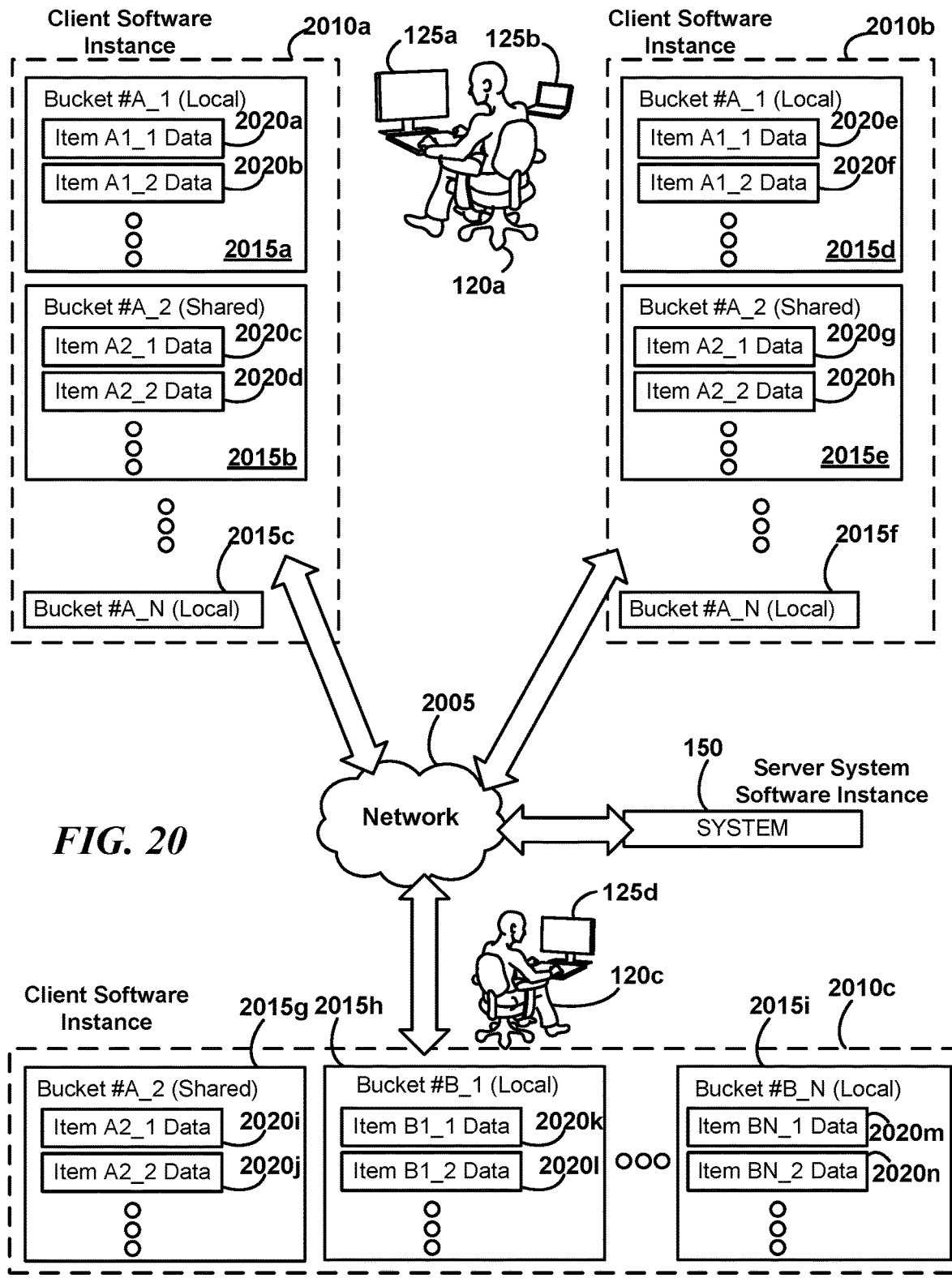
FIG. 20 is a schematic diagram illustrating an example topology of various bucket relations as may occur in some embodiments.

FIG. 20 is a schematic diagram illustrating an example topology of various bucket relations as may occur in some embodiments. As previously discussed user 120*a* may be working with two devices, desktop computer 125*a* and a laptop computer 125*b*, at location 115*a*. Each of desktop computer 125*a* and a laptop computer 125*b* may be running a client software instance, e.g., client software instance 2010*a* on device 125*a* and client software instance 2010*b* on device 125*b*.

The user may desire the instances 2010*a* and 2010*b* to "mirror" one another. Thus, buckets and data on instance 2010*a* may also be represented in instance 2010*b* and vice versa. Similarly, operations performed on a bucket and its contents via instance 2010*a* will also occur in instance 2010*b* and vice versa. The data for each instance may be synchronized and consolidated at the server system via network 2005 (e.g., the Internet, a local area network, etc.). Thus, the instances 2010*a* and 2010*b* may agree on their buckets and contents via the complete mirroring, however, each instance may have its copy of the data corresponding to the icon depicted in the respective GUI in some embodiments.

Thus, items 2020*a*, 2020*b* in bucket 2015*a* on instance 2010*a* may correspond to items 2020*e*, 2020*f* in bucket depiction 2015*d* on instance 2010*b*. Similarly, items 2020*c*, 2020*d* in bucket depiction 2015*b* on instance 2010*a* may correspond to items 2020*g*, 2020*h* in bucket depiction 2015*e* on instance 2010*b*. Again, the appearance of these items may be the same in each bucket (e.g., they will each have corresponding item icons in the same stack position). Such mirroring may occur for all or some of the remaining buckets until buckets 2015c and 2015f, per the user's preference. Again, this mirroring may occur via reference to the server system 150 across network 2005 and in some embodiments may be managed by, and use data objects stored on, the server system exclusively. Also note that the mirroring may occur despite desktop computer 125a and a laptop computer 125b running different operating systems.

Instances may also be mirrored between the different devices of different users as described above. However, in some embodiments, only specific buckets may be mirrored between different users. Unlike "local" buckets, which are local to a user and not shared, these "shared" buckets are mirrored between peers. Thus, on the instance 2010c on device 125d bucket depictions 2015h and 2015i may have items 2020k-n not appearing in other users' buckets. Thus, modification of these buckets will precipitate no change anywhere else. However, the shared bucket represented by bucket depiction 2015g may be mirrored with each of the contents of the buckets represented by depictions 2015b and 2015e. Consequently, removal of either item 2020i or 2020j would result in corresponding removal of items 2020c, 2020d and 2020g, 2020h in their respective buckets.

Note that the sequential ordering may be consistent across devices. Thus, if another team member inserts an item, her peers may have some idea of when it was inserted relative to their own. In some embodiments, users may set permissions to add, insert, reorder, and delete items in a container to avoid data loss or confusion. In some embodiments, users may reorder items in a bucket or may assign the stack locations based on factors other than chronological insertion (e.g., data size, type, etc.).

Example Item-Specific Bucket Transfer

Figure 21:
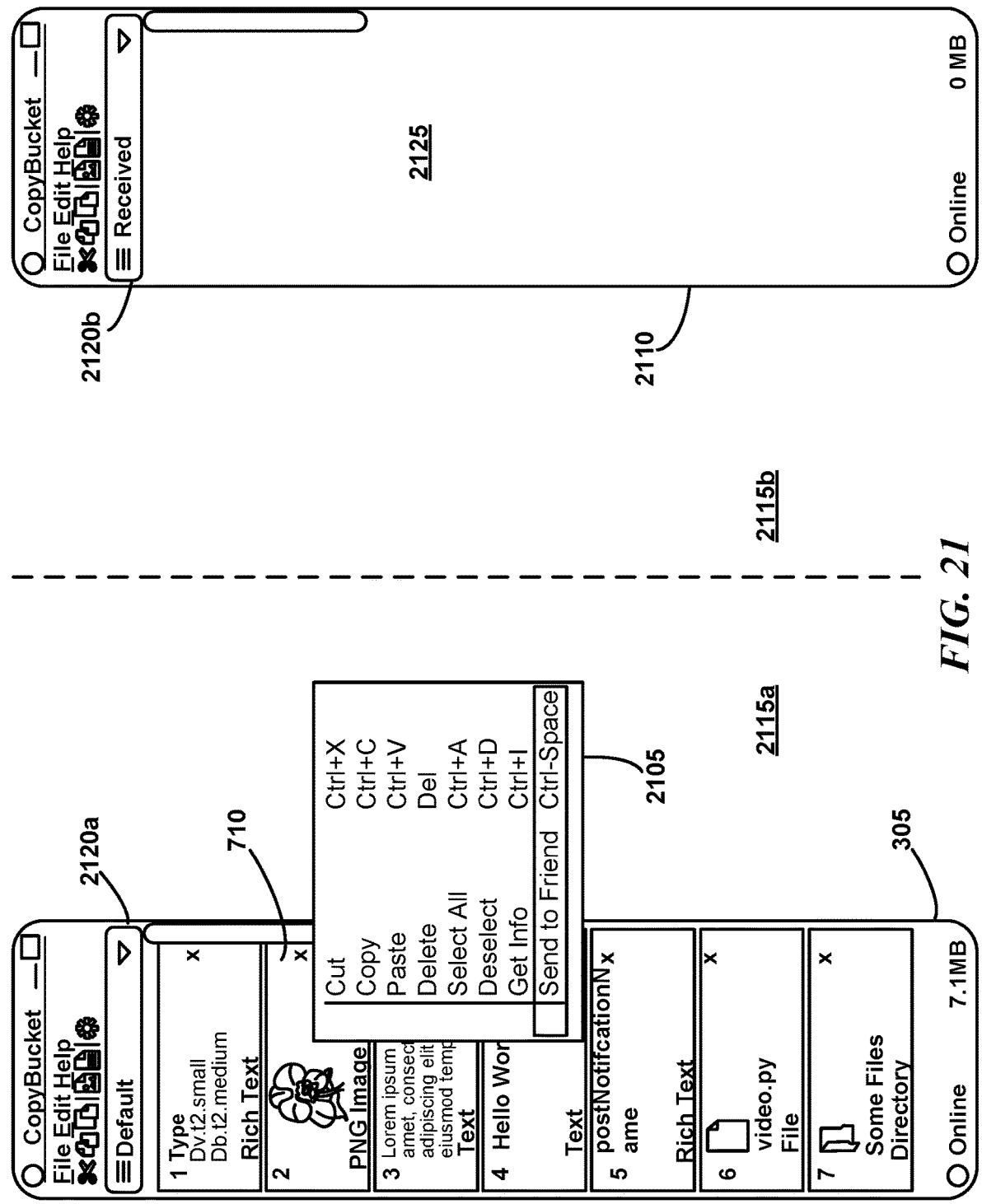
FIG. 21 is a schematic diagram illustrating an example client user screen during a portion of a share-between-users process as may occur in some embodiments.

Rather than mirror and synchronize entire buckets as discussed with respect to FIG. 20, in some embodiments, the client or server systems may accommodate the transfer of individual items to a peer client system via a "share-between-users" operation. FIG. 21 is a schematic diagram illustrating an example client user screen during a portion of a share-between-users process as may occur in some embodiments. In this example, a first user with display view 2115a depicting a first client instance GUI 305 may wish to send an item to a second user with display view 2115b on a separate device depicting a second client instance GUI 2110. The first GUI select the "Default" bucket via selection 2120a, while the second GUI 2110 focuses on the "Received" bucket selection 2120b. While the second GUI 2110's stack window 2125 is empty for the bucket in this example, one will appreciate that the bucket may have previously received items. The "Received" bucket may be a bucket included in the initial client installation in some embodiments.

The first user may activate the "Send to friend" action (e.g., through a program menu, context menu, button, keyboard shortcut, or toolbar button) and a list of the user's friends may be displayed. For example, here the user has right-clicked on the second item icon 710 to present menu 2105 from which the user has selected the option "Send to Friend."

Figure 22:
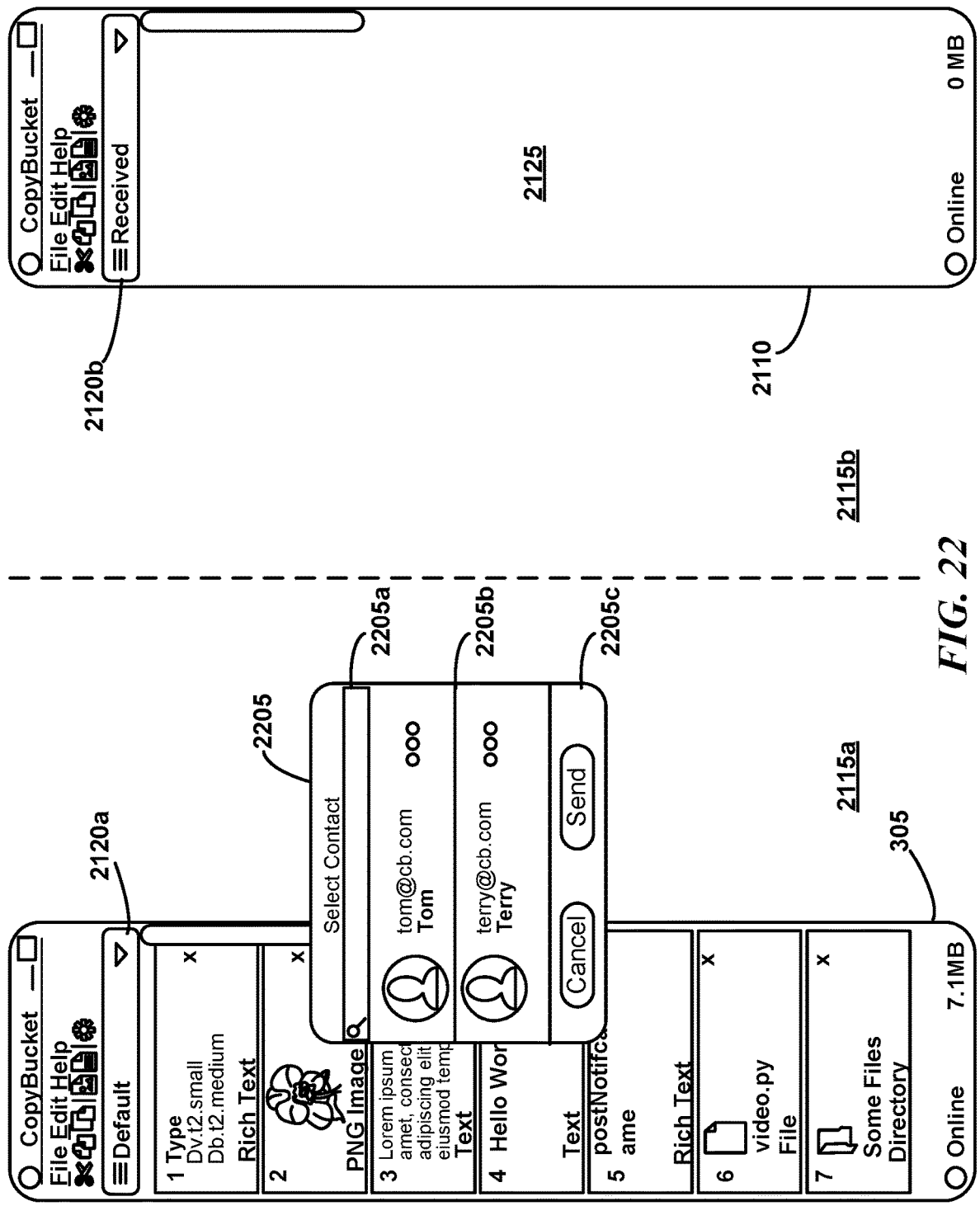
FIG. 22 is a schematic diagram illustrating an example client user screen during a peer-selection portion of the share-between-users process of FIG. 21 as may occur in some embodiments.

FIG. 22 is a schematic diagram illustrating an example client user screen during a peer-selection portion of the share-between-users process of FIG. 21 as may occur in some embodiments. Menu 2105 may close and window 2205 be presented when the user selects "Send to Friend." The window 2205 may include a search box 2205a for searching, e.g., for peer user names. A region 2205b may show the available peer users (in this example only two are available, though one will appreciate that an arbitrary number may be available in difference instances). The user may select one or more peers for transmission by selecting the icons in region 2205b. Region 2205c then provides buttons for sending the item to the selected users. In some embodiments, the contacts/sharing module 210i may consult the user's address book to identify friends.

Figure 23:
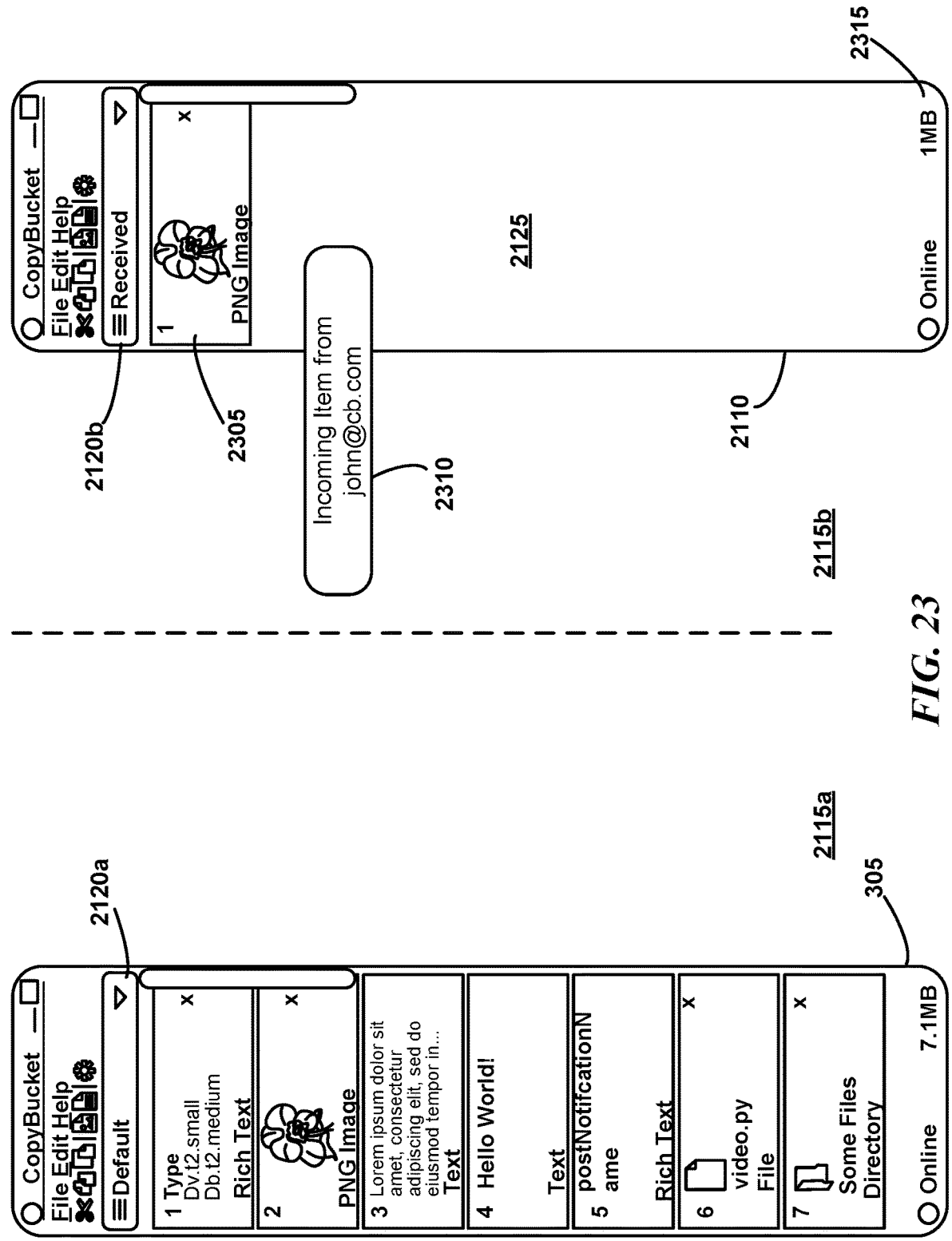
FIG. 23 is a schematic diagram illustrating an example client user screen during a completed peer-selection portion of the share-between-users process of FIG. 21 as may occur in some embodiments.

FIG. 23 is a schematic diagram illustrating an example client user screen during a completed peer-selection portion of the share-between-users process of FIG. 21 as may occur in some embodiments. Window 2205 may close once the first user clicks "send." The second user may then be presented with a notification widow 2310 and updated stack window 2125 including an icon 2305 for the newly received item. Memory indication 2315 may likewise be updated to reflect the memory footprint created by the newly received item. In this manner, unlike mirrored buckets, only specific items may be transferred between client software instances (though other buckets may permit mirroring functionality).

To facilitate understanding of the benefits of the various bucket topologies, consider the example situation where the users are writing software code on computers in text editors or integrated development environments (IDE). One user may wish to send a portion of the code (e.g. a line, block, or several blocks of code) to his colleague. The user copies the code and pastes it into a bucket. The user then uses the aforementioned "Send to friend" feature. On the other end, the colleague receives the code, copies it and pastes it where needed.

In some embodiments, when the user selects "Share with friend" and then chooses friend(s) from the list of contacts, they may also choose privileges (such as "can view", "can edit", "can edit and share"). The icon in the recipient's GUI may reflect the privileges, e.g., with a textual indication. In some embodiments, entire buckets, rather than just items, may be shared using this "send to friend" functionality. Note that, in some embodiments, individual item sharing (e.g., via "share with friend") may not consider different levels of privileges. In some embodiments, even if the sender deletes his item, the recipient will retain hers within her "Received" bucket as the items are not treated as the "same" item by the server (e.g., as in mirrored buckets). This variation in bucket functionality may accommodate user workflow behaviors, accommodating certain expectations regarding item retention. Bucket sharing may be specified via the "Manage Buckets" window 2605a in some embodiments.

Figure 24:
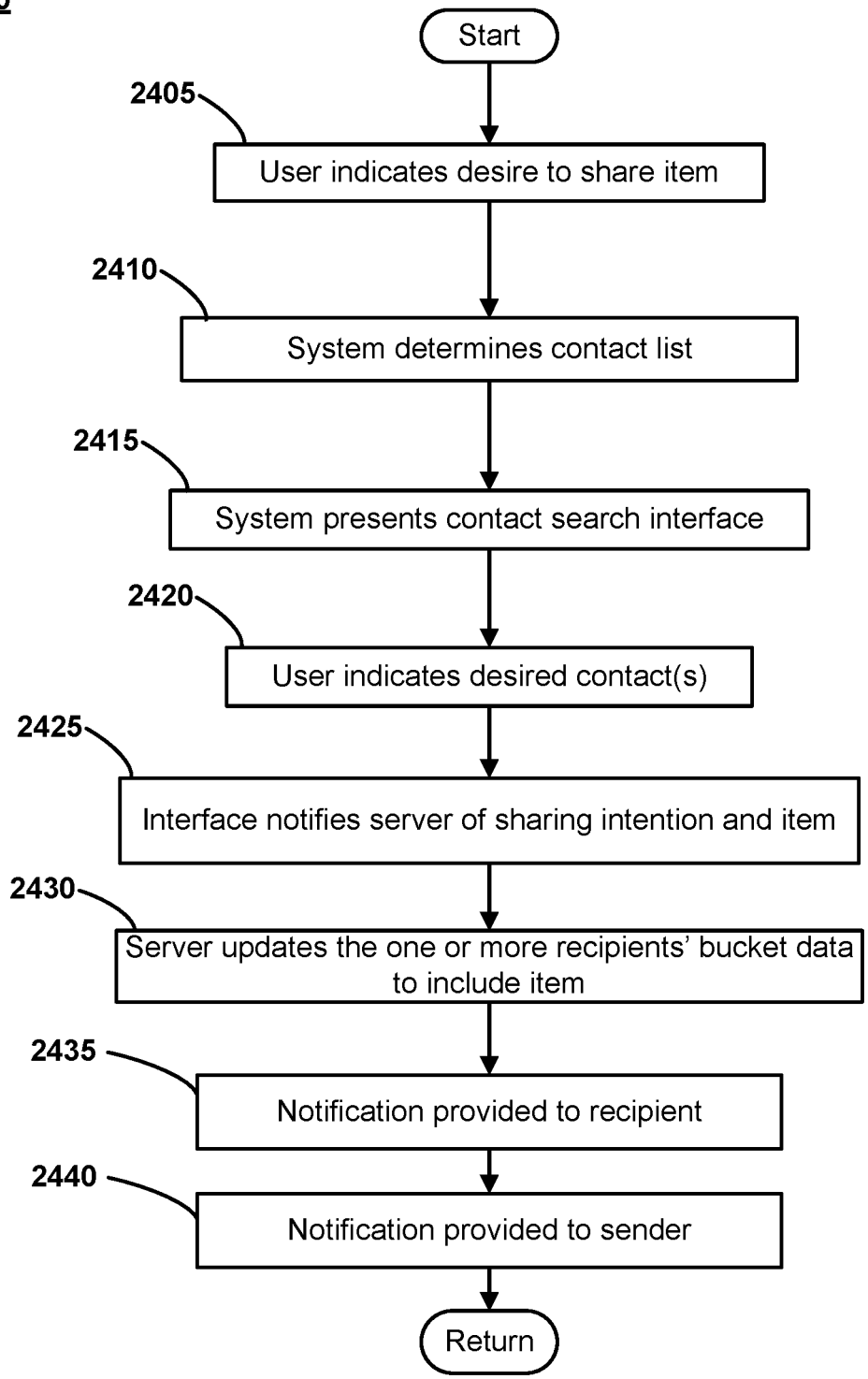
FIG. 24 is a flow diagram illustrating various operations in an example share-between-users process as may be implemented in some embodiments.

FIG. 24 is a flow diagram illustrating various operations in an example share-between-users process 2400 as may be implemented in some embodiments. At block 2405, the user may indicate a desire to share an item (e.g., by selecting the "Send to Friend" option discussed above). At block 2410, the client or server system may then determine the user's contact list and present this list via the GUI interface to the user at block 2415. The user may then indicate one or more contacts to receive the item at block 2420. At block 2425, the client software may notify the server of the intention to share the item, the recipient contacts, and the selected item.

At block 2430, the server system may update the one or more recipients' bucket data to reflect the newly received item. In some embodiments, this may precipitate a new item entry in the metadata database 140a. The system may then update the reference counts of every chunk of the item (e.g., reference counts are incremented by 1 for every user that we share with). Thus, the item may not be shared but duplicated (once per recipient). In this manner, if the sender deletes his item, the recipients will still retain theirs.

At block 2435, the server may direct the recipient's GUI to notify the recipient of the new item's arrival. Similarly, at block 2440, the server may direct the sender's client software to notify the sender via the client's GUI of the operation's success.

Figure 25:
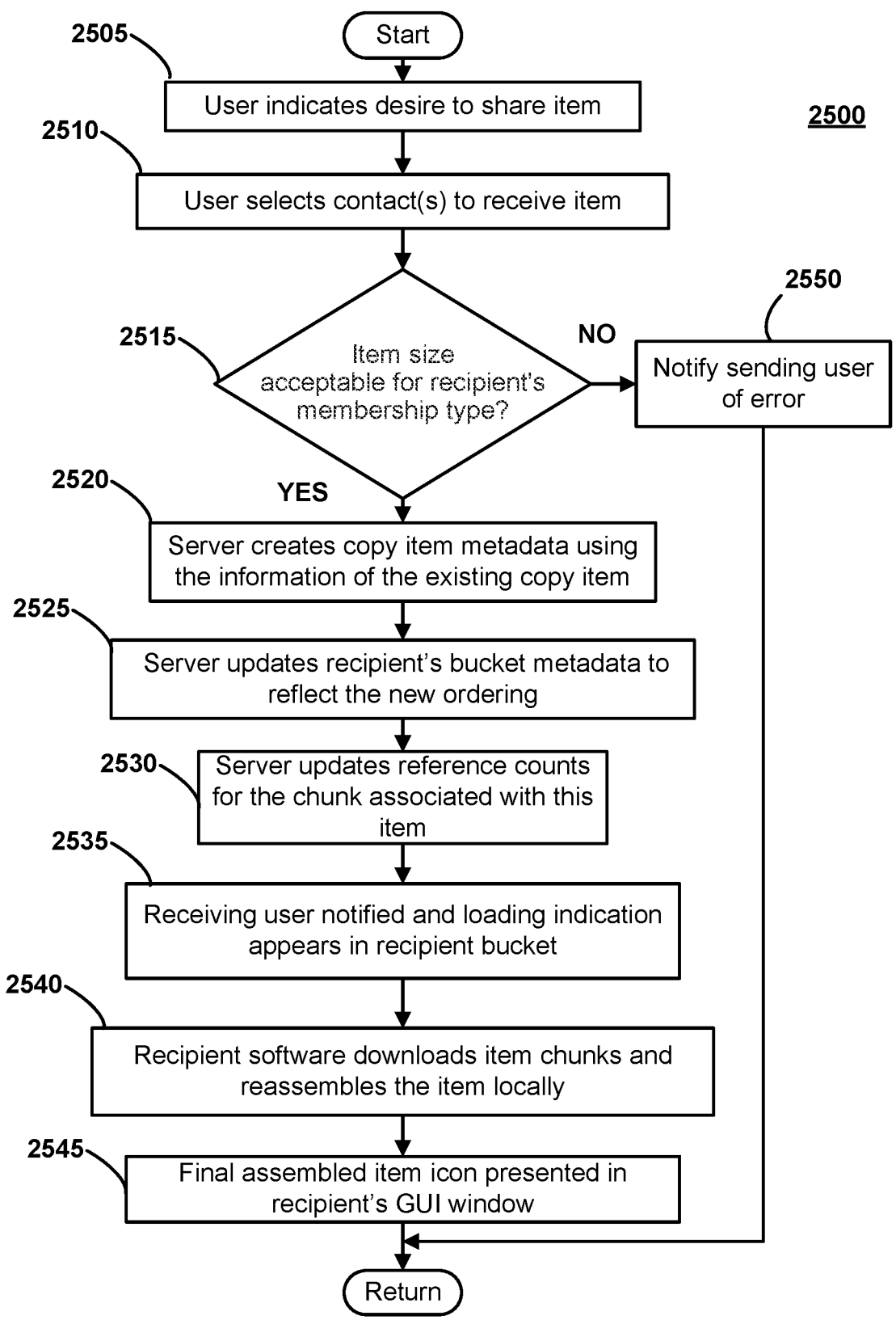
FIG. 25 is a flow diagram illustrating various operations in an example share-between-users process using data chunks as may be implemented in some embodiments.

FIG. 25 is a flow diagram illustrating various operations in an example share-between-users process 2500 using data chunks as may be implemented in some embodiments. At block 2505, the user may indicate a desire to share an item with a peer (e.g., as discussed above) and select one or more peers at block 2510. In some embodiments, at block 2515, the client software may verify with a server system that the recipient's permissions permit receipt of an item of the shared object's size. For example, higher tiered users may have the ability to share larger items. Conversely, in some embodiments, it may be the sender who is prevented from sending items over a specified size (indeed, both sender and receiver may sometimes require adequate permissions). If the transmission is not permitted, the user requesting to send the object(s) may be notified at block 2550.

Where adequate permissions exist, at block 2520, the server system may generate a copy of the object's metadata. The server may also update the metadata associated with the recipient's bucket at block 2525 (e.g., a "received" data bucket as discussed elsewhere herein). Similarly, at block 2530, the server system may update the reference counts for the chunks associated with this item (reflecting the additional presence of the item in the recipient's bucket).

At block 2535, the recipients may be notified, e.g., with a loading indication, that the server will be sending the data object to their system. The data object may be assembled at the server in some embodiments from the chunks, or the chunks may be sent to the client for assembly in some embodiments. In this example, the assembly may occur locally at block 2540, before an icon corresponding to the final assembled data object is presented to the recipient at block 2545.

Example Operations—Bucket Management

Figure 26A:
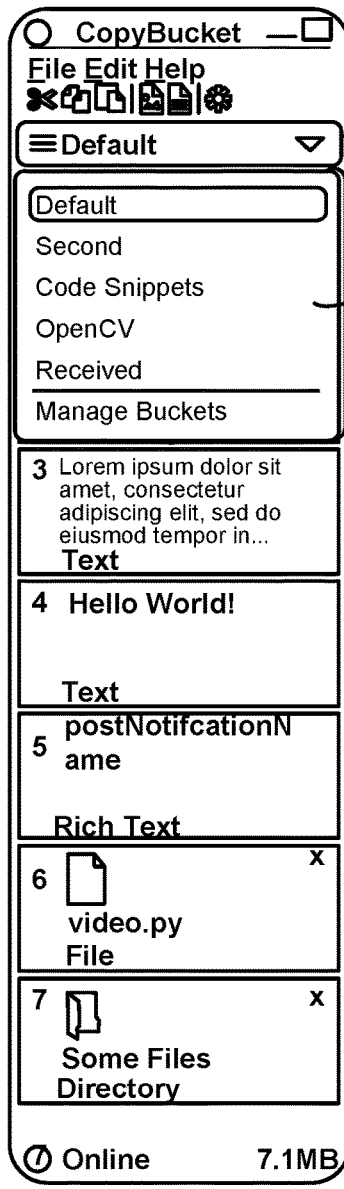
FIG. 26A is a schematic diagram of a client graphical user interface including a bucket selection interface as may be implemented in some embodiments.
Figure 26B:
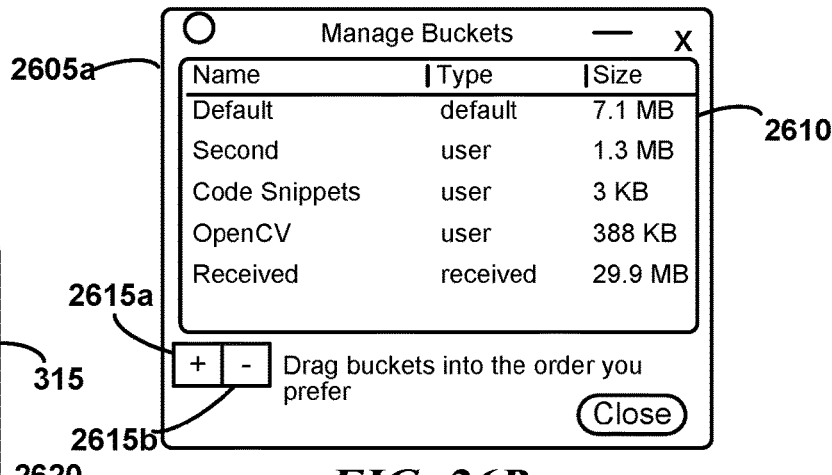
FIG. 26B is a schematic diagram of a bucket management selection window as may be implemented in some embodiments.
Figure 26C:
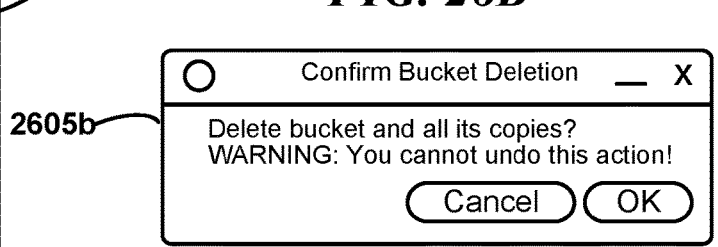
FIG. 26C is a schematic diagram of a bucket deletion confirmation window as may be implemented in some embodiments.
Figure 26D:
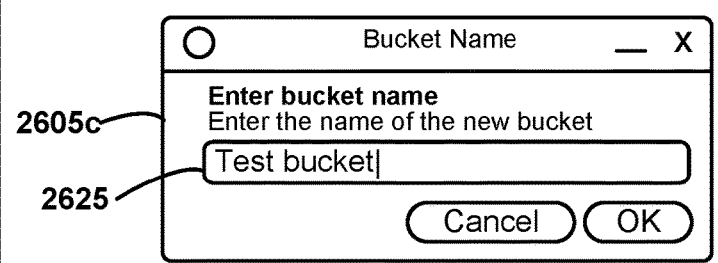
FIG. 26D is a schematic diagram of a bucket creation confirmation window as may be implemented in some embodiments.
Figure 26E:
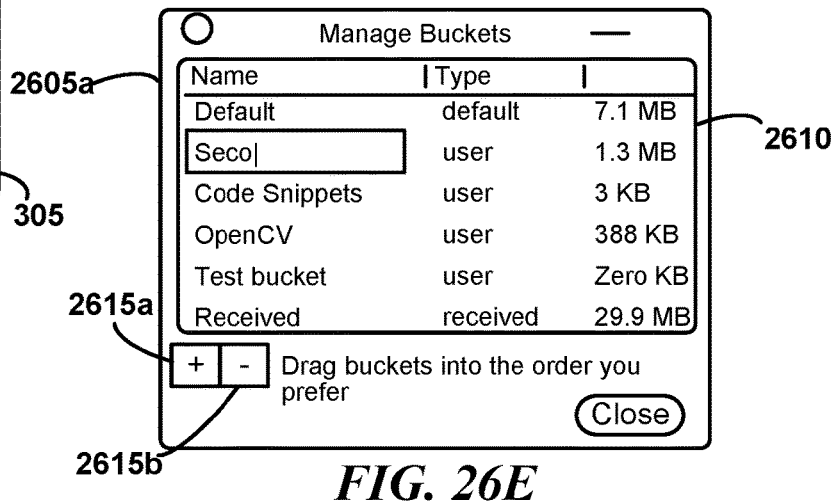
FIG. 26E is a schematic diagram of the bucket management window of FIG. 26B following various creation and editing operations as may occur in some embodiments.

FIG. 26A is a schematic diagram of a client graphical user interface including a bucket selection interface as may be implemented in some embodiments. FIG. 26B is a schematic diagram of a bucket management selection window as may be implemented in some embodiments; FIG. 26C is a schematic diagram of a bucket deletion confirmation window as may be implemented in some embodiments; FIG. 26D is a schematic diagram of a bucket creation confirmation window as may be implemented in some embodiments; and FIG. 26E is a schematic diagram of the bucket management window of FIG. 26B following various creation and editing operations as may occur in some embodiments.

When the user clicks upon or otherwise selects bucket selection interface 315, as shown in FIG. 26A, the system may present a dropdown list 2620 indicating the available buckets from which the user may select. When a user clicks a bucket name, the list in the below bucket window may be updated to show the content of the selected bucket. An additional "manage buckets" option may also presented as indicated in dropdown list 2620. By selecting this option, the system may present a bucket management window 2605*a* as shown in FIG. 26B to the user. This window may include a plurality of bucket summary entries in summary region 2610.

Clicking the "plus" sign 2615*a* may begin the creation of a new bucket, while selecting the minus sign 2615*b* after selecting a bucket in region 2610 may begin removal of the bucket. Particularly, following selection of the "minus" sign 2615*b* the system may present the dialog 2605*b* to confirm removal. If the user selects "ok" in this dialog, the bucket may be removed and any associated client or server-side memory marked for reallocation. While the text 2605*b* indicates "WARNING: you cannot undo this action," in some embodiments, as discussed above with respect to data objects, bucket data may likewise be retained for a period of time before being permanently expunged, to facilitate undo behaviors.

Conversely, selection of the "plus" sign 2615*a* will cause the system to present dialog 2605*c* of FIG. 26D. Here the user may type in the name of the new bucket in text input 2625. After selecting "ok" in this dialog, a new entry for the new bucket (here "Test bucket") may be presented in the summary region 2610 as shown in FIG. 26E. The initial memory associated with this bucket may be "Zero KB." Note that when this is a "mirrored" or "shared" bucket, a new bucket with the same name may now appear on peer user's client interfaces. By clicking on a bucket's name in the summary region 2610 the user may change a bucket's name. For example, in FIG. 26E the user is removing the last two characters of the bucket that was named "Second." As discussed herein, changing a bucket name for a "mirrored" or "shared" bucket may precipitate a change in the name on peer client interfaces as well. The name may also be changed in the bucket selection interface 315. Users may reorder buckets by dragging them up or down in the summary region 2610. In some embodiments, analogous to the order of a bucket's contents, the order of the buckets may be propagated to all of the user's devices. The order may also be reflected in the bucket selection interface 315.

In some embodiments the system begins with two buckets: a "Default" bucket, which may be used by default for initial copying and pasting, and a "Received" bucket, for receiving items from peers as described elsewhere herein. Users may create "custom" containers in addition to these two initial buckets.

Figure 27:
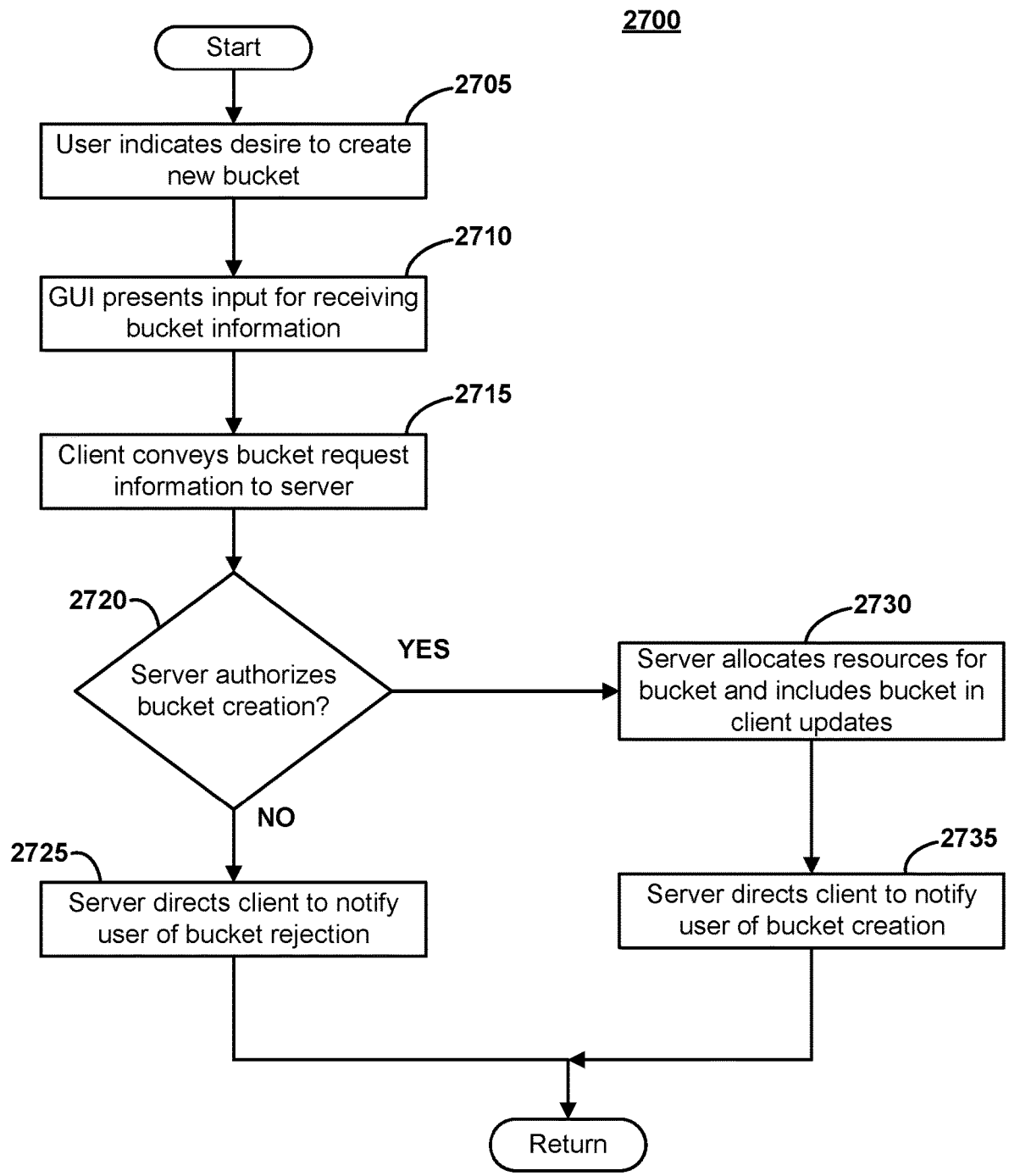
FIG. 27 is a flow diagram illustrating various operations in bucket creation process as may be implemented in some embodiments.
Figure 28A:
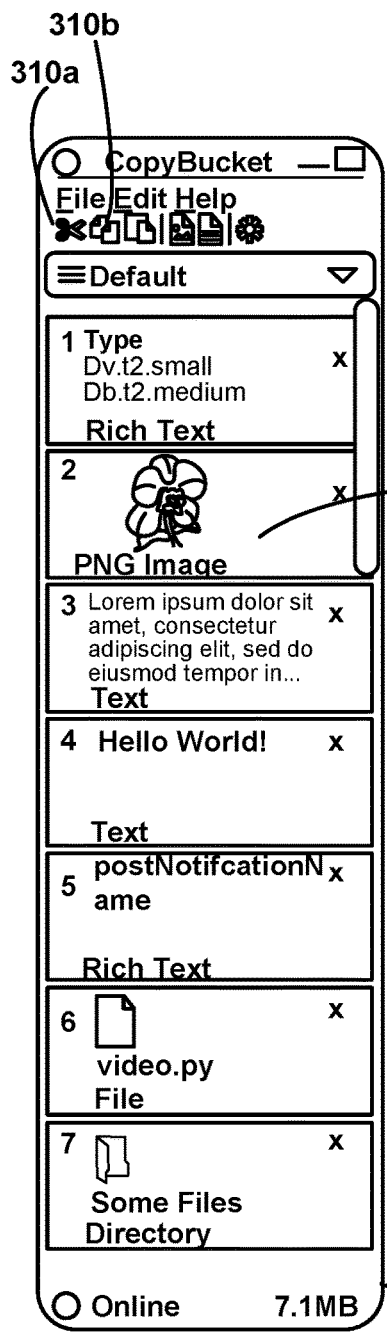
FIGS. 28A-D are schematic diagrams of various graphical user interfaces that may be presented to the user during a quick-copy or quick-cut process as may be implemented in some embodiments.
Figure 28B:
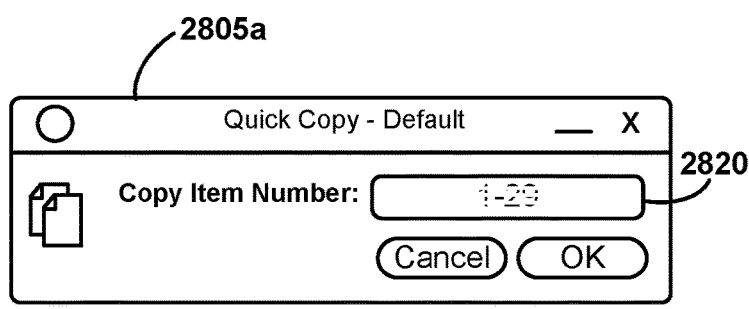
Figure 28C:
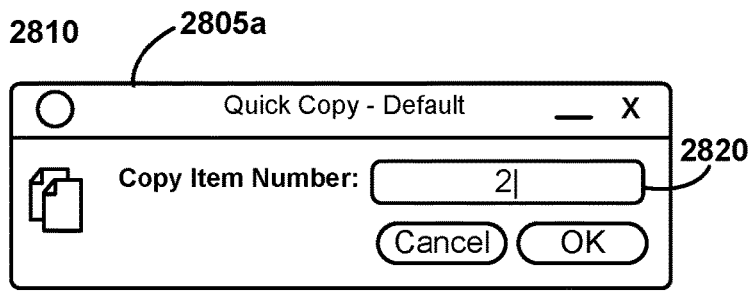
Figure 28D:
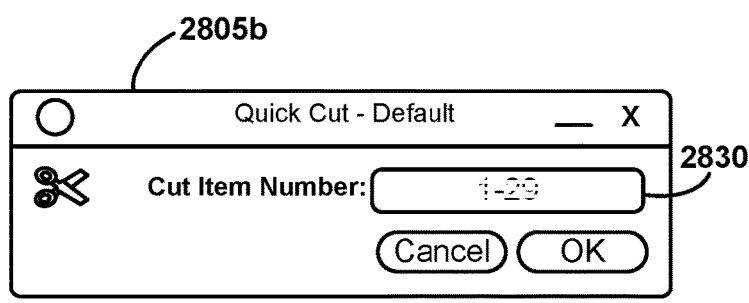

FIG. 27 is a flow diagram illustrating various operations in bucket creation process 2700 as may be implemented in some embodiments. At block 2705, the user may indicate a desire to create a new bucket, e.g., by selecting the "plus" indicia 2615*a* of the dialog in FIG. 26B. The GUI may present inputs for receiving information about the new bucket, e.g., the name input in the dialog of FIG. 26D, at block 2710.

At block 2715, the client software may convey the bucket creation request to the server. Though not shown in this example, where the server is not available, the client software may perform the bucket operation using a local copy of the bucket. Once the server system is again available, the client software may push the bucket and its data to the server system for processing.

At block 2720, the sever may decide whether creation of the bucket is possible. For example, there may not be adequate space or resources for additional buckets or the user's account may be limited to a finite number of buckets. If such resources are absent, the server may direct the client software to notify the user of the failure at block 2725. If instead, the resources are available, then at block 2730, the server system may instead allocate resources for the bucket and include the bucket for consideration in subsequent updates (e.g., if the bucket is designated for sharing with peers). The server system may then notify the client software of the user requesting the bucket creation, as well as the client software of other subscribing/shared users, of the successful bucket creation at block 2735. The users may be informed, e.g., via an update to bucket management window 2605*a*.

Example Operations—Quick Cut and Quick Copy Actions

FIGS. 28A-D are schematic diagrams of various graphical user interfaces that may be presented to the user during a quick-copy or a quick-cut process as may be implemented in some embodiments. Users familiar with the client software may wish to rapidly move data to and from the the clipboard during their workflow. To accommodate this desire for speed, the client software may accommodate "quick" operations in some embodiments, including "quick copy" and "quick cut" operations. A quick copy operation may quickly facilitate the transfer of items from the bucket to a data program, without removing the items from the bucket. In contrast, a quick cut operation may move items from the bucket to the clipboard and remove them from the bucket.

In some embodiments the user may employ a keyboard command (e.g., the control key pressed simultaneously with an alphanumeric key) to begin the quick copy and quick cut operations. When the user begins the quick copy operation, the client software system may present a dialog 2805a, including a range input 2820. Here, as there are 29 items in the bucket, the initial indication in the input 2820 is 1-29. The user may type a single number for a single item or use a dash to indicate a range of items. For example, in FIG. 28C, the user has identified only the item with numerical identifier "2" (the PNG image of a flower corresponding to icon 2810) for transfer. Hitting "ok" or pressing "enter" may then cause the item's data to be copied to the operating system's clipboard. The quick cut operation may proceed in a similar manner, but instead showing dialog 2805b with range input 2830 as well as causing the system to remove the item from the bucket.

In some embodiments the client system may validate the input and present an error notification if the input is invalid. For example, the requested copy range may exceed the items in the bucket. Because these operations may be performed by keyboard, they allow users to use keyboard shortcuts to interact with the bucket. In this manner, the user may not have to take their hands off the keyboard to select and copy an item to the local operating system's clipboard. Keyboard exclusive interaction may better align with the user's rapid workflow.

Figure 29:
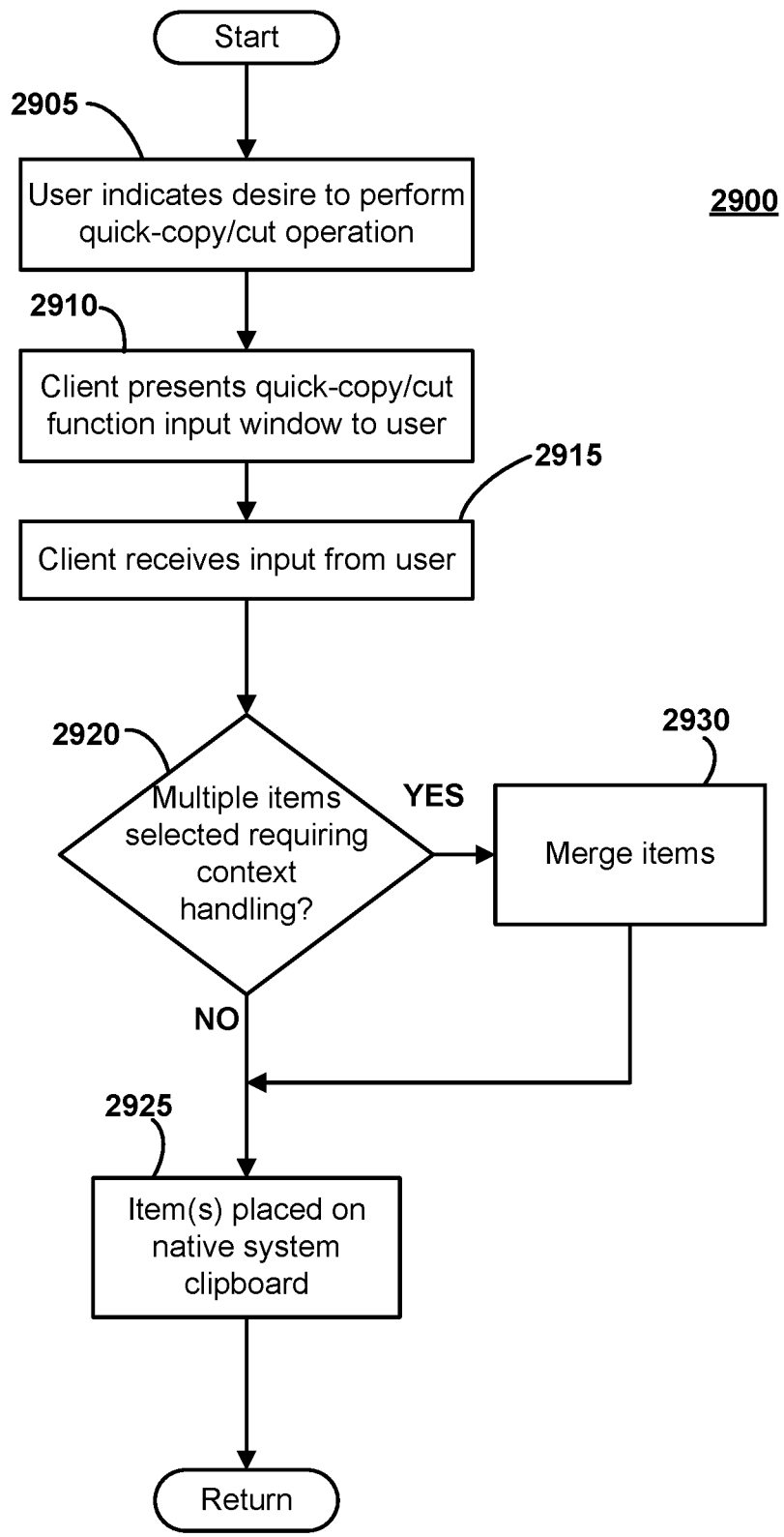
FIG. 29 is a flow diagram illustrating various operations in a quick-copy or quick-cut process as may be implemented in some embodiments.

FIG. 29 is a flow diagram illustrating various operations in a quick-copy or quick-cut process 2900 as may be implemented in some embodiments. At block 2905, the user may indicate a desire to perform a quick-copy or quick-cut operation. In response, at block 2910, the system may present an input window to user. For example, the window may include a range input 2820 corresponding the range of items in the bucket stack to perform the operation.

At block 2915, the user may input the desired items, e.g., the item range, into the client software system. At block 2920, the client or server system software may determine whether the selected items require context handling. For example, a single item may be copied to the native operating system clipboard at block 2925. A single item may behave as expected when pasted by the user to an application running on the operating system. Similarly, some items in combination may be merged and behave as expected when pasted by the user. For example, several text items may be merged into a single set of text data and placed on the operating system clipboard. In contrast, a combination of disparate items may require contextual considerations. Accordingly, at block 2930 the system may coordinate clipboard placement based on the types of selected items. As mentioned, such merging may be performed during normal paste operations and not simply those following quick-cut/copy. FIG. 16 is an example process handling such placement, which may also be used here.

Example Operations—Item Search

Figure 30:
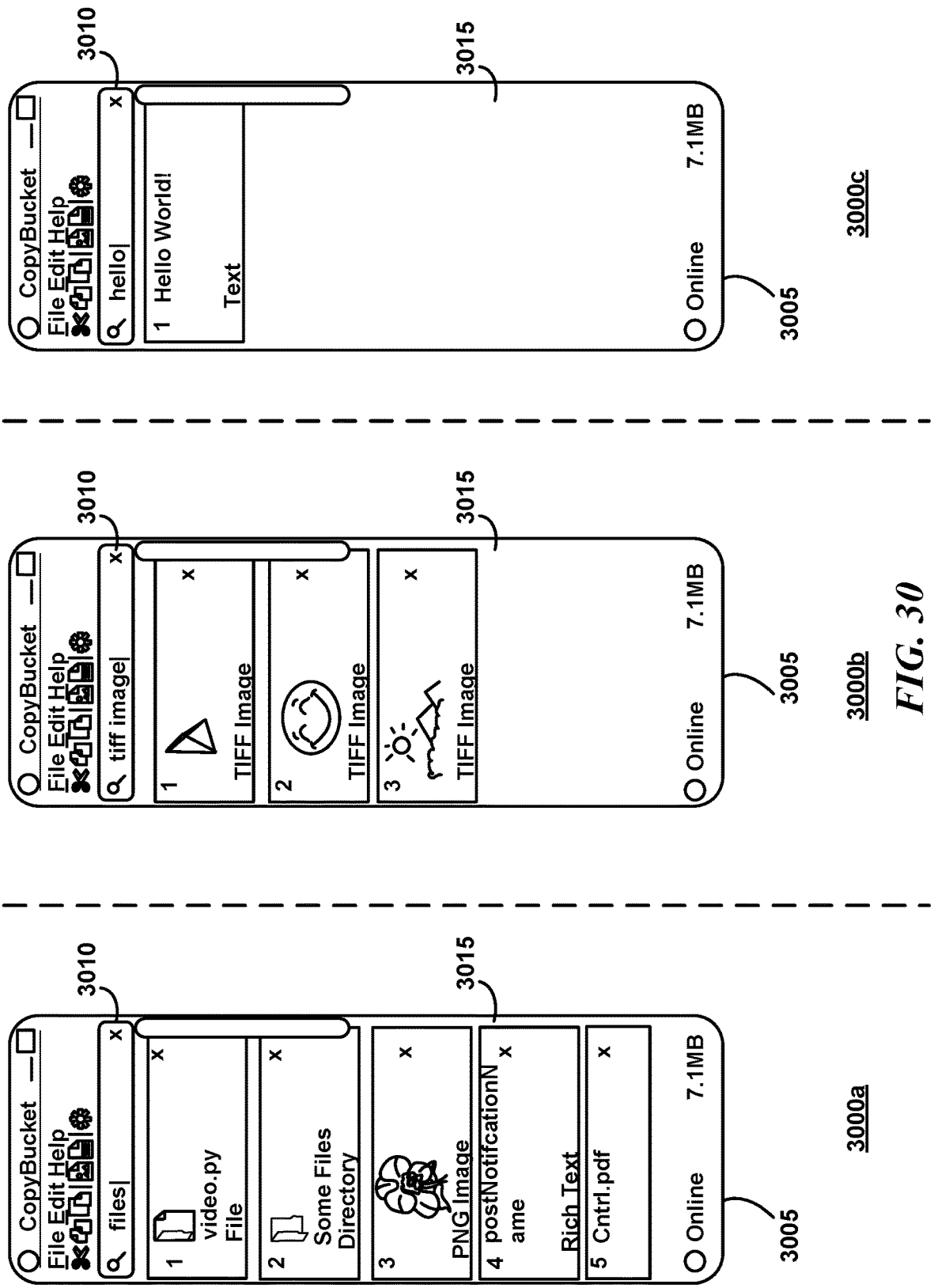
FIG. 30 is a schematic diagram illustrating various states of a graphical user interface that may be presented to the user during a search operation as may be implemented in some embodiments.

FIG. 30 is a schematic diagram illustrating various states of a graphical user interface that may be presented to the user during a search operation as may be implemented in some embodiments. In some embodiments, a search input 3010 may take the place of bucket selection interface 315 (as shown) or be placed in the GUI in addition to bucket selection interface 315 when the user begins a search (via, e.g., a keyboard command, selection from an element within general toolbar 360, a search icon appended to action selection toolbar 310, etc.). As the user types characters into search input 3010, the client system may iterate over the metadata of each item in the bucket (as the metadata resides on the client or server system) and determine whether to hide or show the item in stack window 3015 of GUI 3005. For example, during file search 3000a, the user has typed the word "files" into search input 3010. The client system may consult with the server system, or a local index, which in turn consults the metadata associated with the bucket items in the data store to determine which items correspond to this input. The system may include "keywords" such as "image," "file," "text," etc. that precipitate specific filtering of metadata. The search inputs may be compared with these keywords and items retained whose data type metadata correspond to the keyword. In file search 3000a, images, PDF files, directories containing files, etc. are retained while, e.g., textual values and spreadsheet values are removed from view in item stack window 3015. In some embodiments, file search may return files and directories but not discrete pieces of data such as image or text snippets. Consequently, the rich text snippet and PNG image of file search 3000a may not appear in the search for "files" of these embodiments. Rather than PNG image data, only entire PNG files would be retained.

The system may also filter items based on the input by layering terms. For example, in TIFF Image search 3000b the user has input both the keyword "image" and the format specifier "tiff." The system may first filter based on the keyword (removing all non-image items). For the items that remain, the system may then apply a second filter based on the format specifier (e.g., removing all JPEG, PNG, and other non-TIFF images).

When the search input does not match a keyword, the system may retain items having any metadata value corresponding to the input. For example, the input "hello" in text search 3000c is not a keyword and does not correspond to a type of item. However, the raw content of some items (itself construed as metadata for search purposes associated with the item) may correspond to the input. In this case, a text item has raw data matching the input. Thus, while all other items in the bucket are hidden, the "Hello World!" text item remains.

Note that the numerical identifiers for the items may be adjusted as items are removed from view. In some embodiments, the change in the item stack window 3015 may be local to the user performing the search, regardless of whether the bucket is local, mirrored, or shared. In some embodiments, however, the filter results and the search input are replicated for peers to see.

Figure 31:
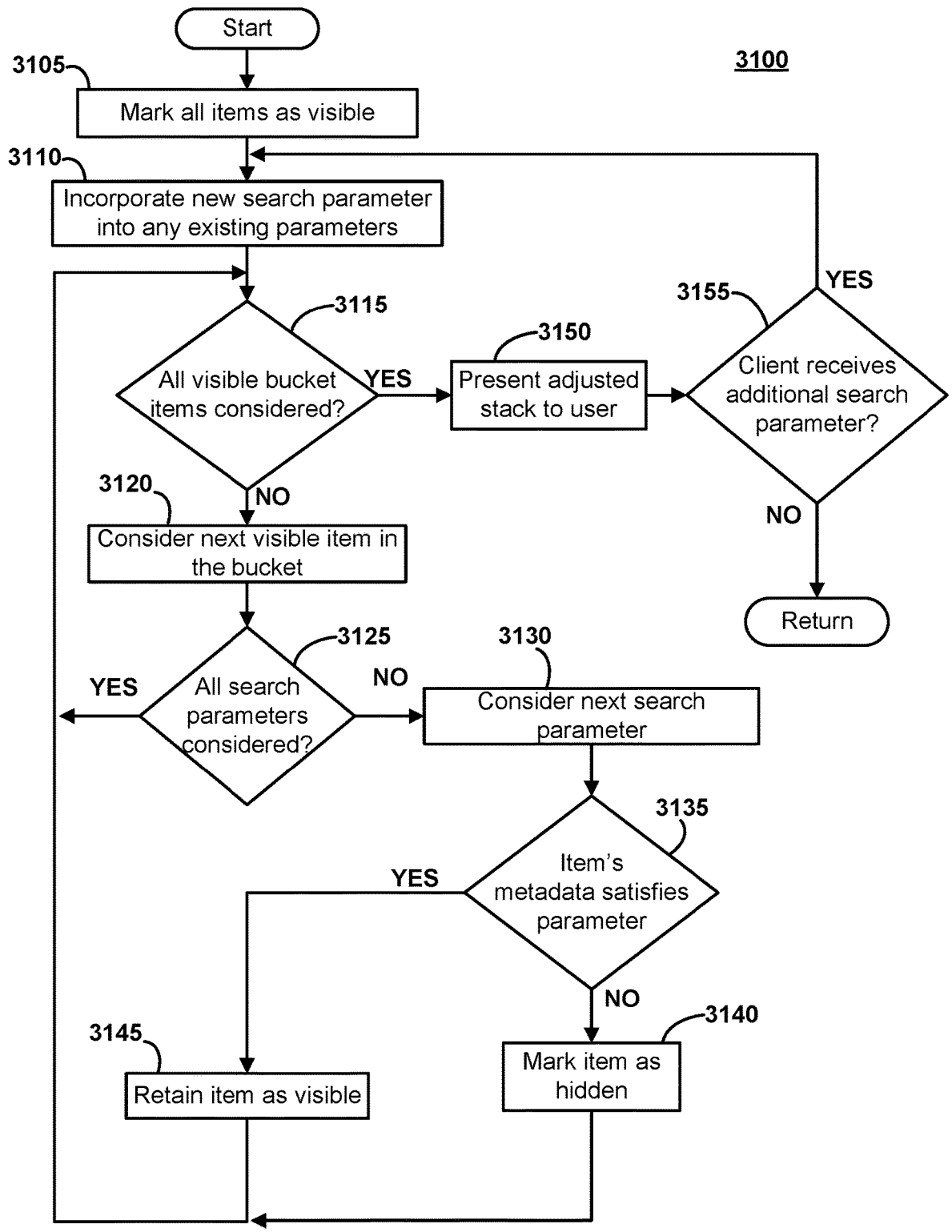
FIG. 31 is a flow diagram illustrating various operations in an example search process as may be implemented in some embodiments.

FIG. 31 is a flow diagram illustrating various operations in an example search process 3100 as may be implemented in some embodiments. Once the user first initiates a search, at block 3105, the system may initially mark all the items in the selected bucket as "visible." As the user inputs search parameters (e.g., a new character in the search input) the parameters may be included in the search at block 3110. Note that in some embodiments the search parameters need not be textual characters, but may be, e.g., file size ranges, file size limits, item creation dates, etc.

At block 3115, the system may iterate through the visible items in the selected bucket and consider any unconsidered items at block 3120. At block 3125, the client or server system may then iterate through the current search parameters, considering the next parameter at block 3130. If the server of client determine that the considered item's metadata (including, in some embodiments, its raw data) satisfies the parameter (e.g., at least one metadata property associate with the item agrees with the search parameter) at block 3135, then the item may be retained as visible at block 3145 (e.g., it's metadata may continue to include a positive visibility flag). Otherwise, if the search parameter has not been satisfied, then the item may be marked as hidden at block 3140.

When an item is added to a bucket, the server system 150 may store its raw data and metadata including, e.g., the item's type, size, associated operating system programs, insertion time, etc. This raw data or metadata may then be referenced during the search query. Thus, for example, if the parameters are a succession of characters in a word ("fold" in the word "folder"), then an item's metadata will satisfy the parameters if it contains the entire word ("folder"). Similarly, if the parameters included two words ("TIFF images"), the metadata considered here may satisfy the parameters if it contains either of the two words ("TIFF" or "images," though both words will need to appear in at least one metadata parameter for the item to remain visible).

Once all the visible items have been considered at block 3115 and all the items properly identified as visible or hidden, the system may proceed to block 3150 and present the updated item window stack to the user. If the client system receives a new, additional search parameter at block 3155, the items may be further filtered by seeing if their metadata agrees with all of the new search criteria. Again, in some embodiments, the raw item data may also be searched (e.g., the user may search for words within text/rich text data items).

Example Multi-Client Window Operations

Figure 32:
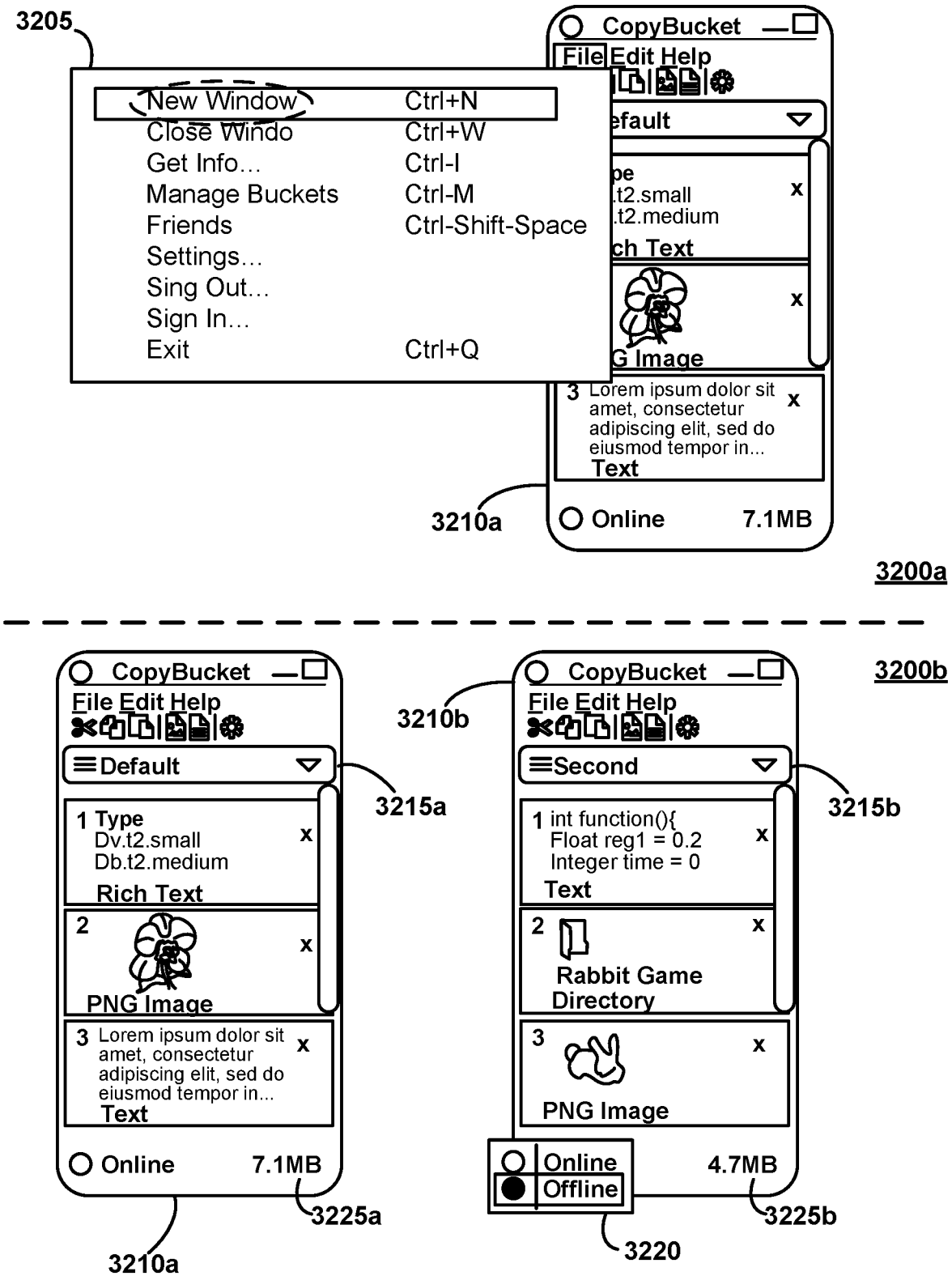
FIG. 32 is a schematic diagram illustrating various states of a graphical user interface that may be presented to the user during window creation, bucket selection, and online status operations as may be implemented in some embodiments.

FIG. 32 is a schematic diagram illustrating various states of a graphical user interface that may be presented to the user during window creation, bucket selection, and online status operations as may be implemented in some embodiments. Initially, in state 3200a, the client software may display only a single GUI window 3210a on the user's screen. By, e.g., selecting "New Window" in the dialog 3205 of the "File" selector, the user may create a second GUI window 3210b. An arbitrary number of windows may be generated in this manner in some embodiments.

Each window may serve as a separate instance for modifying buckets. For example, as shown in state 3200b, the user has used selector 3215b to view items in the "Second" bucket, while the first window 3210a's selector 3215a remains focused on the "Default" bucket. Note that the size indicia 3225b has changed in the second window 3210b in accordance with the contents of the "Second" bucket, in contrast with the size indicia 3225a of the window 3210a, which remains associated with the "Default" bucket. Similarly, by clicking on the network indicia 3220 of the second window 3210b, the user may disconnect window 3210b's network connection with the server system 150, while retaining the window 3210a's connection. In some embodiments, in contrast, only a single network connection may be available to all the windows.

Multiple windows may facilitate convenient data organization for the user. For example, when designing a video game, a user may wish to have simultaneous access to a software code bucket, a sound asset bucket, and a graphical asset bucket. If a peer sound engineer is providing new software assets in real-time, however, the user may wish to have direct access to the shared bucket via a new window. In contrast, the user may wish to save code snippets for their own use, which are not yet intended to be shared with his peers. Consequently, a separate window and bucket dedicated to code snippets may be created and taken offline to prevent synchronization.

In some embodiments the user's windows configurations are saved at the end of each client software session and recreated at the beginning of the next session. This may streamline the user's workflow and facilitate productivity.

Example Feature Augmentations for Some Embodiments—Preview for Mobile Device

Some embodiments, rather than providing a full client user interface 305 in a mobile device, such as mobile device 125c, may instead receive a client program with modified functionality. For example, rather than all the buckets and corresponding items being synchronized, "previews" may be displayed. In some embodiments, only when the user requests to copy an item will the item's full data be downloaded from the server. This limited functionality may be provided to avoid having to download all the data to the mobile device before it is needed. This functionality may likewise be applied to desktop and laptop devices in some embodiments.

Computer System

Figure 33:
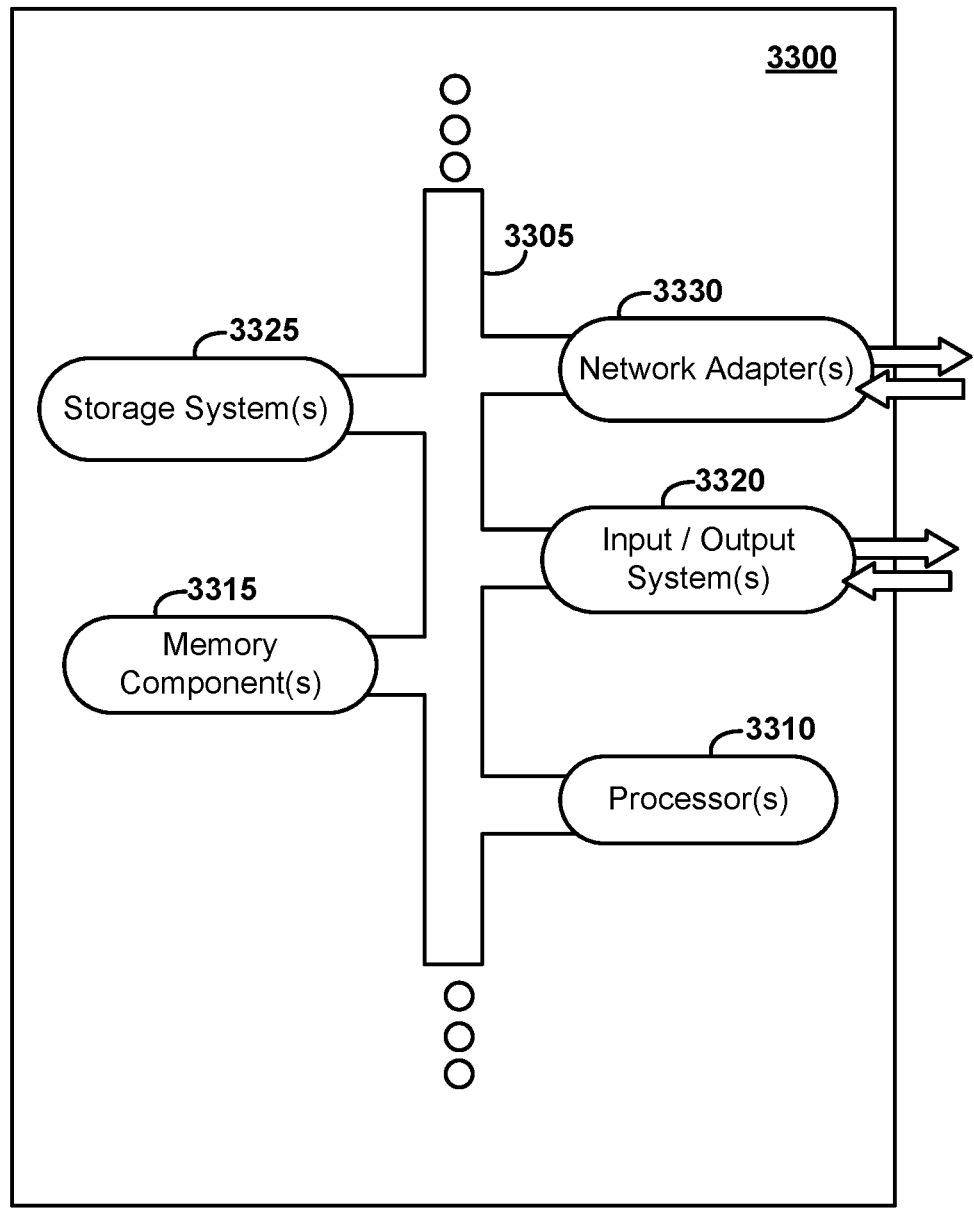
FIG. 33 is a block diagram of an example computer system as may be used in conjunction with some of the embodiments.

FIG. 33 is a block diagram of an example computer system as may be used in conjunction with some of the embodiments. The computing system 3300 may include an interconnect 3305, connecting several components, such as, e.g., one or more processors 3310, one or more memory components 3315, one or more input/output systems 3320, one or more storage systems 3325, one or more network adaptors 3330, etc. The interconnect 3305 may be, e.g., one or more bridges, traces, busses (e.g., an ISA, SCSI, PCI, I2C, Firewire bus, etc.), wires, adapters, or controllers.

The one or more processors 3310 may include, e.g., an Intel™ processor chip, a math coprocessor, a graphics processor, etc. The one or more memory components 3315 may include, e.g., a volatile memory (RAM, SRAM, DRAM, etc.), a non-volatile memory (EPROM, ROM, Flash memory, etc.), or similar devices. The one or more input/output devices 3320 may include, e.g., display devices, keyboards, pointing devices, touchscreen devices, etc. The one or more storage devices 3325 may include, e.g., cloud based storages, removable USB storage, disk drives, etc. In some systems memory components 3315 and storage devices 3325 may be the same components. Network adapters 3330 may include, e.g., wired network interfaces, wireless interfaces, Bluetooth™ adapters, line-of-sight interfaces, etc.

One will recognize that only some of the components, alternative components, or additional components than those depicted in FIG. 33 may be present in some embodiments. Similarly the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 3330. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 3315 and one or more storage devices 3325 may be computer-readable storage media. In some embodiments, the one or more memory components 3315 or one or more storage devices 3325 may store instructions, which may perform or cause to be performed various of the operations discussed herein. In some embodiments, the instructions stored in memory 3315 can be implemented as software and/or firmware. These instructions may be used to perform operations on the one or more processors 3310 to carry out processes described herein. In some embodiments, such instructions may be provided to the one or more processors 3310 by downloading the instructions from another system, e.g., via network adapter 3330.

REMARKS

The drawings and description herein are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner, may contain more or less information than shown, may be compressed and/or encrypted, etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference herein to "an embodiment" or "one embodiment" means that at least one embodiment of the disclosure includes a particular feature, structure, or characteristic described in connection with the embodiment. Thus, the phrase "in one embodiment" in various places herein is not necessarily referring to the same embodiment in each of those various places. Separate or alternative embodiments may not be mutually exclusive of other embodiments. One will recognize that various modifications may be made without deviating from the scope of the embodiments.

I claim:

1. A computer system comprising:
    at least one display;
    at least one processor;
    at least one memory, the memory comprising instructions configured:
        to cause the computer system to determine a local quick access memory management threshold;
        to cause the computer system to display a graphical user interface associated with a bucket management program on the display, the graphical user interface comprising:
            a bucket selection interface configured to receive a selection for at least one of a plurality of buckets from a user, the bucket selection interface further configured to depict a currently selected bucket, wherein the plurality of buckets comprises at least one local bucket and at least one shared bucket;
            a window depicting a plurality of icons, each icon associated with a data object within the bucket currently selected in the bucket selection interface, the plurality of icons arranged in a first sequential order within the window, wherein the bucket management program is configured, in response to selecting a bucket at the bucket selection interface, to display icons associated with the selected bucket in the window, but not to display icons associated with unselected buckets in the window, the bucket selection interface located above the window; and
            a memory footprint indicia, the memory footprint indicia indicating a cumulative memory size of all the data objects associated with the bucket currently selected in the bucket selection interface;
        to cause the computer system, in response to a user command, and when a shared bucket is selected in the bucket selection interface, to:
            depict an additional icon in the window, the additional icon associated with a new data object specified by the user, wherein the new data object is an extracted portion of a file;
            split a copy of the new data object into a plurality if chunks;
            store at least one of the plurality of chunks in the local quick access memory available to the computer system;
            provide a remote server with a hash corresponding to a chunk of the plurality of chunks; and
            arrange the plurality of icons, including the additional icon, in a second sequential order within the window following receipt of the user command; and
        to cause the computer system to perform a memory re-allocation process employing the memory management threshold to remove the plurality of chunks associated with the new data object from quick access memory without modifying the memory footprint indicia.

2. The computer system of claim 1, wherein to cause the computer system to determine a local quick access memory management threshold comprises:
- causing the computer system to determine a first value based upon, at least, the total capacity of the local quick access memory available to the computer system;
- causing the computer system to determine a second value based upon, at least, the amount of local quick access memory available to the computer system used by the bucket management program; and
- causing the computer system to determine the quick access memory management threshold as the greater of the first value and the second value.

3. The computer system of claim 2, wherein the memory re-allocation process comprises:
- ordering the data objects associated with each bucket of the plurality of buckets into a list based upon at least one of a data object size, a data object timestamp, and a data object bucket association; and
- iteratively considering the ordered list of data objects, wherein, in at least one iteration the computer system determines that the bucket management program's quick access memory usage exceeds the quick access memory management threshold and, in response, removes chunks associated with a data object in the list from the local quick access memory available to the computer system.

4. The computer system of claim 2, wherein the second value is at least twice the amount of local quick access memory available to the computer system used by the bucket management program.

5. The computer system of claim 4, the graphical user interface further comprising an action selection toolbar, the action selection toolbar comprising a second plurality of icons, the second plurality of icons corresponding to operations transferring data from the bucket management program to another program running on the computer system, and wherein
- the action selection toolbar is located above the bucket selection interface, wherein
- the window is located above an indication that the bucket management program is in network communication with the remote server and the memory footprint indicia, wherein
- the plurality of icons within the window are arranged in a vertical list within the window, the first icon of the sequential order appearing in the top-most position of the list within the window, and wherein
- the bucket selection interface is further configured to additionally present an option for bucket management when presenting the buckets for selection, the bucket selection interface configured such that selecting the option for bucket management causes a bucket management window to be displayed, the bucket management window configured to receive instructions for, at least, reordering buckets, editing bucket names, adding buckets, and removing buckets.

6. The computer system of claim 1, the instructions further configured to cause the computer system to:
- receive a shared data object from a peer bucket management program via the remote server,
- depict a second additional icon in the window, the second additional icon associated with the shared data object, wherein the shared data object comprises an extracted portion of a file, and wherein
- the plurality of icons, including the second additional icon, are arranged in a third sequential order within the window following receipt of the shared data object, the second additional icon appearing in the first position of the third sequential order following receipt via the remote server.

7. The computer system of claim 1, wherein the order of items in the first sequential order corresponds to the order in which the data objects corresponding to the icons are introduced into the bucket, and wherein
- the second sequential order comprises the additional icon in a first position and the following icon positions in the same order as the first sequential order of icons.

8. A computer-implemented method comprising:
- determining a local quick access memory management threshold;
- displaying a graphical user interface associated with a bucket management program on a display, the graphical user interface comprising:
  - a bucket selection interface configured to receive a selection for at least one of a plurality of buckets from a user, the bucket selection interface further configured to depict a currently selected bucket, wherein the plurality of buckets comprises at least one local bucket and at least one shared bucket;
  - a window depicting a plurality of icons, each icon associated with a data object within the bucket currently selected in the bucket selection interface, the plurality of icons arranged in a first sequential order within the window, wherein the bucket management program is configured, in response to selecting a bucket at the bucket selection interface, to display icons associated with the selected bucket in the window, but not to display icons associated with unselected buckets in the window, the bucket selection interface located above the window; and
  - a memory footprint indicia, the memory footprint indicia indicating a cumulative memory size of all the data objects associated with the bucket currently selected in the bucket selection interface;
- in response to a user command when a shared bucket is selected in the bucket selection interface:
  - depicting an additional icon in the window, the additional icon associated with a new data object specified by the user, wherein the new data object is an extracted portion of a file;
  - splitting a copy of the new data object into a plurality if chunks;
  - storing at least one of the plurality of chunks in the local quick access memory available to the computer system;
  - providing a remote server with a hash corresponding to a chunk of the plurality of chunks; and
  - arranging the plurality of icons, including the additional icon, in a second sequential order within the window following receipt of the user command; and
- performing a memory re-allocation process employing the memory management threshold to remove the plurality of chunks associated with the new data object from quick access memory without modifying the memory footprint indicia.

9. The computer-implemented method of claim 8, wherein determining a local quick access memory management threshold comprises:
- determining a first value based upon, at least, the total capacity of the local quick access memory available to the computer system;

determining a second value based upon, at least, the amount of local quick access memory available to the computer system used by the bucket management program; and determining the quick access memory management threshold as the greater of the first value and the second value.

10. The computer-implemented method of claim 9, wherein the memory re-allocation process comprises:

ordering the data objects associated with each bucket of the plurality of buckets into a list based upon at least one of a data object size, a data object timestamp, and a data object bucket association; and iteratively considering the ordered list of data objects, wherein, in at least one iteration the computer system determines that the bucket management program's quick access memory usage exceeds the quick access memory management threshold and, in response, removes chunks associated with a data object in the list from the local quick access memory available to the computer system.

11. The computer-implemented method of claim 9, wherein the second value is at least twice the amount of local quick access memory available to the computer system used by the bucket management program.

12. The computer-implemented method of claim 11, the graphical user interface further comprising an action selection toolbar, the action selection toolbar comprising a second plurality of icons, the second plurality of icons corresponding to operations transferring data from the bucket management program to another program running on the computer system, and wherein the action selection toolbar is located above the bucket selection interface, wherein the window is located above an indication that the bucket management program is in network communication with the remote server and the memory footprint indicia, wherein the plurality of icons within the window are arranged in a vertical list within the window, the first icon of the sequential order appearing in the top-most position of the list within the window, and wherein the bucket selection interface is further configured to additionally present an option for bucket management when presenting the buckets for selection, the bucket selection interface configured such that selecting the option for bucket management causes a bucket management window to be displayed, the bucket management window configured to receive instructions for, at least, reordering buckets, editing bucket names, adding buckets, and removing buckets.

13. The computer-implemented method of claim 8, wherein the order of items in the first sequential order corresponds to the order in which the data objects corresponding to the icons are introduced into the bucket, and wherein the second sequential order comprises the additional icon in a first position and the following icon positions in the same order as the first sequential order of icons.

14. A non-transitory computer-readable medium comprising instructions configured to cause a computer system to perform a method comprising:

determining a local quick access memory management threshold;

displaying a graphical user interface associated with a bucket management program on a display, the graphical user interface comprising:

a bucket selection interface configured to receive a selection for at least one of a plurality of buckets from a user, the bucket selection interface further configured to depict a currently selected bucket, wherein the plurality of buckets comprises at least one local bucket and at least one shared bucket;

a window depicting a plurality of icons, each icon associated with a data object within the bucket currently selected in the bucket selection interface, the plurality of icons arranged in a first sequential order within the window, wherein the bucket management program is configured, in response to selecting a bucket at the bucket selection interface, to display icons associated with the selected bucket in the window, but not to display icons associated with unselected buckets in the window, the bucket selection interface located above the window; and a memory footprint indicia, the memory footprint indicia indicating a cumulative memory size of all the data objects associated with the bucket currently selected in the bucket selection interface;

in response to a user command when a shared bucket is selected in the bucket selection interface:

depicting an additional icon in the window, the additional icon associated with a new data object specified by the user, wherein the new data object is an extracted portion of a file;

splitting a copy of the new data object into a plurality if chunks;

storing at least one of the plurality of chunks in the local quick access memory available to the computer system;

providing a remote server with a hash corresponding to a chunk of the plurality of chunks; and arranging the plurality of icons, including the additional icon, in a second sequential order within the window following receipt of the user command; and performing a memory re-allocation process employing the memory management threshold to remove the plurality of chunks associated with the new data object from quick access memory without modifying the memory footprint indicia.

15. The non-transitory computer-readable medium of claim 14, wherein determining a local quick access memory management threshold comprises:

determining a first value based upon, at least, the total capacity of the local quick access memory available to the computer system;

determining a second value based upon, at least, the amount of local quick access memory available to the computer system used by the bucket management program; and determining the quick access memory management threshold as the greater of the first value and the second value.

16. The non-transitory computer-readable medium of claim 15, wherein the memory re-allocation process comprises:

ordering the data objects associated with each bucket of the plurality of buckets into a list based upon at least one of a data object size, data a object timestamp, and a data object bucket association; and iteratively considering the ordered list of data objects, wherein, in at least one iteration the computer system determines that the bucket management program's quick access memory usage exceeds the quick access memory management threshold and, in response, removes chunks associated with a data object in the list from the local quick access memory available to the computer system.

17. The non-transitory computer-readable medium of claim 15, wherein the second value is at least twice the amount of local quick access memory available to the computer system used by the bucket management program.

18. The non-transitory computer-readable medium of claim 17, the graphical user interface further comprising an action selection toolbar, the action selection toolbar comprising a second plurality of icons, the second plurality of icons corresponding to operations transferring data from the bucket management program to another program running on the computer system, and wherein the action selection toolbar is located above the bucket selection interface, wherein the window is located above an indication that the bucket management program is in network communication with the remote server and the memory footprint indicia, wherein the plurality of icons within the window are arranged in a vertical list within the window, the first icon of the sequential order appearing in the top-most position of the list within the window, and wherein the bucket selection interface is further configured to additionally present an option for bucket management when presenting the buckets for selection, the bucket selection interface configured such that selecting the option for bucket management causes a bucket management window to be displayed, the bucket management window configured to receive instructions for, at least, reordering buckets, editing bucket names, adding buckets, and removing buckets.

19. The non-transitory computer-readable medium of claim 14, the instructions further configured to cause the computer system to:

receive a shared data object from a peer bucket management program via the remote server, depict a second additional icon in the window, the second additional icon associated with the shared data object, wherein the shared data object comprises an extracted portion of a file, and wherein the plurality of icons, including the second additional icon, are arranged in a third sequential order within the window following receipt of the shared data object, the second additional icon appearing in the first position of the third sequential order following receipt via the remote server.

20. The non-transitory computer-readable medium of claim 14, wherein the order of items in the first sequential order corresponds to the order in which the data objects corresponding to the icons are introduced into the bucket, and wherein the second sequential order comprises the additional icon in a first position and the following icon positions in the same order as the first sequential order of icons.

* * * * *